US008871672B2

(12) United States Patent
Goto et al.

(10) Patent No.: US 8,871,672 B2
(45) Date of Patent: Oct. 28, 2014

(54) PLATINUM-CONTAINING CATALYST AND METHOD OF PRODUCING THE SAME, ELECTRODE AND ELECTROCHEMICAL DEVICE

(75) Inventors: Shuji Goto, Tokyo (JP); Shizuka Hosoi, Kanagawa (JP); Yuli Li, Kanagawa (JP); Yoshihiro Kudo, Tokyo (JP); Akihiro Maesaka, Kanagawa (JP)

(73) Assignee: Sony Corporation (JP)

( * ) Notice: Subject to any disclaimer, the term of this patent is extended or adjusted under 35 U.S.C. 154(b) by 807 days.

(21) Appl. No.: 13/124,960

(22) PCT Filed: Oct. 29, 2009

(86) PCT No.: PCT/JP2009/068578
§ 371 (c)(1),
(2), (4) Date: Apr. 19, 2011

(87) PCT Pub. No.: WO2010/050550
PCT Pub. Date: May 6, 2010

(65) Prior Publication Data
US 2011/0200915 A1 Aug. 18, 2011

(30) Foreign Application Priority Data

Oct. 30, 2008 (JP) ................................. 2008-279144
Sep. 2, 2009 (JP) ................................. 2009-202426
Oct. 26, 2009 (JP) ................................. 2009-245394

(51) Int. Cl.
*B01J 21/18* (2006.01)
*B01J 23/40* (2006.01)
(Continued)

(52) U.S. Cl.
CPC .............. *H01M 4/92* (2013.01); *H01M 4/8657* (2013.01); *Y02E 60/523* (2013.01); *Y02E 60/50* (2013.01); *H01M 4/925* (2013.01)
USPC ........... 502/325; 502/185; 502/326; 502/331; 429/524; 429/525; 429/526; 429/527; 429/400

(58) Field of Classification Search
USPC .......... 502/185, 325, 326, 331; 429/524–527, 429/400
See application file for complete search history.

(56) References Cited

U.S. PATENT DOCUMENTS 7,691,780 B2 * 4/2010 Adzic et al. .................... 502/339
7,902,111 B2 * 3/2011 Roev et al. .................... 502/185
(Continued)

FOREIGN PATENT DOCUMENTS

EP 1947719 A1 7/2008
JP 2002-231257 8/2002
(Continued)

OTHER PUBLICATIONS

"Electro-oxidation of ethanol using PtRu/C electrocatalysts prepared by alcohol-reduction process," Estevam V. Spinace et al. Journal of Power Sources 137 (2007), pp. 17-23.*

(Continued)

*Primary Examiner* — Patricia L Hailey
(74) *Attorney, Agent, or Firm* — Sheridan Ross P.C.

(57) ABSTRACT

In one example embodiment, a core-shell type platinum-containing catalyst is allowed to reduce the amount of used platinum and has high catalytic activity and stability. In one example embodiment, the core-shell type platinum-containing catalyst includes a core particle (with an average particle diameter $R_1$) made of a non-platinum element and a platinum shell layer (with an average thickness $t_s$) satisfying 1.4 nm≤$R_1$≤3.5 nm and 0.25 nm≤$t_s$≤0.9 nm. The core particle includes an element satisfying $E_{out}$≥3.0 eV, where average binding energy relative to the Fermi level of 5d orbital electrons of platinum present on an outermost surface of the shell layer is $E_{out}$. In a fuel cell including a platinum-containing catalyst which contains a Ru particle as a core particle, the output density at a current density of 300 mA/cm² is 70 mW/cm² or over, and an output retention ratio is approximately 90% or over.

19 Claims, 27 Drawing Sheets

(51) Int. Cl.
*B01J 23/74* (2006.01)
*B01J 23/00* (2006.01)
*B01J 23/42* (2006.01)
*B01J 23/72* (2006.01)
*H01M 4/02* (2006.01)
*H01M 4/36* (2006.01)
*H01M 4/92* (2006.01)
*H01M 4/94* (2006.01)
*H01M 4/90* (2006.01)
*H01M 8/00* (2006.01)
*H01M 4/86* (2006.01)

(56) References Cited

U.S. PATENT DOCUMENTS

| | | | |
|---|---|---|---|
| 8,110,521 B2 * | 2/2012 | Lee et al. | 502/185 |
| 8,168,561 B2 * | 5/2012 | Virkar | 502/326 |
| 8,178,463 B2 * | 5/2012 | Stamenkovic et al. | 502/101 |
| 8,227,372 B2 * | 7/2012 | Lopez et al. | 502/182 |
| 8,361,924 B2 * | 1/2013 | Tanaka et al. | 502/313 |
| 2005/0075240 A1 | 4/2005 | Yamamoto | |
| 2006/0093892 A1 * | 5/2006 | Min et al. | 429/40 |
| 2006/0134505 A1 | 6/2006 | Wang et al. | |
| 2008/0220296 A1 * | 9/2008 | Eichhorn et al. | 429/17 |
| 2012/0321996 A1 * | 12/2012 | Ito | 429/524 |
| 2013/0059231 A1 * | 3/2013 | Hwang et al. | 429/524 |
| 2013/0089812 A1 * | 4/2013 | Mukerjee et al. | 429/524 |

FOREIGN PATENT DOCUMENTS

| | | | | |
|---|---|---|---|---|
| JP | 2005-135900 | 5/2005 | | |
| JP | 2005-196972 | 7/2005 | | |
| JP | 2006-231266 | 9/2006 | | |
| JP | 3870282 | 10/2006 | | |
| JP | 2007-134295 | 5/2007 | | |
| JP | 2008-52638 | 7/2008 | | |
| JP | 2008-153192 | 7/2008 | | |
| JP | 2009-054339 | 3/2009 | | |
| WO | 2008/025751 | * | 3/2008 | B22F 1/02 |

OTHER PUBLICATIONS

Ru@Pt core-shell nanoparticles for methanol fuel cell catalyst: Control and effects of shell composition, Navaneethan Muthuswamy et al. International Journal of Hydrogen Energy 38 (2013), pp. 16631-16641.*

"Influence of reaction temperature on the particle-composition distributions and activities of polyol-synthesized Pt-Ru/C catalysts for methanol oxidation," Lin Gan et al. Journal of Power Sources 191 (2009), pp. 233-239.*

"Pt Submonolayers on Ru Nanoparticles; A Novel Low Pt Loading, High CO Tolerance Fuel Cell Electrocatalyst," S. R. Brankovic et al. Electrochemical and Solid-State Letters, 4, (12), pp. A217-A220 (2001).*

Greeley et al., "Near-surface alloys for hydrogen fuel cell applications", Catalysis Today, 2006, pp. 52-58, vol. 111.

Hammer et al., "CO Chemisorption at Metal Surfaces and Overlayers", Physical Review Letters, Mar. 18, 1996, pp. 2141-2144, vol. 76, No. 12.

Norskov et al., "Priority Communication", Journal of Catalysis, 2002, pp. 275-278, vol. 209.

International Search Report issued Jan. 26, 2010, for corresponding Intl. Appln. No. PCT/JP2009/068578.

* cited by examiner

| | HEATING-UP TIME t(min) | PARTICLE DIAMETER(nm) $R_1$ | PARTICLE DIAMETER(nm) $R_2$ | DIAMETER RATIO $R_2/R_1$ | THICKNESS OF Pt LAYER (nm) | MOLAR RATIO ($\gamma$) (Pt/Ru) | OUTPUT RETENTION RATIO(%) |
|---|---|---|---|---|---|---|---|
| WORKING EXAMPLE 1 | 1 | 1.4 | 1.9 | 1.36 | 0.25 | 1.5 | 92.3 |
| WORKING EXAMPLE 2 | 1 | 1.4 | 2.5 | 1.79 | 0.55 | 4.0 | 95.2 |
| WORKING EXAMPLE 3 | 1 | 1.4 | 2.9 | 2.07 | 0.75 | 7.0 | 96.3 |
| WORKING EXAMPLE 4 | 1 | 1.4 | 3.1 | 2.21 | 0.85 | 9.0 | 95.8 |
| WORKING EXAMPLE 5 | 15 | 1.9 | 2.4 | 1.26 | 0.25 | 1.0 | 91.4 |
| WORKING EXAMPLE 6 | 15 | 1.9 | 2.9 | 1.53 | 0.50 | 2.33 | 93.6 |
| WORKING EXAMPLE 7 | 15 | 1.9 | 3.3 | 1.74 | 0.70 | 4.0 | 96.7 |
| WORKING EXAMPLE 8 | 15 | 1.9 | 3.8 | 2.00 | 0.95 | 6.0 | 95.1 |
| WORKING EXAMPLE 9 | 40 | 3.5 | 4.0 | 1.14 | 0.25 | 0.5 | 89.3 |
| WORKING EXAMPLE 10 | 40 | 3.5 | 4.5 | 1.29 | 0.50 | 1.0 | 91.1 |
| WORKING EXAMPLE 11 | 40 | 3.5 | 4.9 | 1.40 | 0.70 | 1.5 | 93.2 |
| WORKING EXAMPLE 12 | 40 | 3.5 | 5.2 | 1.49 | 0.85 | 2.0 | 90.5 |
| WORKING EXAMPLE 13 | 1 | 1.4 | 3.7 | 2.64 | 1.15 | 16.0 | 87.4 |
| WORKING EXAMPLE 14 | 15 | 1.9 | 4.2 | 2.21 | 1.15 | 9.0 | 88.6 |
| WORKING EXAMPLE 15 | 40 | 3.5 | 6.2 | 1.77 | 1.35 | 4.0 | 87.8 |
| WORKING EXAMPLE 16 | 60 | 4.6 | 5.1 | 1.11 | 0.25 | 0.33 | 82.1 |
| WORKING EXAMPLE 17 | 60 | 4.6 | 5.6 | 1.22 | 0.50 | 0.67 | 84.4 |
| WORKING EXAMPLE 18 | 60 | 4.6 | 5.9 | 1.28 | 0.65 | 1.0 | 87.6 |
| WORKING EXAMPLE 19 | 60 | 4.6 | 6.4 | 1.39 | 0.90 | 1.5 | 80.9 |
| COMPARATIVE EXAMPLE 1 | | | | | | 1.0 | 73.0 |
| COMPARATIVE EXAMPLE 2 | | | | | | 1.0 | 78.3 |

T: HEATING-UP TIME TO 170°C (min)
$R_1$: PARTICLE DIAMETER OF Ru NANOPARTICLE
$R_2$: PARTICLE DIAMETER OF PLATINUM-CONTAINING CATALYST PARTICLE
THICKNESS OF Pt LAYER = $(R_2-R_1)/2$

FIG. 8

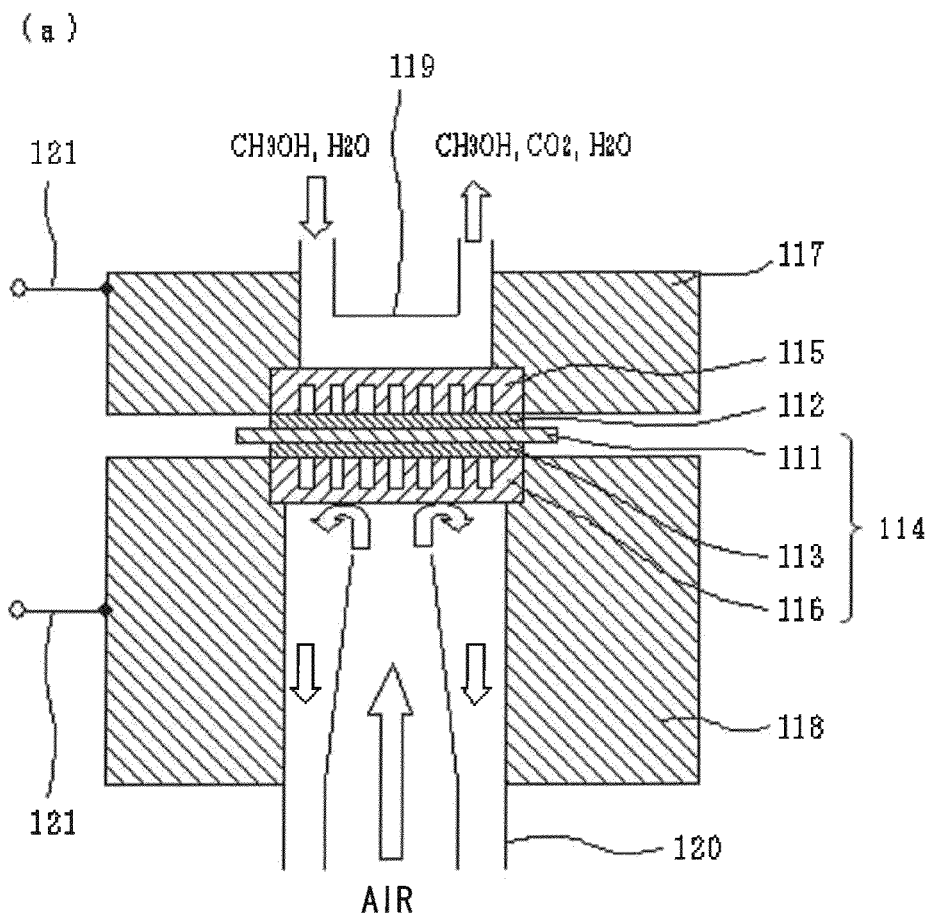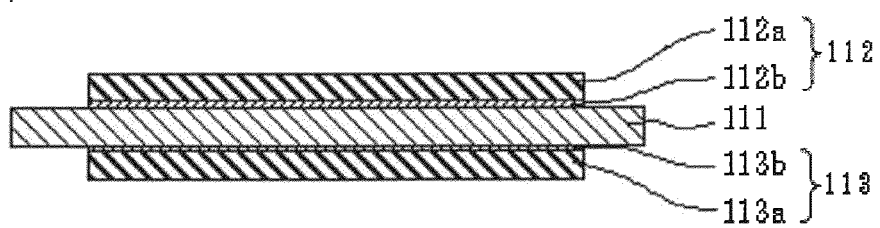
FIG. 17

(a) WORKING EXAMPLE 5
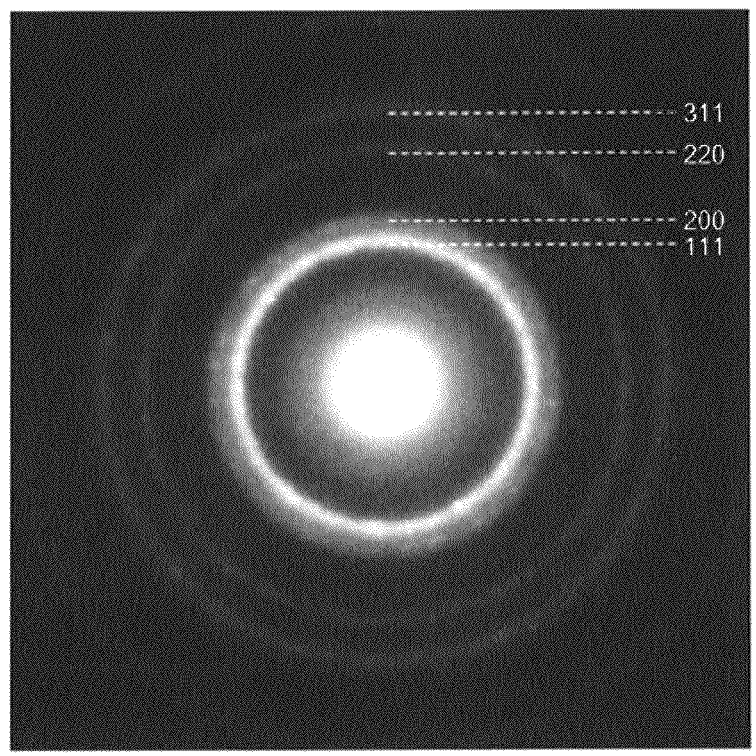
(b) WORKING EXAMPLE 6
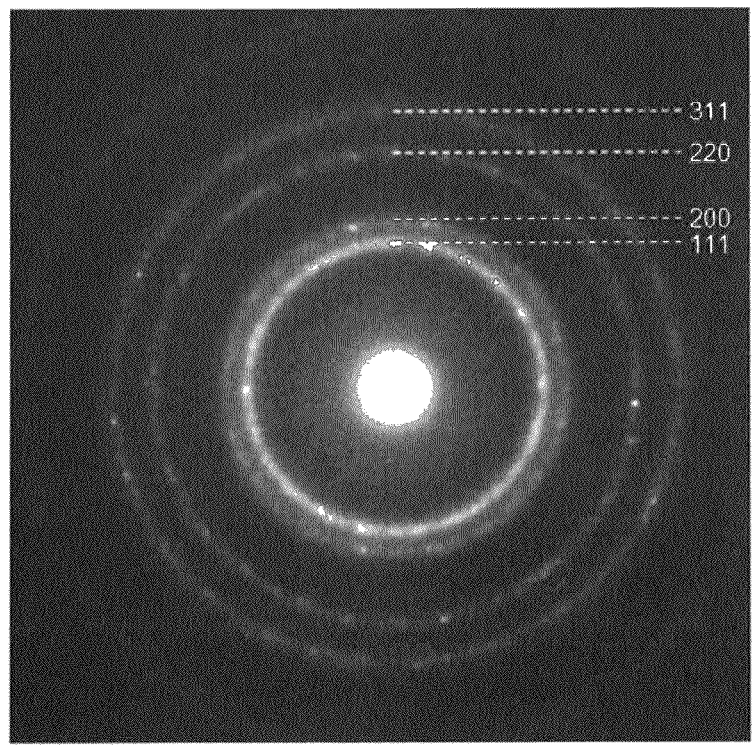
FIG. 20

(a)
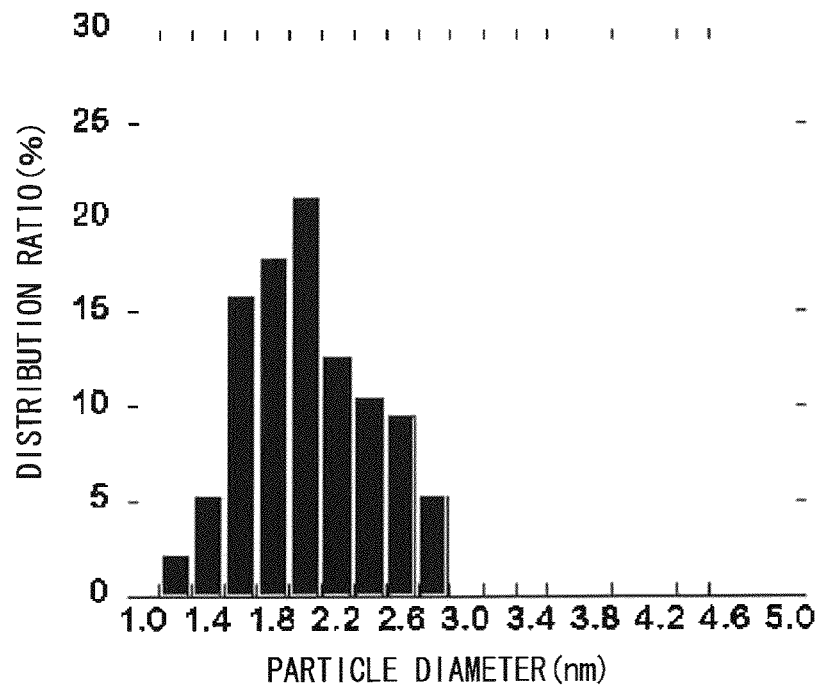
(b)
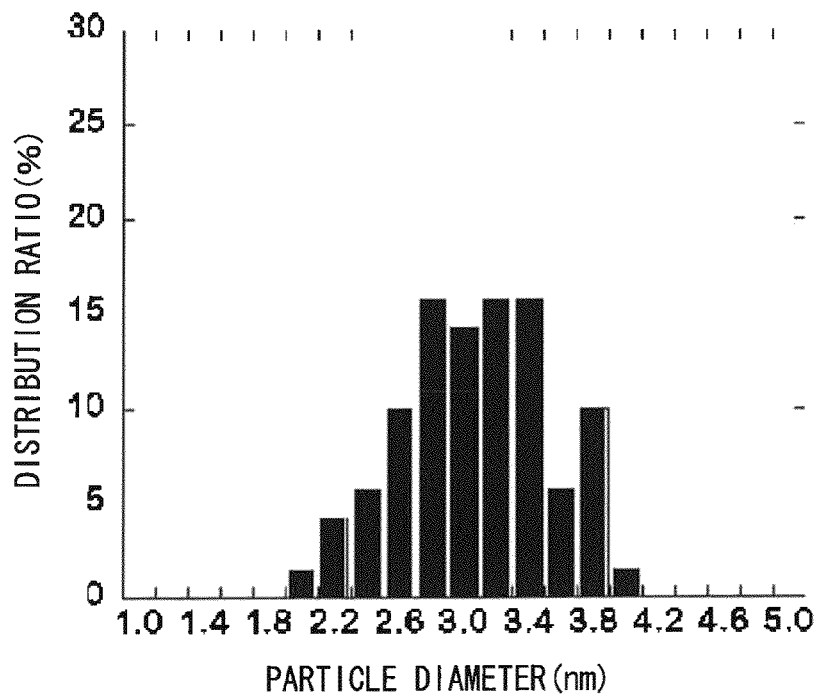
FIG. 21

(a)
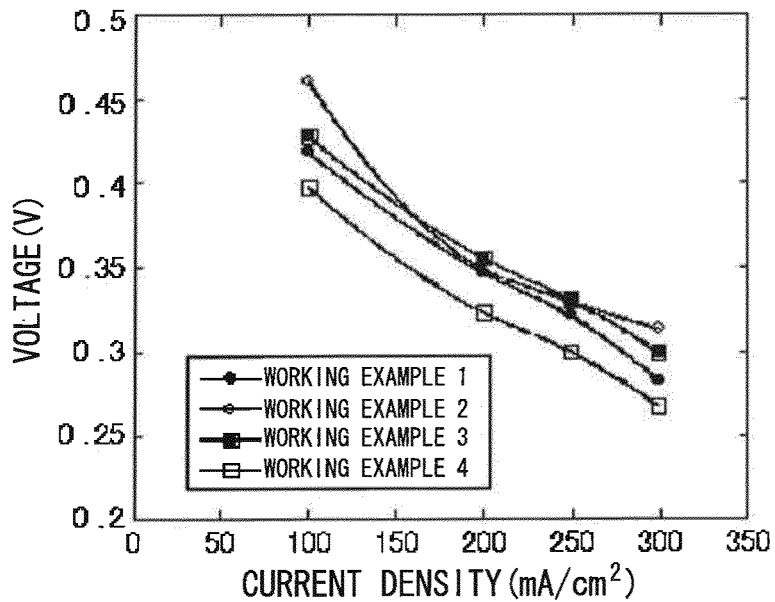
(b)
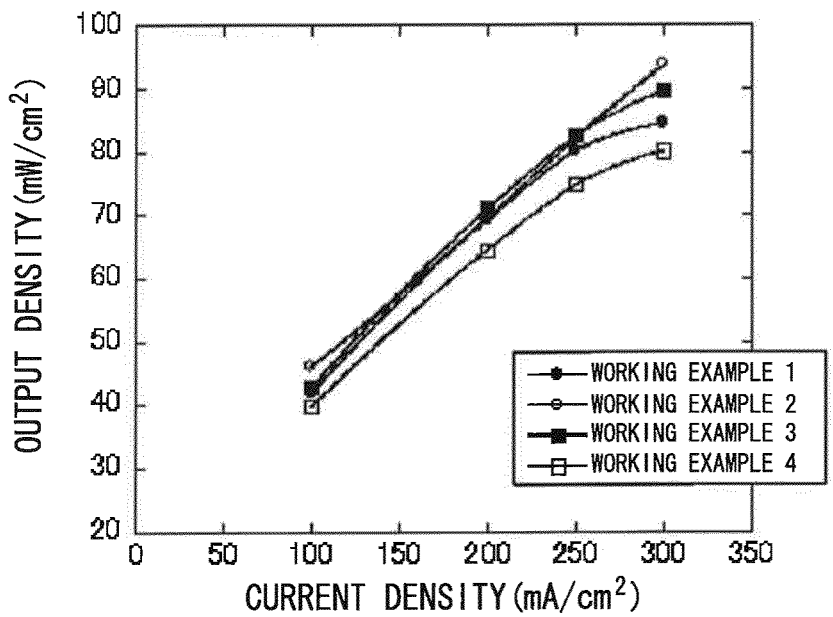
FIG. 22

(a)
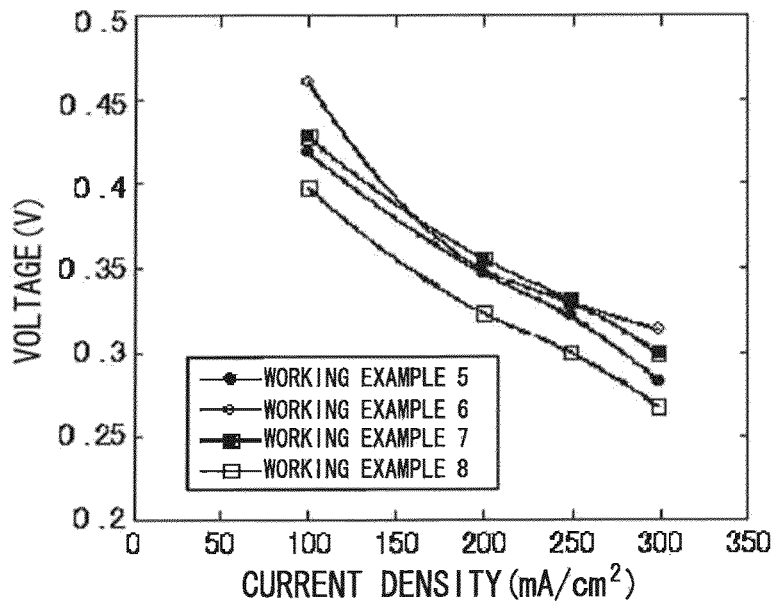
(b)
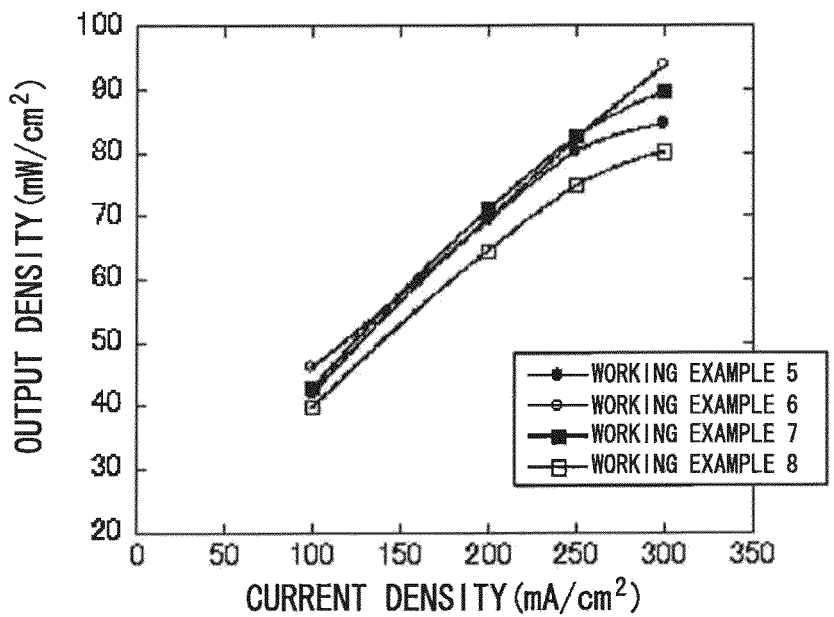
FIG. 23

(a)
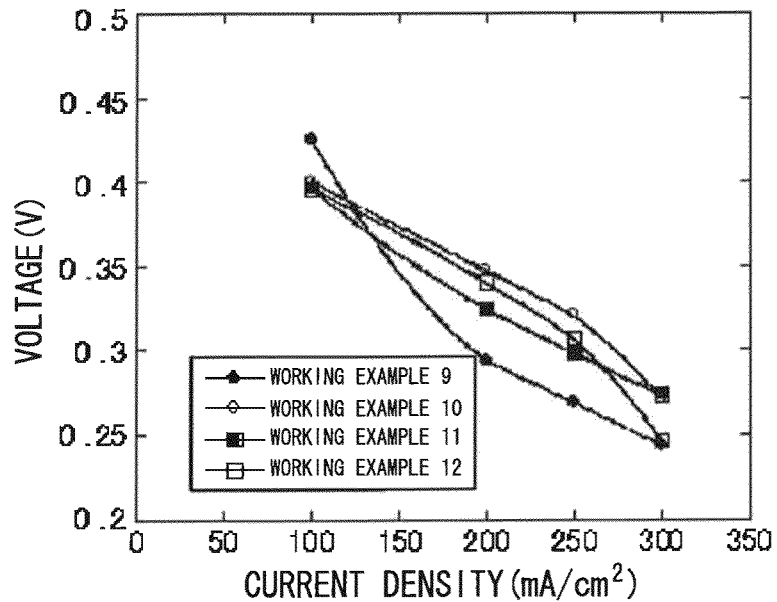
(b)
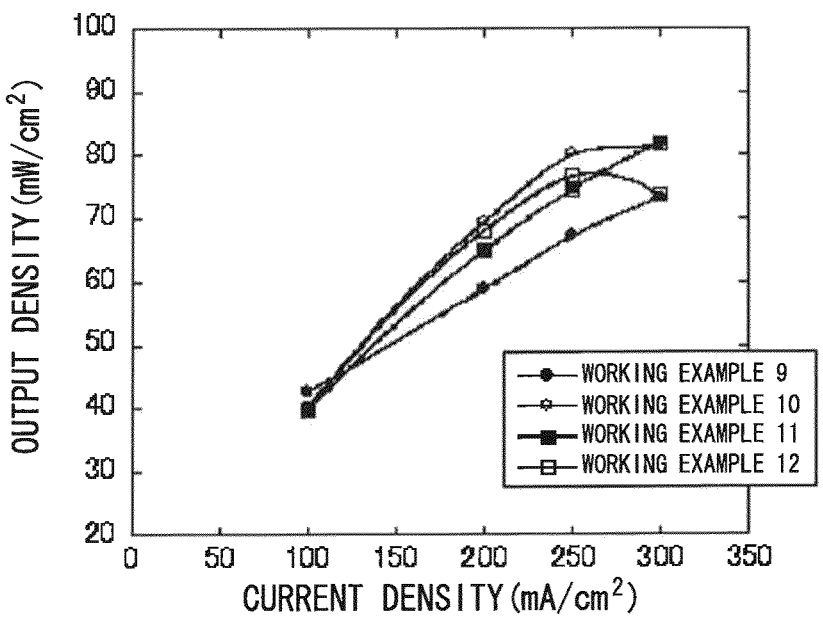
FIG. 24

(a)
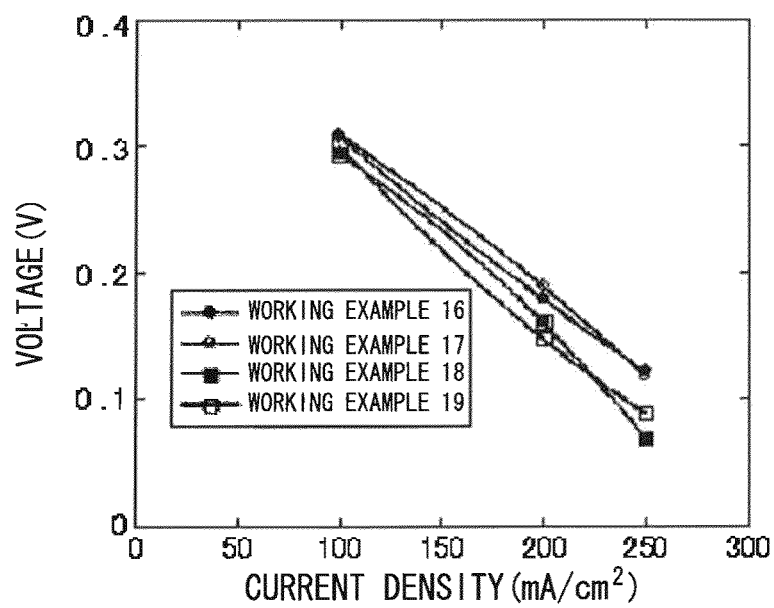
(b)
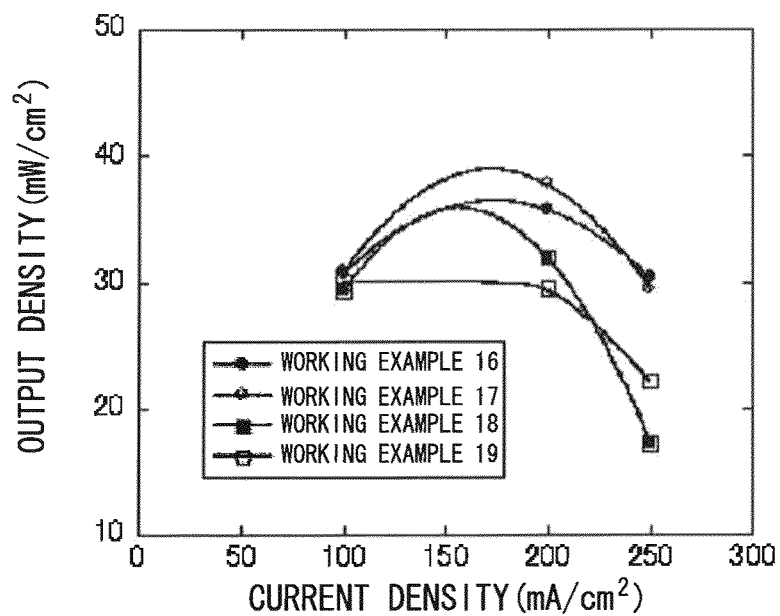
FIG. 26

(a)
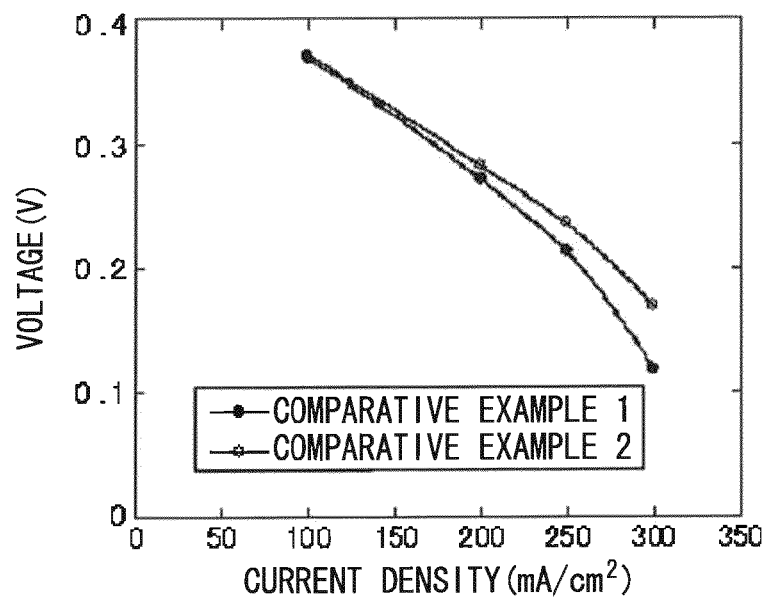
(b)
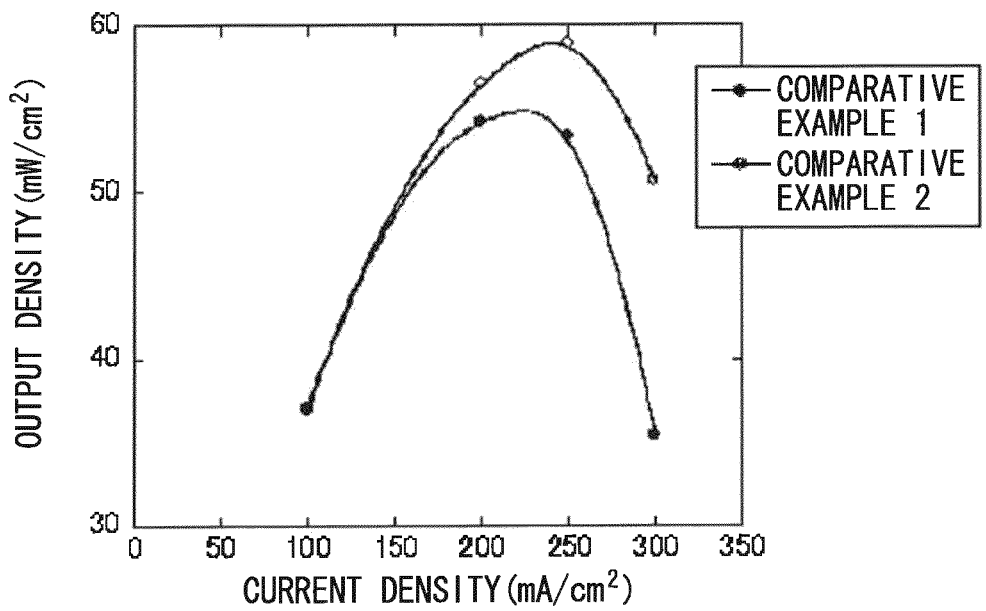
FIG. 27

PLATINUM-CONTAINING CATALYST AND METHOD OF PRODUCING THE SAME, ELECTRODE AND ELECTROCHEMICAL DEVICE

CROSS REFERENCE TO RELATED APPLICATIONS

The present application is a National Stage of International Application No. PCT/JP2009/068578 filed on Oct. 29, 2009, which claims priority to Japanese Patent Application No. 2009-245394 filed in the Japanese Patent Office on Oct. 26, 2009, Japanese Patent Application No. 2009-202426 filed in the Japanese Patent Office on Sep. 2, 2009, and Japanese Patent Application No. 2008-279144 filed in the Japanese Patent Office on Oct. 30, 2008, the entire contents of which are being incorporated herein by reference.

BACKGROUND

As fuel cells converting chemical energy into electrical energy are effective and do not generate an environmental pollutant, the fuel cells have attracted attention as clean power supplies for portable information devices, household use, vehicles and the like, and the development of the fuel cells have been taking place.

In recent years, as portable electronic devices such as cellular phones, notebook personal computers, digital cameras and camcorders have become more sophisticated and multi-functional, the portable electronic devices tend to consume more power. As power supplies for the portable electronic devices, typically small primary batteries and secondary batteries are used.

Measures of characteristics of batteries include energy density and output density. The energy density is the amount of electrical energy allowed to be supplied per unit mass or unit volume of a battery. The output density is an output per unit mass or unit volume of a battery. Improvements in energy density and output density in batteries used in portable electronic devices are desired to support more functionality and multifunctionality.

For example, at present, lithium-ion secondary batteries widely used as power supplies for portable electronic devices have good characteristics such as large output density. Moreover, in the lithium-ion secondary batteries, the energy density is relatively large, and the volume energy density reaches 400 Wh/L or over. However, unless a major change in constituent materials occurs in the lithium-ion secondary batteries, a further improvement in energy density is not expected.

Therefore, to support portable electronic devices expected to become more multifunctional and to consume more power, fuel cells are expected as power supplies for next-generation portable electronic devices.

In the fuel cell, a fuel is supplied to an anode to be oxidized, and air or oxygen is supplied to a cathode to be reduced, and in the whole fuel cell, a reaction in which the fuel is oxidized by oxygen occurs. As a result, chemical energy of the fuel is efficiently converted into electrical energy, and the electrical energy is extracted. Therefore, when the fuel is continuously supplied, unless the fuel cell is broken, the fuel cell is allowed to continue to be used as a power supply without being charged.

Various kinds of fuel cells have been proposed or proto-typed, and some of the fuel cells have been put in practical use. These fuel cells are classified according to used electro-lytes into alkaline fuel cells (AFCs), phosphoric acid fuel cells (PAFCs), molten carbonate fuel cells (MCFCs), solid electrolyte fuel cells (SOFCs), polymer electrolyte fuel cells (PEFCs) and the like. Specifically, the PEFCs have such advantages that the used electrolyte is a solid, and the PEFCs are allowed to operate at a lower temperature than other types of fuel cells, for example, approximately 30° C. to 130° C., so the PEFCs are suitable as power supplies for portable electronic devices.

As fuels of the fuel cells, various combustible materials such as hydrogen and methanol are allowed to be used. However, as a cylinder for storage or the like is necessary for gas fuels such as hydrogen, the gal fuels are not suitable for downsizing of the fuel cells. On the other hand, liquid fuels such as methanol have such an advantage that the liquid fuels are easily stored. In particular, a direct methanol fuel cell (DMFC) in which methanol is directly supplied to an anode without being reformed to react has such advantages that a reformer for extracting hydrogen from the fuel is not necessary, the configuration of the DMFC is simple and the DMFC is easily downsized. Conventionally, the DMFC has been studied as one kind of PEFC, and the fuel cell of this kind is most likely to be used as a power supply for portable electronic device.

There are various types of fuel cells according to kinds of used electrolytes. Specifically, fuel cells using an organic material such as methanol or hydrogen as a fuel have attracted attention, and important constituent materials determining output performance of a fuel cell are an electrolyte material and a catalyst material, and a membrane-electrode assembly (MEA) configured by sandwiching an electrolyte membrane between catalyst films is an important constituent element.

As the electrolyte material, a large number of kinds of materials have been studied. For example, an electrolyte made of a perfluorosulfonic acid-based resin is a representative example. Moreover, as the catalyst material, a large number of kinds of materials have been studied. A PtRu catalyst is a representative example. In addition to the PtRu catalyst, to achieve a catalyst with high activity, a binary catalyst PtM including Au, Mo, W or the like as M has been studied.

For example, in the case where a bimetallic catalyst using Pt and Ru is used in a fuel electrode of the DMFC, by a deprotonation reaction represented by a formula (1), methanol is oxidized to produce CO, and CO is absorbed by Pt to produce Pt—CO. By a reaction represented by a formula (2), water is oxidized to produce OH, and OH is absorbed by Ru to produce Ru—OH. Finally, by a reaction represented by a formula (3), CO absorbed by Ru—OH is oxidized and removed as $CO_2$ to generate an electron. Ru functions as a co-catalyst.

$$Pt+CH_3OH \rightarrow Pt\text{—}CO+4H^++4e^- \quad (1)$$

$$Ru+H_2O \rightarrow Ru\text{—}OH+H^++e^- \quad (2)$$

$$Pt\text{—}CO+Ru\text{—}OH \rightarrow Pt+Ru+CO_2+H^++e^- \quad (3)$$

A principle of allowing methanol to be oxidized by the reactions represented by the formulas (1), (2) and (3) is widely known as bi-functional mechanism in which CO absorbed by Pt and a hydroxyl group bonded to Ru adjacent to Pt react with each other to convert CO into $CO_2$, thereby preventing CO poisoning of a catalyst.

Aside from this, it is considered that under a condition where an electronic influence of Ru adjacent to Pt affects Pt, Pt—CO may be oxidized by $H_2O$ (water) by a reaction represented by a formula (4) after the reaction represented by the formula (1).

$$Pt\text{—}CO+H_2O \rightarrow Pt+CO_2+2H^+2e^- \quad (4)$$

The structural compositions of catalysts has been studied actively. A large number of catalysts including Pt and Ru with a core-shell structure which are applied to fuel cells have been reported (for example, refer to PTL1 to PTL4 which will be described later).

First, in PTL1 entitled "composite catalyst for fuel cell, method of manufacturing composite catalyst for fuel cell, method of manufacturing electrode catalyst layer for fuel cell and fuel cell" which will be described later, the following descriptions are given.

A composite catalyst for fuel cell of the disclosure of PTL1 is characterized by attaching an ion-exchange polymer (B) onto the surfaces of a core-shell type catalyst metal microparticles (A) each having a catalyst metal shell including catalyst metal and a metal core including a kind of metal different from the catalyst metal.

In the catalyst metal microparticles (A), as the catalyst metal forming a shell is not specifically limited, as long as the catalyst metal has catalytic activity for an electrode reaction of a fuel cell, and as the catalyst metal, Pt, Pd, Ir, Rh, Au, Ru, V, Cr, Mn, Fe, Co, Ni, Cu, Mo, Ag, W, Re, Os or the like is used. Among them, noble metal such as Pt, Pd, Ir, Rh or Au is suitably used, and Pt is specifically preferably used because Pt has high catalytic activity.

Moreover, the metal forming the core in the catalyst metal microparticles (A) is not specifically limited, as long as the metal is different from the catalyst metal forming the shell, and, for example, Pt, Pd, Ir, Rh, Au, Ru, V, Cr, Mn, Fe, Co, Ni, Cu, Mo, Ag, W, Re or Os is allowed to be used. The core may be made of a plurality of kinds of metals.

In the catalyst metal microparticles (A), the molar ratio (metal/catalyst metal) of the metal forming the metal core and the catalyst metal forming the catalyst metal shell is not specifically limited, and depending on the following particle diameter of the metal core, the following thickness of the catalyst metal shell or the like, typically, the molar ratio is preferably within a range of approximately 1/4 to 1/0.2. The particle diameter of the metal core and the thickness of the catalyst metal shell are not specifically limited, and may be appropriately set in consideration of, in addition to the utilization rate of the catalyst metal, dispersivity, an electronic effect, a steric effect or the like of a composite catalyst. In terms of stability of the core-shell structure and the utilization rate of the catalyst metal, the particle diameter of the metal core is preferably within a range of 1 to 50 nm, and specifically preferably within a range of 1 to 10 nm. It is necessary for the thickness of the catalyst metal shell to be equivalent to one atom or over of the catalyst metal, and in terms of the utilization rate of the catalyst metal, the thickness of the catalyst metal shell is preferably within a range of 0.3 to 5 nm, and specifically preferably within a range of 0.3 to 1 nm.

According to the disclosure of PTL1, catalyst metal microparticles (A) with a particle diameter of 1 to 10 nm are obtainable, and more specifically, catalyst metal microparticles (A) with a particle diameter of 2 to 10 nm are obtainable.

A simultaneous reduction method is a method of performing a reduction process on a mixed solution in which an ion-exchange polymer (b), a metal precursor (a2) and a metal catalyst precursor (a1) are dissolved to reduce metal ions and catalyst metal ions, thereby depositing core-shell type catalyst metal microparticles configured by forming the catalyst metal shells on surfaces of metal cores.

The ratio (feeding amounts) of the catalyst metal precursor (a1) and the metal precursor (a2) is not specifically limited, and the ratio of the catalyst metal shell and the metal core in the core-shell catalyst metal microparticle (A) is controlled by the feeding amounts, so the ratio may be appropriately set. Typically, the precursors are preferably fed so that the ratio (metal element/catalyst metal element) of a metal element of the metal precursor (a2) to a catalyst metal element of the catalyst metal precursor (a1) is 1/10 to 1/0.01, specifically 1/4 to 1/0.2. These are descriptions in PTL1.

Moreover, in PTL2 entitled "liquid containing dispersion stabilized catalyst nanoparticles" which will be described later, the following descriptions are given.

Catalytic nanoparticles include (a) nanoparticles containing a metal element Ru with a particle diameter of 1 nm to 10 nm and (b) a layer of platinum covering a part or a whole of a surfaces of the nanoparticle.

The particle diameter of the metal nanoparticle depends on the size of a platinum-group transition metal layer (for example, a Pt layer) reduced and supported on a surface thereof, but the particle diameter is preferably within a range of 1 nm to 10 nm. A particle diameter of 1 nm or less is not preferable, because an effect of preventing poisoning is not allowed to be sufficiently exerted on a surface of the supported platinum-group transition metal layer (for example, a Pt layer). Moreover, a particle diameter of 10 nm or over is not preferable, because metal atoms not involved in preventing poisoning on the surface of the platinum-group transition metal layer (for example, the Pt layer) are increased to cause an increase in cost. Note that the particle diameter is allowed to be evaluated by a scanning electron microscope or X-ray diffraction measurement.

Moreover, the covering rate of the Pt layer supported by the surface of the metal nanoparticle is not specifically limited, as long as a necessary surface area of Pt for achieving desired catalytic activity is secured, but the covering rate is preferably 5% or over of the surface area of the metal nanoparticle. Further, the thickness of the Pt layer is not limited, as long as the thickness of the Pt layer is thin enough for the metal nanoparticle to exert an influence on an electronic state of a Pt atom present on the surface of the Pt layer, but the thickness of one Pt atomic layer is preferably within a range of 3 nm or less. A thickness of 3 nm or over is not preferable, because the metal nanoparticle does not exert an influence on the electronic state of the Pt atom present on the surface of the Pt layer, and an effect of preventing carbon monoxide poisoning of a Pt surface is not allowed to be obtained. These are descriptions of PTL2.

Moreover, catalysts based on a result of a first-principles calculation have been studied (for example, refer to NPTL1 to NPTL3 which will be described later).

In the DMFC, typically, methanol which is a fuel as a low-concentration or high-concentration solution is supplied to an anode, and as represented by the following formula (a), methanol is oxidized in a catalyst layer on the anode side to produce carbon dioxide.

$$\text{Anode: } CH_3OH + H_2O \rightarrow CO_2 + 6H^+ + 6e^- \quad (a)$$

Hydrogen ions generated in the formula (a) are moved to a cathode side through a proton-conducting polymer electrolyte membrane sandwiched between the catalyst layer on the anode side and a catalyst layer on the cathode side, and as represented by the following formula (b), the hydrogen ions react with oxygen in the catalyst layer on the cathode side to generate water.

$$\text{Cathode: } 6H^+ + (3/2)O_2 + 6e^- \rightarrow 3H_2O \quad (b)$$

A reaction occurring in the whole DMFC is represented by the following reaction formula (c) formed by combining the formulas (a) and (b).

$$\text{Whole DMFC: } CH_3OH + (3/2)O_2 \rightarrow CO_2 + 2H_2O \quad (c)$$

The volume energy density of the DMFC is expected to reach a few times as large as that of a lithium-ion secondary battery. However, one issue of the DMFC is a small output density. Therefore, there is apprehension that when a fuel cell is designed to generate power for driving a portable electronic device only by itself, the size of the fuel cell exceeds an acceptable size for the portable electronic device; therefore the DMFC is not allowed to be contained in the portable electronic device.

Therefore, it is desired to improve the output density of the DMFC, and as one of measures to improve the output density, it is desired to improve activity of an anode catalyst for methanol oxidation. Conventionally, as the anode catalyst, a catalyst formed by forming microparticles of an alloy catalyst including platinum (Pt) and ruthenium (Ru) and supporting the microparticles of the alloy catalyst on conductive carbon material powder is typically used.\

A catalyst microparticle containing platinum exhibits high catalytic activity for oxidation of hydrogen or methanol. However, a pure platinum microparticle is easily poisoned by carbon monoxide (CO), and carbon monoxide is strongly absorbed on an active site of the platinum microparticle; therefore, the catalytic activity of the platinum microparticle may be pronouncedly reduced. Therefore, in the case where carbon monoxide is included in a hydrogen gas which is a typical fuel of the PEFC or in the case where carbon monoxide is produced as an intermediate as in the case of the DMFC, the pure platinum microparticle is not allowed to be used as the anode catalyst of the PEFC.

On the other hand, it is known that a platinum/ruthenium catalyst in which platinum coexists with a metal element such as ruthenium has good properties as an anode catalyst resistant to carbon monoxide poisoning, and a platinum/ruthenium alloy catalyst or the like is used as the anode catalyst of the PEFC. The catalysis of a catalyst including platinum and ruthenium for methanol oxidation is described by the bi-functional mechanism (refer to Electroanalytical Chemistry and Interfacial Electrochemistry, 60 (1975), pp. 267-273).

In the bi-functional mechanism, methanol gradually loses hydrogen (H) as hydrogen ions (H$^+$) by a plurality of reactions on platinum to be oxidized, thereby generating carbon monoxide as represented by the following formula (d).

$$CH_3OH \rightarrow CO + 4H^+ + 4e^- \tag{d}$$

On the other hand, as represented by the following formula (e), absorbed water is decomposed on ruthenium to produce a hydroxyl radical (OH).

$$H_2O \rightarrow OH + H^+ + e^- \tag{e}$$

As represented by the following formula (f), carbon monoxide produced on platinum is oxidized by the hydroxyl radical on adjacent ruthenium to produce carbon dioxide ($CO_2$), thereby completing oxidation of methanol.

$$CO + OH \rightarrow CO_2 + H^+ + e^- \tag{f}$$

As described above, in the catalyst including platinum and ruthenium, carbon monoxide on platinum is oxidized to produce carbon dioxide, and carbon monoxide is smoothly removed from the active site of platinum; therefore, the catalyst including platinum and ruthenium is resistant to carbon monoxide poisoning of platinum, and has high activity for methanol oxidation. According to the bi-functional mechanism, it is expected that a catalyst having more points where platinum and ruthenium are adjacent to each other has higher activity for methanol oxidation, and, for example, a catalyst in which platinum and ruthenium are mixed at atomic level, that is, a platinum/ruthenium alloy catalyst is considered to have high activity.

Actually, it is reported that in platinum/ruthenium-based catalysts, a catalyst in which platinum and ruthenium are mixed well at atomic level, that is, a catalyst in which alloying is proceeded has high activity for methanol oxidation (refer to Materials Research Society Symposium Proceedings, Vol. 900E, 0900-009-12). Moreover, in commercially available platinum/ruthenium catalysts, a catalyst allowing the DMFC to obtain a relatively high output when the catalyst is used as an anode catalyst of the DMFC is a catalyst with a high level of alloying of platinum and ruthenium.

Note that an alloy catalyst including platinum and ruthenium or the like is formed into microparticles to be used. It is because as noble metal such as platinum is expensive and rare, it is desired to reduce the amount of used platinum as small as possible; therefore, to form a high-activity catalyst containing a small amount of platinum, the area of a surface exhibiting catalytic activity is increased. Moreover, typically, catalyst microparticles are supported on conductive carbon material powder or the like to be used. It is because when the catalyst is formed into microparticles, a reduction in the surface area of the catalyst caused by the agglomeration of microparticles is prevented.

However, a method of reducing carbon monoxide poisoning by alloying to increase activity for methanol oxidation has a limit, and the catalytic activity for methanol oxidation of commonly available platinum/ruthenium alloy catalyst microparticles at present is not sufficient. Therefore, in the case where such platinum/ruthenium alloy catalyst microparticles are used as the anode catalyst of the DMFC, it is difficult to achieve a sufficiently high output density necessary for portable electronic devices. Moreover, it is desirable to reduce the amount of expensive platinum in the formation of the catalyst; however, when the amount of platinum is reduced, the catalytic activity is reduced.

One impediment to an improvement in catalyst performance of the platinum/ruthenium alloy catalyst is an insufficient reduction in particle diameter of the catalyst microparticle or insufficient alloying. In a typically method of producing the platinum/ruthenium alloy catalyst, platinum microparticles are supported on a carbon carrier, and then ruthenium microparticles are supported, and after that, platinum microparticles and Ru microparticles are fused by heating to be alloyed. In this producing method, unless the platinum microparticles and the Ru microparticles are grown to a size to some extent or over, alloying is insufficient, and a reduction in particle diameter of the catalyst microparticle and alloying are conflicting needs, so it is difficult to solve this issue. Moreover, the smaller the amount of supported platinum microparticles or ruthenium microparticles on the carbon carrier is, the more sparsely the platinum microparticles and the Ru microparticles are distributed; therefore, it is difficult to fuse and alloy the platinum microparticles and the Ru microparticles.

Another impediment to the improvement in catalyst performance of the alloy catalyst is not allowing a platinum atom present inside the catalyst microparticle to be used. In atoms forming the catalyst microparticle, only an atom present near the surface of the catalyst microparticle involves catalysis. Therefore, in the platinum/ruthenium alloy catalyst microparticle, a platinum atom present inside the catalyst microparticle does not contribute to catalysis. The larger the particle diameter of the catalyst microparticle is, the more the ratio of platinum atoms which do not contribute to catalysis and are wasted is increased. Moreover, there is an issue that in the platinum/ruthenium alloy catalyst microparticle, ruthenium is eluted into an electrolyte during power generation of the DMFC, thereby gradually reducing catalytic activity. In the alloy catalyst, in order to perform catalysis, it is necessary for platinum and ruthenium to be exposed to the surface of the catalyst. In the alloy catalyst, it is difficult to solve an issue of durability that ruthenium is eluted during power generation.

In addition to the platinum/ruthenium alloy catalyst, anode catalysts for DMFC including various materials such as a catalyst formed by combining platinum and an element except for platinum and a catalyst not using platinum for cost reduction have been studied, but all of the catalysts have an issue of catalytic activity or durability. Therefore, to achieve a high output density necessary for portable electronic devices in the DMFC, a different approach is desired.

In PTL5 which will be described later, catalyst microparticles each including a ruthenium particle and a platinum layer covering a part of a surface of the ruthenium particle is proposed as an electrode catalyst for fuel cell. In the catalyst microparticles, an alloying process is not provided, so the particle diameter of the catalyst microparticle is not limited by the alloying process. Moreover, platinum atoms are not present inside the catalyst microparticles, and platinum atoms are present only on the surfaces of the microparticles, so the amount of wasted platinum is allowed to be reduced, and compared to alloy microparticles, platinum use efficiency is high.

In PTL5, as a method of producing the above-described catalyst microparticles, a producing method including a step of producing ruthenium colloid particles by adding a reducing agent to a ruthenium salt solution, a step of bubbling hydrogen in a dispersion liquid in which the ruthenium colloid particles are dispersed for allowing hydrogen to be adsorbed to the surfaces of the ruthenium colloid particles, and a step of adding a solution containing platinum salt to the dispersion liquid to form platinum layers on the surfaces of the ruthenium particles by reducing platinum ions by hydrogen on the surfaces of the ruthenium particles.

To reduce the particle diameter of the catalyst microparticle to achieve high catalyst performance, in a producing process, it is necessary to stably disperse ruthenium particles and prevent agglomeration or the like. Therefore, PTL5 describes that when the ruthenium particles are synthesized, an anti-agglomeration agent for preventing the agglomeration of the ruthenium particles such as polyvinylpyrrolidone is preferably added to the ruthenium salt solution.

However, by doing so, an active site of the catalyst is covered with the anti-agglomeration agent, so after catalyst microparticles are synthesized, for example, heat treatment for removing the anti-agglomeration agent such as heating the catalyst at approximately 300° C. in the presence of hydrogen is necessary. There is apprehension that in the heat treatment, the agglomeration of catalyst microparticles occurs to reduce the active surface area of the catalyst.

In PTL2 which will be described later, there are proposed a colloid solution in which catalyst nanoparticles each including a nanoparticle having a metal element such as ruthenium and a layer of platinum or the like covering a part or a whole of the surface of the nanoparticle are stably dispersed by a carboxylic compound such as citric acid, and a nanoparticle-containing catalyst in which the colloid solution and a carrier are mixed to support catalyst nanoparticles on the carrier.

Moreover, in PTL2, there is proposed a method of producing a colloid solution by preparing a metal salt-containing liquid containing a carboxylic compound such as citric acid as a dispersion stabilizer, and applying the liquid to colloid formation to produce a nanoparticle having a metal element such as ruthenium, and then adding a platinum-group metal salt-containing liquid to perform a reduction process, thereby forming a layer of platinum or the like covering a part or a whole of surface of nanoparticle.

A characteristic of the method of producing a colloid solution proposed in PTL2 is using a carboxylic compound such as citric acid instead of a polymer-based anti-agglomeration agent such as polyvinylpyrrolidone used in the producing method in PTL5. According to PTL2, the carboxylic compound has small absorption force to the surfaces of the catalyst nanoparticles; therefore, when the carboxylic compound is used as a catalyst, the carboxylic compound is removed from surfaces of the catalyst nanoparticles. Therefore, the heat treatment for removing the carboxylic compound is not necessary, and there is no possibility that the agglomeration of catalyst microparticles in the heat treatment occurs. Moreover, even if the heat treatment is performed, the heat treatment is allowed to be performed at a lower temperature than that in the case where the polymer-based anti-agglomeration agent is removed, so there is a less possibility that the agglomeration of the catalyst microparticles occurs to cause a reduction in the active surface area.

FIG. 28 is a schematic view of a catalyst illustrated in FIG. 1 in PTL2. In the catalyst, parts of the surface of one Ru nanoparticle 101 are covered with a plurality of island-shaped platinum layers 102, and a catalyst microparticle 103 formed in such a manner is supported on a carbon carrier 104. Moreover, a carboxylic compound 105 such as citric acid used for producing a colloid solution is adhered to the surfaces of the Ru nanoparticle 101 and the platinum layer 102.

CITATION LIST

Patent Literature

[PTL1] Japanese Unexamined Patent Application Publication No. 2009-54339 (Paragraphs 0016, 0029 to 0030, 0032 to 0033, 0039 and 0041)
[PTL2] Japanese Patent No. 3870282 (claim 1, Paragraphs 014 and 021, and FIG. 1)
[PTL3] Japanese Unexamined Patent Application Publication No. 2005-135900 (Paragraphs 0013 and 0024 to 0025, and FIG. 1)
[PTL4] Japanese Unexamined Patent Application Publication No. 2005-196972 (Paragraphs 0012, 0020 and 0043, FIG. 3)
[PTL5] Japanese Unexamined Patent Application Publication No. 2002-231257 (Pages 2 to 3)

Non-Patent Literature

[NPTL1] J. Greeley and M. Mavrikakis, "Near-surface alloys for hydrogen fuel cell applications", Catal. Today 111 (2006)52-58 (2. Methods)
[NPTL2] B. Hammer et al., "CO Chemisorption at Metal Surfaces and Overlayers", Phys. Rev. Lett 76 (1996)2141-2144 (p 2141)
[NPTL3] J. K. Norskov et al., "Universality in Heterogeneous Catalysis", J. Catal. 209, 275-278 (2002) (p 275-p 276)

SUMMARY

The present disclosure relates to a core-shell type platinum-containing catalyst including a core metal particle made of a non-platinum element and a shell layer (platinum layer) and a fuel cell using the same, a platinum-containing catalyst resistant to carbon monoxide poisoning and a method of producing the same, and an electrode and an electrochemical device using a platinum-containing catalyst.

It is industrially extremely important to use a catalyst allowing a molecule or a radical to be absorbed on a surface of noble metal, thereby accelerating a reaction. For example, in a platinum catalyst, there is an issue that carbon monoxide which is an intermediate causes a reduction in catalytic activity (poisoning), and catalytic activity is reduced over time. There is a proposed, as a catalyst used for a fuel cell, a catalyst using alloy particles including platinum; however, it is considered that in a catalyst using alloy particles in which platinum is uniformly dispersed, platinum exposed to outside catalyst contributes to a function of the catalyst; therefore, platinum buried in the alloy particles without being exposed to outside does not contribute to the function of catalyst, and the ratio of platinum which is not used as the catalyst is large.

For example, assuming that only a volume part from an outer surface of a 5-nm diameter platinum alloy particle to a depth of 0.2 nm to 0.3 nm functions as a catalyst, the volume of the part is only approximately 20% to 30% of the platinum alloy particle. The reserve of platinum is small, and platinum is an expensive material, and platinum is not used effectively and is wasted. It is desirable to provide a highly practical catalyst having high catalytic activity and using a less amount of platinum.

In the case where platinum is used as a catalyst, it is considered that only platinum on a surface of a material contributes to catalytic activity, and as one technique of reducing the amount of used platinum is a core-shell type platinum-containing catalyst in which a platinum layer is stacked as a shell layer on a core metal particle including a suitable element.

For example, in PTL1, the particle diameter of the core metal particle is specifically preferably within a range of 1 to 10 nm, and the thickness of the platinum layer is specifically preferably within a range of 0.3 to 1 nm, and in PTL2, the particle diameter of a metal nanoparticle (a core metal particle) is preferably within a range of 1 to 10 nm depending on the size of the Pt layer, and the thickness of the Pt layer is preferably within a range of a thickness corresponding to the thickness of one Pt atomic layer to 3 nm or less.

In related art, there is no report indicating preferable ranges of the particle diameter of a core particle and the thickness of a shell layer (platinum layer) in a core-shell type platinum-containing catalyst based on an experimental evaluation result of catalytic activity. The above-described ranges which are preferable in PTL1 and PTL2 are not based on the experimental evaluation result of catalytic activity and are wide; therefore, the ranges are not sufficiently effective as a guideline for actually producing the core-shell type platinum-containing catalyst.

Therefore, an effective guideline for producing the core-shell type platinum-containing catalyst which is allowed to reduce the amount of used platinum and achieve high catalytic activity based on the experimental evaluation result of catalytic activity is desired. Moreover, supportive evidence for the experimental evaluation result of catalytic activity by a result by a first-principles calculation based on density function theory is desired.

In NPTL1 to NPTL3, an improvement in a function of a platinum-non-platinum contact type catalyst based on a result by a first-principles calculation is described; however, in NPTL1, a calculation using only a model including one atomic layer is performed, and the influence of the thickness of a platinum layer exerted on catalytic activity is not considered.

Moreover, in NPTL2 and NPTL3, CO absorption to a surface of a single metal phase is discussed; however, a ligand effect caused by contact between a platinum atomic layer and core metal is not discussed, and an increase in catalytic activity by an interaction between a platinum atom of a platinum layer with a thickness of 1 nm or less (which is equivalent to 1 to 4 atomic layers) and an atom forming a core metal particle is not discussed.

It is considered that there are two mechanisms for reducing carbon monoxide poisoning of platinum and improving catalyst performance for methanol oxidation in catalyst microparticles, which are proposed in PTL2 and PTL5, each including a microparticle including ruthenium or the like as a base and a platinum layer covering a part or a whole of the surface of the microparticle.

A first mechanism is the above-described bi-functional mechanism. To allow the mechanism to effectively work, it is necessary for platinum and ruthenium to be exposed in proximity to a surface of the catalyst. In the catalyst microparticles proposed in PTL2 and PTL5, a boundary region between a region where a ruthenium microparticle is exposed and a region covered with the platinum layer is a region satisfying the condition. Therefore, when an effect (hereinafter referred to as "first effect") by the bi-functional mechanism is emphasized, the ruthenium microparticle is not allowed to be completely covered with the platinum layer.

In PTL5, the first effect by the bi-functional mechanism is emphasized, and a paragraph 0006 of PTL5 describes that "when a whole of the ruthenium particle is covered with platinum, a carbon monoxide oxidation function is not fulfilled, so it is desirable that at least a part of the ruthenium particle is exposed". To enhance the first effect by the bi-functional mechanism, it is desirable to form a smaller platinum layer pattern on the surface of a small ruthenium microparticle, for example, to cover the surface of ruthenium microparticle with a large number of island-shaped platinum layers (refer to FIG. 28) so as to increase the ratio of the above-described boundary region, but this is difficult. Therefore, it is considered that an improvement in catalyst performance by the bi-functional mechanism is limited.

A second mechanism is a mechanism in which a microparticle (a microparticle as a base) where a platinum layer is formed functions as a base layer for preventing absorption of carbon monoxide on the surface of the platinum layer. An effect (hereinafter referred to as "second effect") by the mechanism includes an effect by electronic interaction between an atom forming the microparticle as a base and a Pt atom of the platinum layer, an effect by a mismatch in a lattice size between the microparticle as the base and the platinum layer, and the like. For example, in the case where a constituent element of the microparticle as the base is ruthenium, and the number of platinum atomic layers forming the platinum layer on the surface of the Ru microparticle is approximately 1 to 3, a Ru—Pt bond formed in a boundary between the ruthenium microparticle and the platinum layer exerts a strong influence (the ligand effect) on the electronic state of a platinum atom on the surface of the platinum layer, thereby preventing absorption of carbon monoxide on an active site of the surface of the platinum layer. Moreover, a mismatch in lattice size between the ruthenium microparticle and the platinum layer causes crystal lattice distortion on the surface of the platinum layer, and this distortion changes the electronic state of the platinum atom on the surface of the platinum layer to prevent absorption of carbon monoxide on the surface of the platinum layer. It is considered that even if the number of platinum atomic layers forming the platinum layer is larger than 1 to 3, such a second effect is fulfilled, but when the number of platinum atomic layers is 5 or over, a reduction in the second effect starts.

In both of the mechanisms, to effectively develop the second effect, it is necessary for the platinum layer to have an extremely small thickness. Moreover, the area of the platinum layer functioning as a catalytic activity surface is preferably as large as possible, so when the second effect is emphasized, it is desirable to completely cover the ruthenium microparticle as the base with the platinum layer. In terms of these points, the design principle of the platinum layer in the case where the second effect by the bi-functional mechanism is emphasized is different from that of the platinum layer in the case where the first effect is emphasized, and the coverage of the ruthenium microparticle with the platinum layer in the case where the second effect is emphasized is opposite to that in the case where the first effect is emphasized.

In PTL2, in paragraphs 0014 and 0021, an effect of preventing poisoning of the platinum layer by a metal nanoparticle is described, and attention is given to the above-described second effect. However, in FIG. 28, the surface of the Ru nanoparticle 101 is partially covered with a plurality of island-shaped platinum layers 102, and it is considered that the first effect by the bi-functional mechanism is emphasized. Moreover, in description about the coverage of the platinum layer covering the surface of the nanoparticle, in claim 1 or the like, it describes that "covering a part or a whole of a surface of a nanoparticle", and in the paragraph 0021, it describes that "the coverage is 5% or over of the surface area of a metal nanoparticle"; therefore, it is considered from these descriptions that in PTL2, mainly partial covering is intended. Further, in Working Example 1, an example in which "the particle diameter of the ruthenium nanoparticle is approximately 5 nm, and the thickness of the platinum layer is approximately 2 nm, and the mass fraction of ruthenium in the catalyst is 15 wt % and the mass fraction of platinum is 31 wt %" is provided. When a calculation is made with use of these values, the Ru nanoparticle 101 is partially covered with the platinum layer. Moreover, it is considered that the second effect starts to be reduced in the case where 5 or more platinum atomic layers are included, so the platinum layer with a thickness of 2 nm is too large to effectively develop the second effect. Therefore, it is considered that in PTL2, although the second effect is mentioned, the design principle of the platinum layer is far from the design principle for effectively developing the second effect, and the first effect by the bi-functional mechanism is emphasized.

Moreover, PTL2 and PTL5 do not at all study the issue of durability that in the case where a catalyst in which ruthenium is exposed to a surface thereof is used as an electrode catalyst of the DMFC, ruthenium is eluted into an electrolyte during power generation to gradually reduce catalytic activity.

The present disclosure is made to solve the above-described issues, and it is an object of the disclosure to provide a core-shell type platinum-containing catalyst which is allowed to reduce the amount of used platinum and to maintain high catalytic activity with less deterioration, and includes a core metal particle including a non-platinum element and a shell layer (platinum layer), and a method of producing the same, an electrode and an electrochemical device.

Moreover, it is another object of the disclosure to provide a platinum-containing catalyst which is allowed to reduce carbon monoxide poisoning of platinum and improve catalyst performance for methanol oxidation and has high durability or high environment resistance for maintaining catalytic activity for a long period, a method of producing the same, and an electrode and an electrochemical device using the platinum-containing catalyst.

A platinum-containing catalyst with a first structure of the disclosure includes metal particles each including a core particle made of a metal atom except for platinum or an alloy of a metal atom except for platinum (for example, Ru, Ni, Co or Fe in an example embodiment which will be described later) and a shell layer made of platinum on a surface of the core particle, the metal particles being supported by a conductive carrier (for example, carbon black in the example embodiment which will be described later) and satisfying $0.25$ $nm \leq t_s \leq 0.9$ nm and $1.4$ $nm \leq R_1 \leq 3.5$ nm, where an average thickness of the shell layer is $t_s$ and an average particle diameter of the core particle is $R_1$.

An electrode of the disclosure includes the platinum-containing catalyst.

Moreover, an electrochemical device of the disclosure includes facing electrodes and an ion conductor sandwiched between the facing electrode, and one or both of the facing electrodes include the above-described platinum-containing catalyst.

Moreover, a platinum-containing catalyst with a second structure of the disclosure includes microparticles (for example, Ru microparticles in an example embodiment which will be described later) including a platinum layer formed thereon and functioning as a base layer for preventing absorption of carbon monoxide on the surface of the platinum layer; a carrier (for example, a conductive carbon material in the example embodiment which will be described later) contacting the microparticles and supporting the microparticles at parts contacting the microparticles; and the platinum layer formed with a thickness at which a function of the microparticles as the base layer is effectively exerted so that a whole surface except for the part contacting the carrier of each of the microparticles is covered with the platinum layer.

A method of producing a platinum-containing catalyst with a second structure of the disclosure includes steps of synthesizing microparticles (for example, Ru microparticles in an example embodiment which will be described later) each having a platinum layer formed thereon in a later step and functioning as a base layer preventing absorption of carbon monoxide on the surface of the platinum layer while preventing agglomeration thereof; mixing a carrier (for example, a conductive carbon material in the example embodiment which will be described later) with a reaction liquid formed after the step of synthesizing the microparticles to absorb the microparticles on the carrier; taking the microparticles supported by the carrier out of the reaction liquid formed after the step of synthesizing the microparticles and washing the microparticles; and forming the platinum layer with a thickness at which a function of the microparticles as the base layer is effectively exerted so that a whole surface except for a part contacting the carrier of each of the microparticles is covered with the platinum layer by dripping a platinum salt-containing liquid and a reducing agent-containing liquid into a dispersion liquid containing the microparticles supported by the carrier.

According to the platinum-containing catalyst with the first structure of the disclosure, the average thickness $t_s$ of the shell layer and the average particle diameter $R_1$ of the core particle are $0.25$ $nm \leq t_s \leq 0.9$ nm and $1.4$ $nm \leq R_1 \leq 3.5$ nm, respectively, so the amount of used platinum is allowed to be reduced, and resistance to CO poisoning is high, and high catalytic activity is allowed to be maintained with less deterioration. For example, when the platinum-containing catalyst is used as an anode catalyst of a direct methanol fuel cell, a direct methanol fuel cell with a sufficiently practical output density of 70 mW/cm² or over at a current density of 300 mA/cm², a high output retention ratio of approximately 90% or over and good durability is achievable.

Moreover, according to the electrode and the electrochemical device of the disclosure, the platinum-containing catalyst with the first structure is included, so in the case where the electrochemical device is configured as a fuel cell or the like using hydrogen or methanol containing carbon monoxide as a fuel, a large output density is achievable. Further, high durability in which initial performance is maintained after a long-duration operation or high environment resistance is obtained.

Characteristics of the platinum-containing catalyst with the second structure include designing a catalyst microparticle which includes a microparticle and a platinum layer formed on a surface of the microparticle so that the above-described second effect, that is, a function of preventing absorption of carbon monoxide on a surface of the platinum layer formed on the microparticle is effectively exerted. In other words, the constituent element or structure of the microparticle is selected so that the microparticle effectively functions as a base layer. Moreover, the platinum layer is formed so that a whole surface, except for a part which contacts the carrier, thereby not allowing the platinum layer to be formed thereon, of the microparticle is covered with the platinum layer, and the area of the catalystic activity surface is increased as large as possible. At this time, the thickness of the platinum layer is a thickness at which the function of the microparticles as the base layer is effectively exerted. From working examples which will be described later, the platinum layer includes 4 to 6 platinum atomic layers.

Accordingly, in the platinum-containing catalyst of the disclosure, absorption of carbon monoxide at an active site of the surface of the platinum layer is prevented. As a result, oxidation of carbon monoxide on the platinum layer easily occurs, and carbon monoxide poisoning is reduced, and performance as an oxidation catalyst for hydrogen containing carbon monoxide or a carbon-containing fuel is improved.

Moreover, in the platinum-containing catalyst with the second structure of the disclosure, the platinum layer is formed on only the surface of the catalyst microparticle, so as in the case of the catalyst microparticles disclosed in PTL2 and PTL5, platinum use efficiency is high. However, in the platinum-containing catalyst of the disclosure, the thickness of the platinum layer is extremely thin, so compared to the catalyst microparticles described in PTL2 and PTL5, the amount of used rare and expensive platinum is allowed to be remarkably reduced, and a large cost reduction is achievable. Moreover, the surface of the microparticle is completely covered with the platinum layer, so a risk of eluting and losing an element such as ruthenium forming the microparticle is remarkably reduced, compared to the catalyst microparticles disclosed in PTL2 and PTL5, and the durability or environment resistance of the catalyst is improved.

The method of producing a platinum-containing catalyst with the second structure of the disclosure is a method allowed to manufacture a platinum-containing catalyst containing less foreign substances. As described above, in the step of synthesizing the microparticles, to stably disperse the microparticles and to prevent agglomeration or the like, it is necessary to include an anti-agglomeration agent in the reaction liquid. As disclosed in PTL2 and PTL5, when the step of forming the platinum layer is performed after the microparticles are synthesized while the microparticles are dispersed in the reaction liquid, the platinum layer is formed in a state where the anti-agglomeration agent or an impurity produced during the synthesis of the microparticles is adhered to the surfaces of the microparticles. For example, on the surface of the ruthenium particle in PTL5, a hydrogen molecule and the anti-agglomeration agent are adhered, and on the surface of the nanoparticle of PTL2, a carboxylic compound 105 (refer to FIG. 28) such as citric acid is adhered. The foreign substance adhered to the surface of the microparticle is an impediment to form a uniform platinum layer. This may be considered as a factor in the formation of the island-shaped platinum layer 102 in PTL2.

On the other hand, in the method of producing the platinum-containing catalyst with the second structure, before the platinum layer is formed, a step of absorbing the microparticles on the carrier is performed. Therefore, the anti-agglomeration agent is not necessary, and next to the step, the step of taking the microparticles supported by the carrier out of the reaction liquid, and washing the microparticles is performed. After the step of washing, the platinum layer is formed, so the platinum layer is allowed to be formed on the surface on which less foreign substances are adhered of the microparticle. Then, the formation of the platinum layer is performed by dripping the platinum salt-containing liquid and the reducing agent-containing liquid into the dispersion liquid containing the microparticles supported by the carrier while the deposition rate of platinum is optimally controlled. Accordingly, the whole surface of each of the microparticles is allowed to be covered with the platinum layer with a substantially uniform thickness, while the thickness of the platinum layer is controlled at an atomic layer level.

Additional features and advantages are described herein, and will be apparent from the following Detailed Description and the figures.

BRIEF DESCRIPTION OF THE FIGURES

FIG. 8 is an illustration of a relationship between the particle diameters of ruthenium nanoparticles and platinum-containing catalyst particles, the thickness of a platinum layer and the molar ratio of platinum and ruthenium and the output retention ratio of a fuel cell in working examples of the disclosure.

FIG. 17 is a sectional view (a) illustrating a configuration of a fuel cell and an enlarged sectional view (b) of an electrolyte membrane-electrode assembly (MEA) according to the above-described example embodiment of the disclosure.

FIG. 20 is an electron diffraction image of a Ru microparticle covered with Pt which is obtained in Working Examples 5 and 6 of the disclosure.

FIG. 21 is a graph (a) illustrating a particle diameter distribution of the Ru microparticles synthesized in Working Examples 5 to 8 of the disclosure and a graph (b) illustrating a particle diameter distribution of the Ru microparticles covered with Pt which is obtained in Working Example 6 of the disclosure.

FIG. 22 illustrates current density-voltage curves (a) and current density-output density curves (b) of fuel cells obtained in Working Examples 1 to 4 of the disclosure.

FIG. 23 illustrates current density-voltage curves (a) and current density-output density curves (b) of fuel cells obtained in Working Examples 5 to 8 of the disclosure.

FIG. 24 illustrates current density-voltage curves (a) and current density-output density curves (b) of fuel cells obtained in Working Examples 9 to 12 of the disclosure.

FIG. 26 illustrates current density-voltage curves (a) and current density-output density curves (b) of fuel cells obtained in Working Examples 16 to 19 of the disclosure.

FIG. 27 illustrates current density-voltage curves (a) and current density-output density curves (b) of fuel cells obtained in Comparative Examples 1 and 2 of the disclosure.

DETAILED DESCRIPTION

Figure 1:
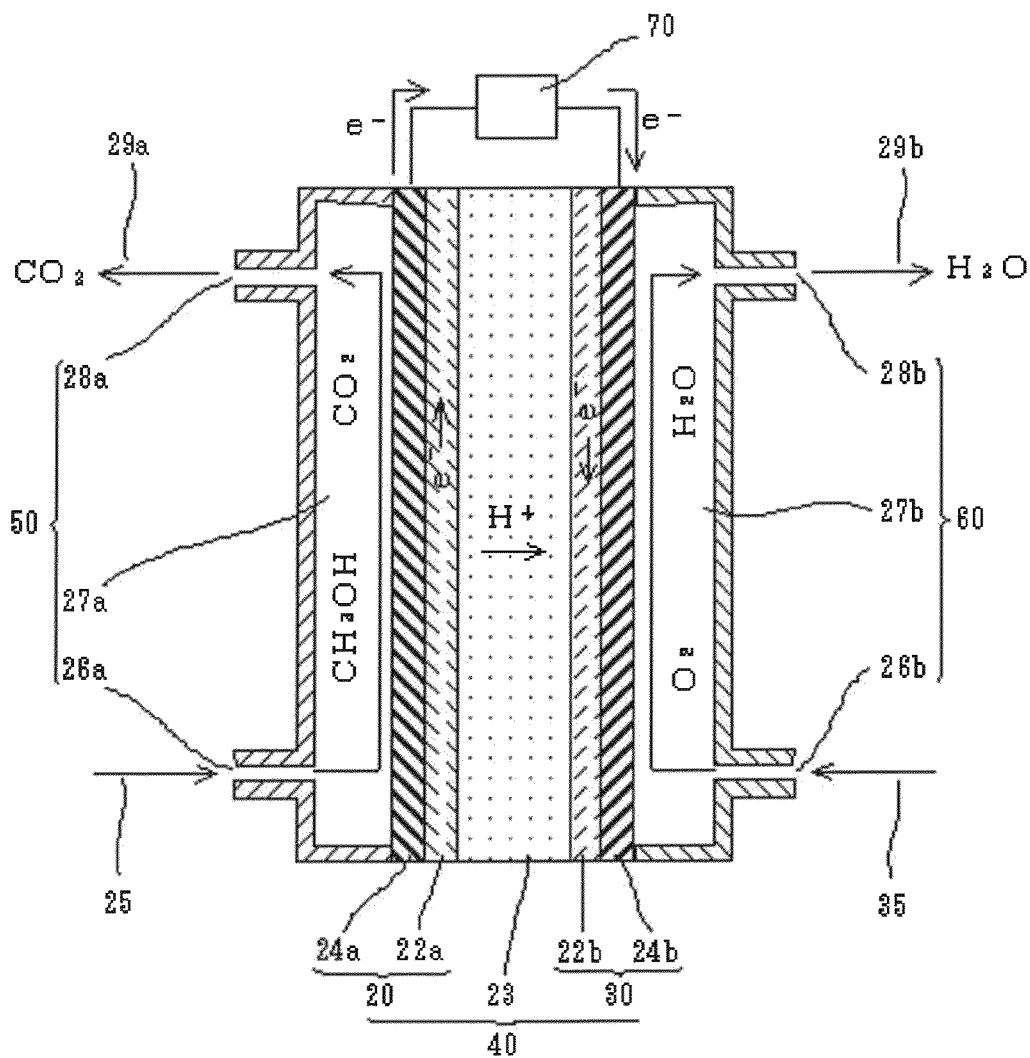
FIG. 1 is a sectional view describing a configuration of a DMFC according to an example embodiment of the disclosure.

The platinum-containing catalyst of the disclosure may have a structure in which the core particle includes a metal atom satisfying $E_{out} \geq 3.0$ eV, where average binding energy relative to the Fermi level of electrons in the 5d band of platinum present on an outermost surface of the shell layer is $E_{out}$. Such a structure enables to provide a platinum-containing catalyst which is allowed to reduce the amount of used platinum, have high resistance to CO poisoning and maintain high catalytic activity with less deterioration.

Moreover, the platinum-containing catalyst may have a structure in which $E_{int} \geq 4.0$ eV is satisfied, where average binding energy relative to the Fermi level of electrons in the 5d band of platinum present on an interface between the core particle and the shell layer is $E_{int}$. Such a structure enables to provide a platinum-containing catalyst which is allowed to have high resistance to CO poisoning and maintain high catalytic activity.

Further, the platinum-containing catalyst may have a structure satisfying $E_{out} \leq 4.5$ eV. Such a structure enables to provide a platinum-containing catalyst which is allowed to have high resistance to CO poisoning and maintain high catalytic activity.

Moreover, the platinum-containing catalyst may have a structure satisfying $E_{int} \leq 5.0$ eV. Such a structure enables to provide a platinum-containing catalyst which is allowed to have high resistance to CO poisoning and maintain high catalytic activity.

Further, the platinum-containing catalyst may have a structure in which $1.7 \leq (R_2/R_1) \leq 2.2$ is satisfied, where an average particle diameter of the metal particle is $R_2$. Such a structure enables to provide a platinum-containing catalyst which is allowed to reduce the amount of used platinum, have high resistance to CO poisoning and maintain high catalytic activity with less deterioration.

Moreover, the platinum-containing catalyst may have a structure satisfying $2.2$ nm $\leq R_2 \leq 4$ nm. Such a structure enables to provide a platinum-containing catalyst which is allowed to reduce the amount of used platinum, have high resistance to CO poisoning and maintain high catalytic activity with less deterioration.

Further, the platinum-containing catalyst may have a structure in which the core particle is configured of a ruthenium particle. Such a structure enables to provide a platinum-containing catalyst which is allowed to reduce the amount of used platinum, have high resistance to CO poisoning and maintain high catalytic activity.

Moreover, the platinum-containing catalyst may have a structure in which $3.5 \leq \gamma \leq 9.0$ is satisfied, where a molar ratio of platinum forming the shell layer to ruthenium is $\gamma$. Such a structure enables to provide a platinum-containing catalyst which is allowed to have high resistance to CO poisoning and maintain high catalytic activity with less deterioration.

Further, the platinum-containing catalyst may have a structure in which the core particle is configured of one of a cobalt particle, an iron particle, a nickel particle and a copper particle. Such a structure enables to provide a platinum-containing catalyst which is allowed to have high resistance to CO poisoning and maintain high catalytic activity with less deterioration.

Moreover, the platinum-containing catalyst may have a structure in which the core particle is configured of an alloy particle of nickel or copper and ruthenium. Such a structure enables to provide a platinum-containing catalyst which is allowed to have high resistance to CO poisoning and maintain high catalytic activity with less deterioration.

The electrochemical device of the disclosure may be configured as a fuel cell including a platinum-containing catalyst with a first structure as an anode catalyst. Such a structure enables to provide a fuel cell which is allowed to reduce the amount of used platinum, have a good output retention ratio with less deterioration and reduce the price thereof.

Moreover, the above-described fuel cell may be configured as a direct methanol fuel cell. Such a structure enables to provide a direct methanol fuel cell which is allowed to use a small amount of platinum and have good output characteristics with less deterioration.

Further, the above-described fuel cell may have a configuration in which the output density at a current density of 300 mA/cm$^2$ is 70 mW/cm$^2$ or over. Such a configuration enables to achieve a direct methanol fuel cell which has a sufficiently practical level of output density and a high output retention ratio of approximately 90% or over and good durability.

Moreover, the above-described direct methanol fuel cell may have a configuration in which the output retention ratio after 800-hour continuous power generation is 90% or over. Such a configuration enables to provide a direct methanol fuel cell having good output characteristics with less deterioration.

In the platinum-containing catalyst with the second structure of the disclosure, the platinum layer may be formed with a substantially uniform thickness. Herein, "substantially uniform thickness" means that the number of stacked platinum atomic layers forming the platinum layer is controlled at atomic layer level so as to fall in a range of, for example, approximately ±1 layer on average, except for variations due to an incidental accident such as contact between microparticles or local variations in a region with extremely different deposition conditions such as a contact section between a microparticle and a carrier. As described above, the second effect is effectively developed when the number of stacked platinum atomic layers is up to 4 to 6. Therefore, the thickness of the platinum layer is preferably controlled at atomic layer level so as to fall in a most preferable number of stacked platinum atomic layers of approximately ±1. At this time, an average thickness of the platinum layer may be 1.0 nm or less (equivalent to 4 or less platinum atomic layers), and in particular, the number of stacked platinum atomic layers forming the platinum layer may be 3 or less on average. Note that when the thickness of the platinum layer is represented by the number of stacked platinum atomic layers, the thickness of one platinum atomic layer is approximately 0.21 nm to 0.23 nm, where the metal bond radius of platinum is 0.139 nm, or as will be described later, the thickness of one platinum atomic layer is $a_0/\sqrt{3}=0.2265$ nm $(=d_{111})$, where the lattice constant of a simple substance of platinum is $a_0=0.39231$ nm (the same applies hereinafter).

Moreover, the average particle diameter of the microparticle may be 4.4 nm or less.

Further, an element forming the microparticle may be one or more kinds of metal elements selected from the group consisting of ruthenium (Ru), molybdenum (Mo), tungsten (W), osmium (Os), iridium (Ir), chromium (Cr), manganese (Mn), copper (Cu), iron (Fe), cobalt (Co), nickel (Ni) and tin (Sn), the element is preferably cobalt, iron, nickel, copper or ruthenium.

Moreover, the carrier may be made of a conductive carbon material.

In a method of producing the platinum-containing catalyst with the second structure of the disclosure, the thickness of the platinum layer may be controlled by adjusting the amounts of a platinum salt-containing liquid and/or a reducing agent-containing liquid to be dripped.

Further, a solution formed by dissolving ruthenium salt in ethylene glycol may be heated to produce ruthenium microparticles as microparticles. At this time, the solution containing ruthenium salt may be rapidly heated to 120° C. to 170° C. for 1 to 40 minutes, and rapid heating may be performed with use of a microwave heating apparatus.

The electrochemical device of the disclosure may be configured as a fuel cell including the platinum-containing catalyst with the second structure as an anode catalyst. In particular, the electrochemical device may be configured as a direct methanol fuel cell.

An example embodiment of the disclosure will be described in detail below referring to the accompanying drawings.

In the following descriptions, the thickness of one platinum atomic layer is $a_0/\sqrt{3}=0.2265$ nm $(=d_{111})$, where the lattice constant of the simple substance of platinum is $a_0=0.39231$ nm.

Configuration of Platinum-Containing Catalyst with a Core-Shell Structure

The present disclosure relates to a platinum-containing catalyst including a core metal particle (in the following descriptions, the core metal particle may be simply referred to as "core particle") made of an element except for platinum and a shell layer of platinum formed on a surface of the core metal particle.

It is known that in an alloy catalyst including platinum, catalytic activity is reduced by an intermediate such as carbon monoxide. For example, it is considered that a reduction in catalytic activity in methanol oxidization is caused mainly by formation of a bond of a 5d electron around the Fermi level of platinum on a surface with carbon monoxide which is an intermediate in methanol oxidation.

In the disclosure, it is found out that based on a result of a first-principles calculation based on density functional theory, an electronic state of platinum on an outermost layer (an outermost surface) of a platinum shell layer is allowed to be changed by a combination of an element forming a core particle and platinum forming the shell layer in a core-shell type platinum-containing catalyst, and further by a change in the number of stacked platinum atomic layers forming the shell layer, and the electronic state of platinum on the outermost layer is allowed to be in a desirable state for maintaining high catalytic activity.

It is considered that a reduction in catalytic activity is caused by absorbing, for example, carbon monoxide which is an intermediate in methanol oxidation on platinum to form a bond. It is considered that the reduction in catalytic activity is controlled by a bond between platinum present on the outermost surface of the platinum shell layer and carbon monoxide; therefore, it is considered that when the electronic state of platinum present on the outermost surface of the platinum shell layer is prevented from being brought to a state where absorption of carbon monoxide is stabilized, the reduction in catalytic activity is preventable.

To prevent the reduction in catalytic activity, it is not always necessary to alloy platinum, and in the case where the platinum shell layer of the core-shell type platinum-containing catalyst is thin, a reduction in catalytic activity is preventable by interacting a platinum atom of the shell layer and a core metal atom (which may be hereinafter simply referred to "core atom", and means an atom forming the core particle) of the core particle made of a specific element with each other to change the electronic state of platinum of the shell layer, thereby deeply binding an electron in the 5d orbital of platinum by a bond with the core atom.

In other words, the electronic state in the 5d orbital of platinum is changed by an interaction between the platinum atom of the shell layer and the core atom, and the average binding force (average binding energy) relative to the Fermi level of Pt 5d electrons exceeds the 5d electron binding force of platinum in a catalyst made of a simple substance of platinum, so a strong Pt—CO bond is less likely to be formed, and the catalyst has high resistance to CO poisoning. Hereinafter the average binding energy (vs. d-band center) of Pt 5d electrons is simply referred to "Pt 5d electron binding force" or "5d electron binding force".

A core atom is evaluated based on the average binding energy of Pt 5d electrons relative to the Fermi level obtained by an electronic state calculation of platinum formed on the surface of the core particle, and a specific preferable element as the core atom except for platinum is selected. The absorption of the intermediate (carbon monoxide) is preventable by a thin shell layer (platinum layer) configured of one to four platinum atomic layers formed on the surface of such a core particle, and high catalytic activity is allowed to be maintained with less deterioration.

As will be described later, it is confirmed from a comparison between a calculation result by the first-principles calculation and an experimental result of an output retention ratio of a fuel cell that in order to maintain high catalytic activity with less deterioration, the 5d electron binding force of platinum present on an outermost surface of the platinum shell layer is increased to higher than the 5d electron binding force of platinum in the catalyst made of a simple substance of platinum; therefore, a strong Pt—CO bond is less likely to be formed, and the catalyst has high resistance to CO poisoning.

It is considered that the 5d electron binding force of platinum present on the outermost surface of the platinum shell layer is increased, because a bond between a core atom and a platinum atom is formed by contact between the core metal particle and platinum of the platinum shell layer, and the influence of the bond is exerted on the surface of the platinum shell layer in a chain reaction. Therefore, the platinum-containing catalyst preferably has a structure in which the average binding energy of electrons in the 5d band of platinum present on an interface between the core metal atom and the platinum shell layer is increased, because the platinum-containing catalyst has high resistance to CO poisoning, and it is advantageous to improve catalytic activity.

The platinum-containing catalyst of the disclosure does not have a structure in which a non-platinum metal element and platinum are alloyed, but has a core-shell type structure including a thin platinum layer on a surface thereof; therefore, when a kind of core metal atom which allows the electronic state of platinum of the shell layer to be changed by an interaction between the platinum atom of the shell layer and the core atom is selected, a reduction in catalytic activity is preventable, and the amount of used platinum is allowed to be reduced more than that in related art. Therefore, a long-life platinum-containing catalyst which is allowed to achieve compatibility between a reduction in the amount of used platinum and the maintenance of catalytic activity and to reduce its cost is allowed to be provided.

The platinum-containing catalyst of the disclosure is suitably used as a fuel electrode catalyst of a fuel cell which is allowed to achieve high power generation efficiency, and the platinum-containing catalyst includes nanoparticles with a core-shell structure each including a core particle made of metal except for platinum and a shell layer configured of 1 to 4 platinum atomic layers formed on a surface of the core particle so as to form a strong bond between a core atom and platinum. The core particle may be made of not only a simple substance but also an alloy; however, the core particle is preferably made of a simple substance of ruthenium. Note that in the following descriptions, the nanoparticle means a particle with an average diameter of 10 nm or less.

The core-shell type platinum-containing catalyst of the disclosure includes a core particle made of a non-Pt element and a platinum shell layer made of a platinum atom formed on a surface of the core particle. In the case where the average thickness $T_s$ (nm) of the platinum shell layer satisfies $0.25$ nm$\leq t_s \leq 0.9$ nm, the core particle is made of an element satisfying $3.0$ eV$\leq E_{out} \leq 4.5$ eV, where the average binding energy (eV) of electrons in the 5d orbital of platinum present on an outermost surface of the platinum shell layer is $E_{out}$.

The average binding energy $E_{int}$ (eV) of electrons in the 5d orbital of platinum present on an interface between the core particle and the platinum shell layer is preferably $4.0$ eV$\leq E_{int}$. Moreover, $4.0$ eV$\leq E_{int} \leq 5.0$ eV and $3.0$ eV$\leq E_{out} \leq 4.5$ eV are preferable.

Moreover, it is preferable to satisfy $1.0$ nm$\leq R_1 \leq 2.6$ nm, $2.2$ nm$\leq R_2 \leq 4.4$ nm, $1.7 \leq (R_2/R_1) \leq 2.2$ and $3.5 \leq \gamma \leq 9.0$, where the average particle diameter of the core metal particle is $R_1$, the average particle diameter of a core-shell type platinum-containing catalyst particle (hereinafter may be simply referred to as "core-shell particle") is $R_2$, and the molar ratio of platinum to the element forming the core metal particle is $\gamma$.

Further, in a DMFC using a core-shell type platinum-containing catalyst including a Ru particle as a core particle as an anode catalyst, the output density is 70 mW/cm² or over at a current density of 300 mA/cm², and is in a sufficiently practical level, and the output retention ratio is 90% or over even after a lapse of 800 hours. Therefore, the core-shell type platinum-containing catalyst is allowed to maintain extremely high catalytic activity for a long time.

Note that the strength of the bond between the core atom and platinum is evaluated by the average binding energy relative to the Fermi level of Pt 5d electrons by a first-principles calculation (of which a calculation model and calculation method will be described in detail later) based on density functional theory.

The core atom is evaluated based on the average binding energy relative to the Fermi level of Pt 5d electrons which is obtained by an electronic state calculation of platinum of the shell layer, and a specific preferable element is selected; however, the crystal structure of a simple substance forming the core particle is preferably a hexagonal close-packed structure or a face-centered cubic structure.

As the atom forming the core particle, a simple substance of a lanthanoid except for scandium (Sc), titanium (Ti), manganese (Mn), cobalt (Co), nickel (Ni), copper (Cu), zinc (Zn), cadmium (Cd), yttrium (Y), zirconium (Zr), ruthenium (Ru), rhodium (Rh), palladium (Pd), silver (Ag), hafnium (Hf), rhenium (Re), osmium (Os), iridium (Ir), gold (Au) and europium (Eu), and an alloy of transition metal atoms thereof are considered.

A useful metal element forming the core particle is an element allowing the Pt 5d electron binding force to exceed the 5d electron binding force of platinum in a catalyst made of a simple substance of platinum by changing the electronic state of platinum by an electronic effect (a ligand effect) caused by arranging the platinum atom of the platinum shell layer and the core atom adjacent to each other.

More specifically, Ru is most useful as the metal element forming the core particle. Moreover, the core particle may be made of an alloy, and as in the case of Ru, it is considered that an alloy including an element which allows the Pt 5d electron binding force to exceed the 5d electron binding force of platinum in the catalyst made of the simple substance of platinum is useful, and examples of such an alloy include RuTi, RuZr, RuHf, RuV, RuNb, RuTa, RuMo, RuW, RuFe, RuNi, RuCu and RuCo all of which include Ru as a main component.

Method of Producing Platinum-Containing Catalyst with Core-Shell Structure

Method of Producing Core Particles

As a method of producing core particles forming the platinum-containing catalyst, a method of heating a solution formed by dissolving metal salt in ethylene glycol is used. At this time, the solution containing metal salt is preferably heated rapidly to 120° C. to 170° C. for 1 to 40 minutes, and rapid heating is preferably performed with use of a microwave heating apparatus.

For example, when the temperature of the solution is increased to 170° C. with use of the microwave heating apparatus, and then the temperature of the solution is kept at 170° C. for 1 hour, ruthenium (III) ions are reduced by ethylene glycol to produce a dispersion liquid containing ruthenium nanoparticles, and when a time for increasing the temperature of the solution to 170° C. is controlled, the average particle diameter of the produced ruthenium nanoparticles are controllable.

In the following descriptions, the case where a core particle forming the platinum-containing catalyst is made of the simple substance of ruthenium is described as an example.

Ruthenium salt such as ruthenium (III) chloride ($RuCl_3$) is dissolved in ethylene glycol to prepare an ethylene glycol solution containing ruthenium (III) ions. Next, an aqueous sodium hydroxide solution is added to the solution, and while the solution is stirred well, the temperature of the solution is increased to 170° C., and then is kept at 170° C. At this time, the ruthenium (III) ions are reduced by ethylene glycol to obtain the dispersion liquid containing ruthenium nanoparticles.

When the temperature of the dispersion liquid is increased to 120° C. to 170° C. for 1 to 40 minutes by the microwave heating apparatus or the like, ruthenium nanoparticles with an average particle diameter of 1.4 nm to 4.6 nm are allowed to be synthesized. For example, when the temperature of the dispersion liquid is increased to 170° C. for 15 minutes, ruthenium nanoparticles with an average particle diameter of 1.9 nm are allowed to be synthesized.

Absorption of Ruthenium Nanoparticles to Carrier

Next, a carrier made of a conductive carbon material such as a carbon black is mixed in a reaction liquid formed by a synthesis reaction of the ruthenium nanoparticles to absorb the ruthenium nanoparticles on the carrier. Next, the ruthenium nanoparticles supported by the carrier are separated and removed from the reaction liquid by a centrifugal separator or the like, and the ruthenium nanoparticles are washed with ion-exchange water or the like. After that, as will be described below, the platinum layer is formed so that the surface of each of the ruthenium nanoparticles is covered with the platinum layer.

Formation of Platinum Layer on Ruthenium Nanoparticle

When a platinum-salt containing liquid such as chloroplatinic acid and a reducing agent-containing liquid such as sodium tetrahydroborate are dripped in the dispersion liquid containing the ruthenium nanoparticles, the platinum layer is formed so that the whole surface of each of the ruthenium nanoparticles is covered with the platinum layer. In this method, when the drip rates of the platinum salt-containing liquid and the reducing agent-containing liquid are controlled, the deposition rate of platinum on the surfaces of the ruthenium nanoparticles is optimally controllable, and the average thickness of the platinum layer is controllable.

For example, the drip rates of the platinum salt-containing liquid and the reducing agent-containing liquid are controllable by putting the platinum salt-containing liquid and the reducing agent-containing liquid into respective syringes, and controlling the syringes by a syringe pump. As long as the drip rates are not too fast, there is no issue. Too fast drip rates are allowed to be confirmed by an electron microscope, because platinum is not deposited on the ruthenium nanoparticles and is deposited independently; therefore, the ranges of the drip rates in which platinum is deposited on the surfaces of the ruthenium nanoparticles and is not deposited independently are confirmed by an electron microscope in advance.

The platinum-containing catalyst supported by the carrier is allowed to be produced by a sequential reduction method in the above manner; however, as will be described later, the platinum-containing catalyst may be produced by a simultaneous reduction method.

Method of Evaluating Thickness (Number of Stacked Platinum Atomic Layers) of Shell Layer The average particle diameter $R_1$ of the core particle and the average particle diameter $R_2$ of the platinum-containing catalyst particle are determined by evaluating the diameters of the core particles and the diameters (equivalent to the outer diameter of the shell layer) of the platinum-containing catalyst particles by an SEM image (Scanning Electron Microscopy image) or a TEM image (Transmission Electron Microscopy image), and then the average thickness of the shell layer of the produced platinum-containing catalyst is determined by a difference $((R_2-R_1)/2)$ between the average particle diameter $R_1$ of the core particle and the average particle diameter $R_2$ of the platinum-containing catalyst particle. The number of stacked platinum atomic layers is determined by dividing the average thickness of the platinum layer by the interplanar spacing ($d_{111}=0.2265$ nm) of platinum.

Moreover, the average thickness (the number of stacked platinum atomic layers) of the platinum layer as the shell layer is allowed to be determined with use of two average particle diameters of the core particle and the platinum-containing catalyst particle which are determined by a line analysis in diameter directions of the core particle and the platinum-containing catalyst particle by TEM-EDX (Transmission Electron Microscopy-Energy Dispersive X-ray Spectroscopy) or TEM-EDX (Transmission Electron Microscopy-Energy Dispersive X-ray Spectroscopy).

Fuel Cell Using Platinum-Containing Catalyst

FIG. 1 is a sectional view describing a configuration of a DMFC according to an example embodiment of the disclosure.

As illustrated in FIG. 1, an aqueous methanol solution as a fuel 25 flows from an inlet 26a of a fuel supply section (separator) 50 having a flow path to a path 27a, and flows through a conductive gas diffusion layer 24a as a base to reach a catalyst electrode 22a held by the gas diffusion layer 24a, and methanol and water react with each other on the catalyst electrode 22a according to the above-described anode reaction to produce hydrogen ions, electrons and carbon dioxide, and an exhaust gas 29a including carbon dioxide is emitted from an outlet 28a.

The produced hydrogen ions pass through a polymer electrolyte membrane 23 made of a proton-conductive composite electrolyte, and the produced electrons pass through the gas diffusion layer 24a, an external circuit 70 and a conductive gas diffusion layer 24b which is a base to reach a catalyst electrode 22b held by the gas diffusion layer 24b.

As illustrated in FIG. 1, air or oxygen 35 flows from an inlet 26b of an air or oxygen supply section (separator) 60 having a flow path to a path 27b, and passes through the gas diffusion layer 24b to reach the catalyst electrode 22a held by the gas diffusion layer 24b, and hydrogen ions, electrons and oxygen react with one another on the catalyst electrode 22b according to the above-described cathode reaction to produce water, and an exhaust gas 29b including water is emitted from an outlet 28b. The above reactions are included in a methanol combustion reaction in which electrical energy is produced from methanol and oxygen, and water and carbon dioxide are produced.

The polymer electrolyte membrane 23 is made of a proton-conducting electrolyte. An anode 20 and a cathode 30 are separated by the polymer electrolyte membrane 23, and hydrogen ions or water molecules are transferred through the polymer electrolyte membrane 23. The polymer electrolyte membrane 23 is a film with high hydrogen ion conductivity, and the polymer electrolyte membrane 23 preferably has chemical stability and high mechanical strength.

The catalyst electrodes 22a and 22b each form a conductive base which is a current collector, and are formed so as to be adhered on the gas diffusion layers 24a and 24b having permeability to a gas or a solution. The gas diffusion layers 24a and 24b each are configured of a porous base such as a carbon paper, a carbon compact, a carbon sintered compact, sintered metal, foam metal. To prevent a decline in gas diffusion efficiency due to water produced by the drive of a fuel cell, the gas diffusion layers 24a and 24b are subjected to a water-repellent process with a fluorocarbon resin or the like.

The catalyst electrodes 22a and 22b are formed by binding a carrier supporting the catalyst by the proton-conducting polymer electrolyte. As the carrier, for example, carbon such as acetylene black or graphite, an inorganic microparticle such as alumina or silica is used. The gas diffusion layers 24a and 24b are coated with a solution formed by dispersing carbon particles (supporting catalyst metal) in an organic solvent in which the proton-conducting polymer electrolyte is dissolved, and the organic solvent is evaporated to form film-shaped catalyst electrodes 22a and 22b bound by the proton-conducting polymer electrolyte.

The polymer electrolyte membrane 23 is sandwiched between the catalyst electrodes 22a and 22b formed so as to be adhered on the gas diffusion layers 24a and 24b, respectively, thereby forming a membrane-electrode assembly (MEA) 40. The anode 20 is configured of the catalyst electrode 22a and the gas diffusion layer 24a, and the cathode 30 is configured of the catalyst electrode 22b and the gas diffusion layer 24b. The catalyst electrodes 22a and 22b and the polymer electrolyte membrane 23 are bonded together, and in a bonded interface thereof, high hydrogen ion conductivity is maintained, and electrical resistance is maintained low.

In the example illustrated in FIG. 1, openings of the inlet 26a of the fuel 25, the outlet 28a of the exhaust gas 29a, the inlet 26b of air or oxygen ($O_2$) 35 and the outlet 28b of the exhaust gas 29b are positioned in a direction perpendicular to surfaces of the polymer electrode membrane 23 and the catalyst electrodes 22a and 22b; however, the above-described openings may be positioned in a direction parallel to the surfaces of the polymer electrolyte membrane 23 and the catalyst electrodes 22a and 22b, and the positions of the above-described openings may be variously modified.

The fuel cell illustrated in FIG. 1 is allowed to be manufactured by a typical method known in various literatures, so the manufacturing method will not be described in detail.

Platinum-Containing Catalyst and Method of Producing the Same

An example of the platinum-containing catalyst and an example of a method of producing the platinum-containing catalyst will be described below.

Figure 15:
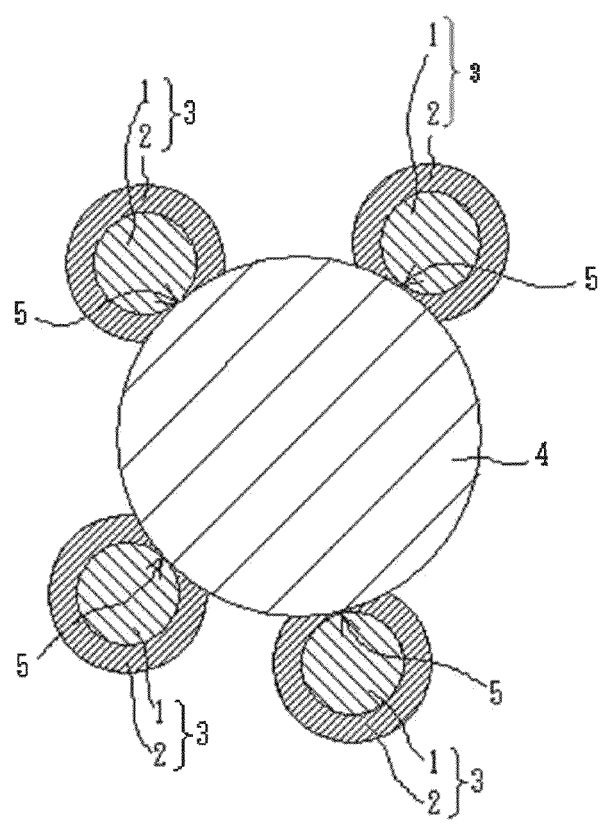
FIG. 15 is a schematic sectional view illustrating a structure of a platinum-containing catalyst according to an example embodiment of the disclosure.

FIG. 15 is a schematic sectional view illustrating a structure of the platinum-containing catalyst according to the example embodiment. In the platinum-containing catalyst, microparticles 1 such as Ru microparticles are supported by a carrier (a conductive carrier) 4 such as carbon black, and a platinum layer 2 is formed so that a whole surface of each of the microparticles 1 except for a contact section 5 with the carrier 4 is covered with the platinum layer 2. Catalyst microparticles 3 each configured of the microparticle 1 and the platinum layer 2 has catalysis. As the microparticles 1 are supported by the carrier 4, agglomeration of the catalyst microparticles 3 is prevented; therefore, a high specific surface area is maintained. A characteristic of the platinum-containing catalyst illustrated in FIG. 15 is that the microparticles 2 are designed so as to effectively develop the above-described second effect, that is, an effect of preventing absorption of carbon monoxide on surfaces of the platinum layers 2 formed thereon. The characteristic will be described below.

The constituent element or configuration of the microparticles 1 is selected so that the microparticles 1 function as base layers preventing absorption of carbon monoxide on the surfaces of the platinum layers 2 formed thereon. For example, the element forming the microparticles 1 is preferably one or more kinds of metal elements selected from the group consisting of ruthenium (Ru), molybdenum (Mo), tungsten (W), osmium (Os), iridium (Ir), chromium (Cr), manganese (Mn), iron (Fe), cobalt (Co), nickel (Ni) and tin (Sn), and specifically, ruthenium is preferable.

The average particle diameter of the microparticles 1 is preferably 4.4 nm or less. As the thickness of each platinum layer 2 is extremely thin, the particle diameter of each catalyst microparticle 3 covered with the platinum layer 2 is greatly affected by the particle diameter of the microparticle 1. Microparticles such as the catalyst microparticles 3 are preferable, because the smaller the particle diameter is, the more the specific surface area is increased, and the more the amount of used ruthenium is reduced. As will be described in working examples, in the case where the average particle diameter of the microparticle 1 is 4.4 nm or less, a DMFC including the platinum-containing catalyst is allowed to achieve a larger output density than a DMFC including a platinum-ruthenium alloy catalyst in related art.

The platinum layer 2 is formed so that the area of a catalytic activity surface is increased as large as possible and the whole surface of the microparticle 1 except for the contact section 5 where the platinum layer 2 is not allowed to be formed is covered with the platinum layer 2. In the case where the first effect by the bi-functional mechanism is emphasized, the whole microparticle 1 is covered with the platinum layer 2, a carbon monoxide oxidation function is not allowed to be exerted, and carbon monoxide poisoning is serious, thereby causing inconvenience. In this point, the platinum-containing catalyst of the example embodiment is different from platinum-containing catalysts based on the bi-functional mechanism disclosed in PTL2 and PTL5.

On the other hand, to effectively develop the second effect, the average thickness of the platinum layer 2 is equivalent to approximately 4 to 6 platinum atomic layers at most, and is obvious from working examples which will be described later that the average thickness of the platinum layer 2 is preferably 1.0 nm (equivalent to four platinum atomic layers) or less, and specifically preferably the average number of stacked platinum atomic layers is 3 or less. Therefore, the thickness (the number of stacked platinum atomic layers) of the platinum layer 2 is controlled at atomic layer level so as to fall in an optimum range of approximately ±1 layer.

As a result, in each catalyst microparticle 3, absorption of carbon monoxide on an active site of the surface of the platinum layer 2 is prevented. Accordingly, oxidation of carbon monoxide on the platinum layer 2 easily occurs, and carbon monoxide poisoning is reduced, and performance of the catalyst particle 3 as an oxidation catalyst for hydrogen containing carbon monoxide or a carbon-containing fuel is improved.

Moreover, in the catalyst microparticle 3, the platinum layer 2 is formed only on the surface, so platinum use efficiency is high. However, in the catalyst microparticle 3, the thickness of the platinum layer 2 is extremely thin, so compared to the catalyst microparticles disclosed in PTL2 and PTL5, the amount of used rare and expensive platinum is remarkably reduced, and large cost reduction is allowed to be achieved. Moreover, as the surface of the microparticle 1 is completely covered with the platinum layer 2, a risk of eluting and losing an element such as ruthenium forming the microparticle 1 is remarkably reduced, compared to the catalyst microparticles disclosed in PTL2 and PTL5, and durability or environment resistance of the catalyst is improved.

The carrier 4 may be made of a conductive carbon material such as carbon black. In this case, the whole platinum-containing catalyst has conductivity, so the platinum-containing catalyst is suitable as an electrode catalyst.

Figure 16:
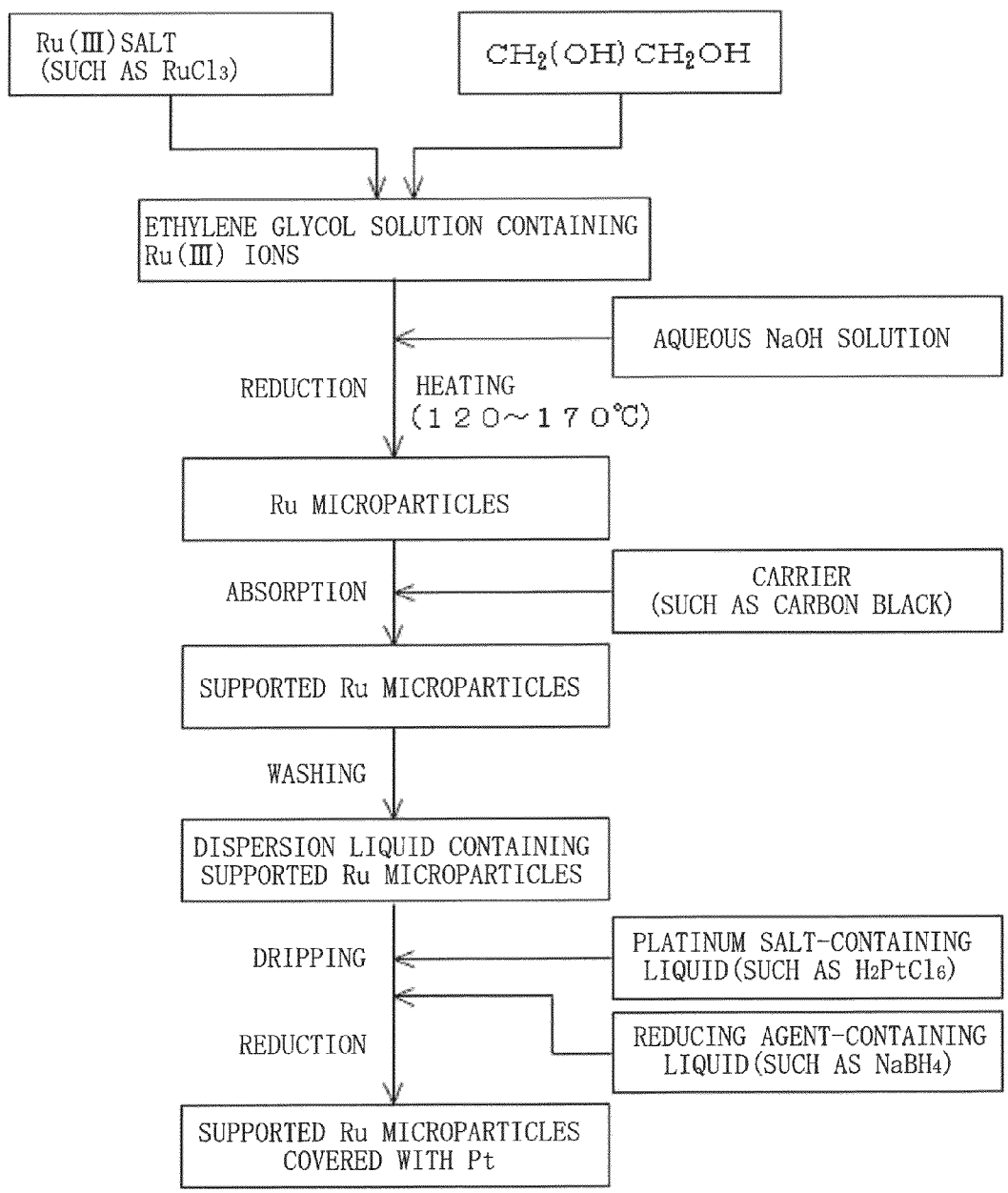
FIG. 16 is a flow chart illustrating steps of producing the platinum-containing catalyst according to the above-described example embodiment of the disclosure.

FIG. 16 is a schematic sectional view illustrating a flow of the method of producing the platinum-containing catalyst according to the example embodiment. In this case, an example in which the material forming the microparticle 1 (core particle) is metal ruthenium will be described below.

First, ruthenium salt such as ruthenium (III) chloride ($RuCl_3$) is dissolved in ethylene glycol to prepare an ethylene glycol solution containing Ru (III) ions. Next, an aqueous sodium hydroxide solution is added to the solution, and while the solution is stirred well, the temperature of the solution is increased to 170° C., and then is maintained at 170° C. At this time, the Ru (III) ions are reduced by ethylene glycol to obtain a dispersion liquid containing the Ru microparticles 1. Ethylene glycol also serves as an anti-agglomeration agent for preventing agglomeration and stably maintaining the ruthenium microparticles 1 until the ruthenium microparticles 1 are absorbed on the carrier 4.

Moreover, as will be described later in the working examples, the Ru microparticles 1 with an average particle diameter of 1.4 nm to 3.5 nm are allowed to be synthesized by rapidly increasing the temperature of the solution to 120° C. to 170° C. for 1 to 40 minutes with use of a microwave heating apparatus. For example, when the temperature of the solution is increased for 15 minutes, the Ru microparticles 1 with an average particle diameter of 1.9 nm are allowed to be synthesized, and the standard deviation of the average particle diameter at this time is 0.4 nm, so the Ru microparticles 1 with a uniform particle diameter are allowed to be synthesized.

Next, the carrier 4 made of a conductive carbon material such as carbon black is mixed with a reaction liquid formed after a synthesis reaction to absorb the Ru microparticles 1 on the carrier 4. Next, the Ru microparticles 1 supported by the carrier 4 are taken out of the reaction liquid with use of a centrifugal separator or the like, and the Ru microparticles 1 are washed with ion-exchange water or the like. After that, the platinum layers 2 with which the Ru microparticles 1 are covered are formed.

One characteristic of the producing method is that before the formation of the platinum layers 2, the Ru microparticles 1 are absorbed on the carrier 4 and washed. A foreign substance adhered to the Ru microparticles 1 interferes with the formation of the uniform platinum layers 2. In this method, the Ru microparticles 1 are absorbed on the carrier 4, so at a stage of forming the platinum layer 2, the anti-agglomeration agent is not necessary, and the Ru microparticles 1 are washed to be turned into a clean state where the adhered foreign substance is reduced.

Next, the whole surface of each Ru microparticle 1 except for the contact section 5 is covered with the platinum layer 2 by dripping the platinum salt-containing liquid such as chloroplatinic acid and the reducing agent-containing liquid such as sodium tetrahydroborate into the dispersion liquid containing the Ru microparticles 1 supported by the carrier 4. In this method, when the drip rates of the platinum salt-containing liquid and/or the reducing agent-containing liquid are controlled, the deposition rate of platinum is optically controllable. As a result, while a difference in deposition rate of platinum due to a difference in position is reduced, the whole surfaces of the Ru microparticles 1 are allowed to be covered with the platinum layers 2 with a substantially uniform thickness at atomic layer level. Moreover, the thickness of the platinum layer 2 is controllable by adjusting the amounts of the platinum salt-containing liquid and/or the reducing agent-containing liquid to be dripped.

The producing method is a method in the case where the microparticles 1 are the Ru microparticles; however, even in the case where the microparticles 1 are made of a material other than ruthenium, the platinum-containing catalyst is allowed to be produced only by changing a reactant, a solvent and reaction conditions for producing the microparticles 1 without changing main steps relating to the disclosure such as formation of the platinum layer 2.

Fuel Cell Using Platinum-Containing Catalyst

A fuel cell as examples of an electrode and an electrochemical device of the disclosure will be described below.

FIG. 17 is a schematic sectional view (a) illustrating a configuration of a PEFC-type fuel cell configured as a DMFC and an enlarged sectional view (b) of an electrolyte membrane-electrode assembly (MEA) 114. In the fuel cell illustrated in FIG. 17, an anode 112 and a cathode 113 are bonded to both surfaces of a proton-conducting polymer electrolyte membrane 111 such as Nafion (a registered trademark ® of Du Pont) to form the electrolyte membrane-electrode assembly (MEA) 114. As illustrated in FIG. 17(b), in the anode 112, an anode catalyst layer 112b made of a mixture of the platinum-containing catalyst according to the disclosure and a proton conductor such as Nafion® is formed on a surface of a conductive porous support 112a such as a carbon sheet or carbon cloth. Moreover, in the cathode 113, a cathode catalyst layer 113b made of a mixture of platinum, a platinum alloy or the like as a catalyst and a proton conductor such as Nafion® is formed on a surface of a conductive porous support 113a such as a carbon sheet or carbon cloth.

The electrolyte membrane-electrode assembly (MEA) 114 is sandwiched between an upper-half cell section 117 and a lower-half cell section 118, and is incorporated in the fuel cell illustrated in FIG. 17. A fuel supply tube 119 and an oxygen (air) supply tube 120 are arranged in the upper-half cell section 117 and the lower-half cell section 118, respectively, and in general, methanol as a low-concentration or high-concentration aqueous solution is supplied from the fuel supply tube 119, and oxygen or air is supplied from the oxygen (air) supply tube 120.

The aqueous methanol solution and oxygen (or air) are supplied to the anode 112 and the cathode 113 through a fuel supply section 115 and an oxygen supply section 116 both having a vent (not illustrated). The fuel supply section 115 also has a function of electrically connecting the anode 112 to the upper-half cell section 117, and the oxygen supply section 116 also has a function of electrically connecting the cathode 113 to the lower-half cell section 118. The upper-half sell section 117 and the lower-half cell section 118 each include a terminal 121 for connection to an external load.

The membrane-electrode assembly (MEA) 114 is sandwiched between a retainer plate made of gold-plated stainless steel having a fuel supply opening as the fuel supply section 115 and a retainer plate made of gold-plated stainless steel having an air inlet as the oxygen supply section 116 to form a single cell of the fuel cell illustrated in FIG. 17. At this time, the anode 112 and the cathode 113 are prevented from being short-circuited by a Teflon (a registered trademark) film.

In the fuel cell illustrated in FIG. 17, methanol as a fuel is oxidized into carbon dioxide in the anode catalyst layer 112b as represented by the above-described formula (a). Hydrogen ions produced at this time are transferred to the cathode side through the proton-conducting polymer electrolyte membrane 111 separating the anode 112 and the cathode 113 from each other to react with oxygen in the cathode catalyst layer 113b, thereby producing water as represented by the above-described formula (b).

These are descriptions of the example embodiment.

WORKING EXAMPLES

In working examples described below, a core-shell type platinum-containing catalyst including a core particle made of ruthenium with an average particle diameter of 1.4 nm to 3.5 nm both inclusive and a shell layer which is made of platinum on a surface of the core particle, and has a thickness of 0.25 nm to 0.9 nm both inclusive (equivalent to 1.1 to 4.0 platinum atomic layers both inclusive) is mainly described.

The core-shell type platinum-containing catalyst includes a shell layer including one or more platinum atomic layers, and is preferably configured so that a front surface of the core particle is covered with and protected by the shell layer so as not to expose a ruthenium atom of the core particle to outside. Therefore, for example, in the case where the catalyst is used as an anode catalyst of a direct methanol fuel cell, elution of ruthenium during power generation is prevented, so resistance to CO poisoning is high and high catalytic activity is allowed to be maintained with less deterioration.

Moreover, the direct methanol fuel cell using the core-shell type platinum-containing catalyst as an anode catalyst has a sufficiently practical output density of 70 mW/cm$^2$ or over at a current density of 300 mA/cm$^2$, and a high output retention ratio of approximately 90% or over, and good durability.

Now, the disclosure will be described in more detail referring to the working examples. Needless to say, the disclosure is not limited to the following working examples.

Configuration of Platinum-Containing Catalyst

Figure 2:
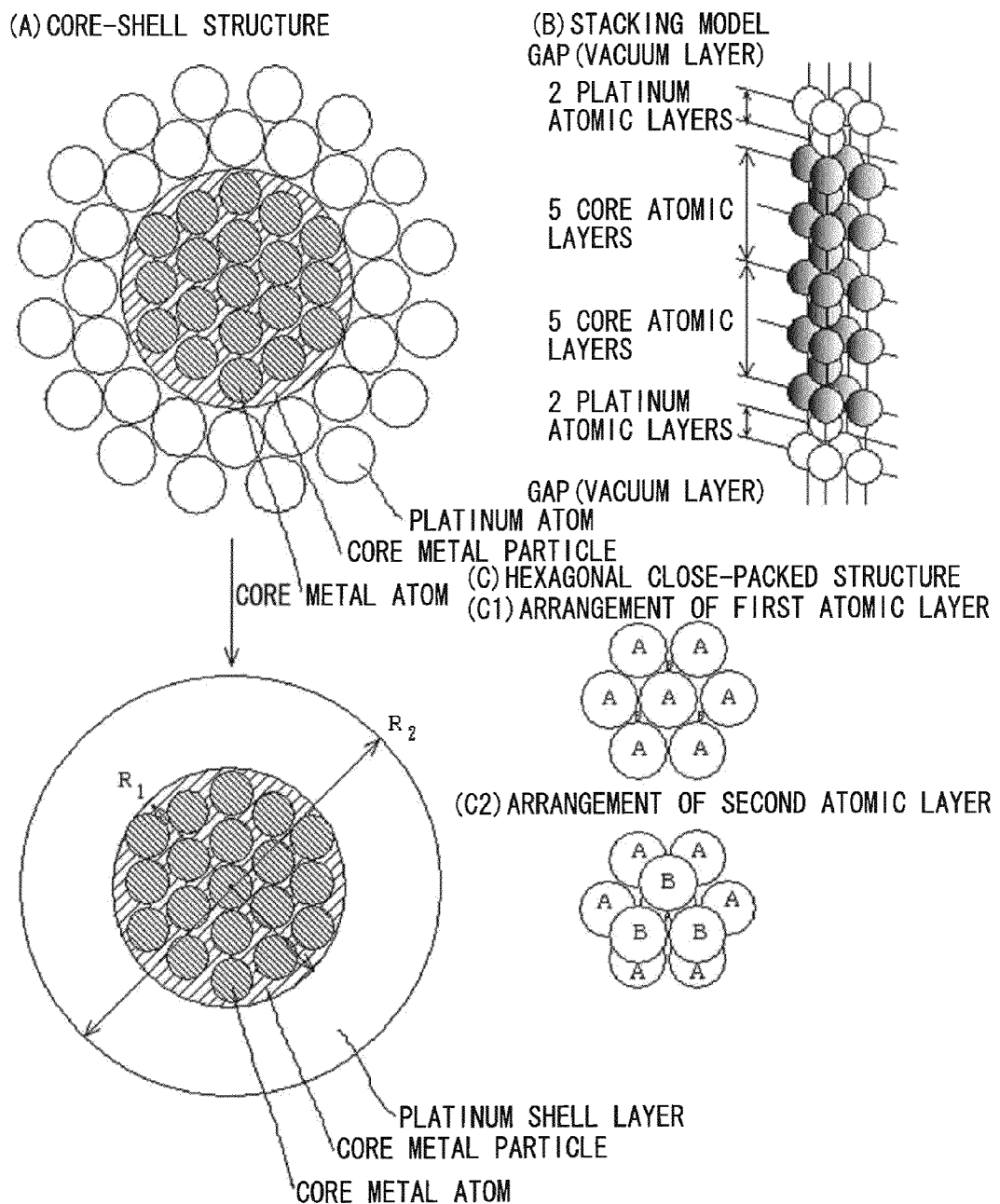
FIG. 2 is an illustration describing a structure of a platinum-containing catalyst with a core-shell structure and a stacking model used for a calculation of a 5d electron bonding force of platinum of a shell layer in working examples of the disclosure.

FIG. 2 is an illustration of a structure of a platinum-containing catalyst with a core-shell structure in working examples of the disclosure, and a stacking model used for a calculation of a Pt 5d electron binding force of the shell layer (platinum layer), where FIG. 2(A) is a sectional view schematically illustrating the structure of the platinum-containing catalyst with a core-shell structure and FIG. 2(B) is a perspective view of the stacking model, and FIG. 2(C) is an illustration describing a hexagonal close-packed structure.

An upper drawing in FIG. 2(A) illustrates a platinum-containing catalyst particle (represented as a sphere) with a core-shell structure including a shell layer configured of platinum atoms formed on a surface of a core metal particle (represented as a sphere) configured of atoms (core metal atoms) except for platinum. In an example illustrated in FIG. 2, the shell layer is configured of two layers configured platinum atoms. A catalyst illustrated in the upper drawing in FIG. 2(A) is allowed to be represented as a platinum-containing catalyst particle as a sphere having a structure in which the shell layer with an average particle diameter of $R_2$ is formed on a surface of the core metal particle with an average particle diameter of $R_1$ as illustrated in a lower drawing in FIG. 2(A).

When the molar ratio γ (Pt/M) of platinum forming the shell layer to a metal element M forming the core particle in the platinum-containing catalyst particle illustrated in the upper drawing of FIG. 2(A) is known, the ratio ($R_2/R_1$) of the average particle diameter $R_2$ of the core-shell particle to the average particle diameter $R_1$ of the core particle is determined by a formula (5). Moreover, when the ratio ($R_2/R_1$) is known, the molar ratio γ (Pt/M) is determined by a formula (6).

In the formulas (5) and (6), $ρ_c$ is a density of a simple substance of metal forming the core particle (a density of an alloy in the case where the core particle is made of an alloy), $ρ_s$ is a density of a simple substance of metal Pt forming the shell layer, $M_c$ is an atomic weight of the simple substance of metal forming the core particle (in the case where the core particle is made of an alloy, a molecular weight of the alloy), and $M_s$ is an atomic weight of the simple substance of metal Pt forming the shell layer.

$$(R_2/R_1) = \{γ(ρ_c/ρ_s)(M_s/M_c)+1\}^{1/3} \quad (5)$$

$$γ = (ρ_s/ρ_c)(M_c/M_s)\{(R_2/R_1)^3 - 1\} \quad (6)$$

In the case where the shell layer is made of platinum, and the core is made of ruthenium, the formula (6) is equal to a formula (7), where, $ρ_c$=12.41 (g/cm$^3$), $ρ_s$=21.45 (g/cm$^3$), $M_c$=101.07 and $M_s$ 159.08.

$$γ = 0.895\{(R_2/R_1)^3 - 1\} \quad (7)$$

The average thickness $t_s$ of the shell layer is determined by formulas (8) to (10).

$$t_s = (R_2 - R_1)/2 \quad (8)$$
$$= (R_1/2)\{(R_2/R_1) - 1\} \quad (9)$$
$$= (R_2/2)\{1 - (R_2/R_1)^{-1}\} \quad (10)$$

Therefore, desirable ranges of the average thickness $t_s$ of the shell layer and the average particle diameter $R_1$ of the core particle which are allowed to reduce the platinum content and achieve high catalytic activity, thereby achieving a large output retention ratio in the case where, for example, the platinum-containing catalyst is used as a fuel electrode catalyst of a fuel cell are known as the structure of the platinum-containing catalyst, the average particle diameter $R_2$ of the core-shell particle and the ratio ($R_2/R_1$) are determined by formulas (11) and (12), respectively, and the molar ratio γ (Pt/M) is determined by the formula (6).

$$R_2 = R_1 + 2t_s \quad (11)$$

$$(R_2/R_1) = 1 + (2t_s/R_1). \quad (12)$$

Moreover, when desirable ranges of the average thickness $t_s$ of the shell layer, the ratio ($R_2/R_1$) of the average particle diameter $R_2$ of the core-shell particle and the average particle diameter $R_1$ of the core particle which are allowed to reduce the platinum content and achieve high catalytic activity are known as the structure of the platinum-containing catalyst, the average particle diameter $R_1$ of the core particle and the average particle diameter $R_2$ of the core-shell particle are determined by formulas (13) and (12), respectively, and the molar ratio γ (Pt/M) is determined by the formula (6).

$$R_1 = 2t_s/((R_2/R_1) - 1). \quad (13)$$

In the platinum-containing catalyst according to the disclosure, the core particle is made of an element except for platinum, and the shell layer is a platinum layer, so the element of the core particle is different from that of the shell layer, and the molar ratio γ (Pt/M) is allowed to be determined by an element concentration ratio obtained by an element analysis of the produced platinum-containing catalyst. Alternatively, as will be described later, the molar ratio γ (Pt/M) is controllable to be a desired value by controlling conditions for producing the platinum-containing catalyst.

Moreover, as described above, the average particle diameter $R_1$ of the core particle and the average particle diameter $R_2$ of the core-shell particle are allowed to be determined by an analysis of an SEM or TEM image or a line analysis by SEM-EDX or TEM-EDX. The ratio ($R_2/R_1$) is allowed to be determined by the determined average particle diameter $R_1$ of the core particle and the determined average particle diameter $R_2$ of the core-shell particle, and the thickness $t_s$ of the shell layer and the molar ratio γ (Pt/M) are allowed to be determined by the formulas (8) and (6), respectively.

When platinum-containing catalysts with various structures are formed by changing the average particle diameter $R_1$ of the core particle and the average thickness $t_s$ of the shell layer, and the catalytic activity of the platinum-containing catalysts is evaluated, a desirable structure for the platinum-containing catalyst is allowed to be determined.

In other words, as the structure of the platinum-containing catalyst, desirable ranges of the average particle diameter $R_1$ of the core particle and the average particle diameter $R_2$ of the core-shell particle which are allowed to reduce the platinum content and achieve high catalytic activity are allowed to be determined, and desirable ranges of the average thickness $t_s$ of the shell layer and the ratio ($R_2/R_1$) and the molar ratio γ (Pt/M) are allowed to be determined from the above ranges. Steps of determining a desirable structure for the platinum-containing catalyst will be described in detail below.

As will be described later, platinum-containing catalysts including core particles with different average particle diameters $R_1$ are formed, and after core particles with respective average particle diameters $R_1$ are formed, the shall layer (platinum layer) is formed on the surfaces of the core particles so as to change the molar ratio γ (Pt/M), thereby producing the platinum-containing catalysts.

The average particle diameter $R_1$ of the core particle and the average particle diameter $R_2$ of the core-shell particle in each of the formed platinum-containing catalysts are measured to determine the ratio ($R_2/R_1$), the average thickness $t_s$ of the shell layer and the molar ratio γ (Pt/M).

As will be described later, when an output in the case where the platinum-containing catalyst is used as a fuel electrode catalyst of a DMFC is measured, the catalytic activity of the platinum-containing catalyst is allowed to be evaluated with use of the output as a measure.

For example, the average particle diameter $R_1$ of the core particle in the fuel electrode catalyst (the platinum-containing catalyst) of the fuel cell is changed, and changes in output, relative to the average particle diameter $R_1$, among the fuel cells using the platinum-containing catalysts containing core particles with the same average particle diameter $R_1$ and core-shell particles with different average particle diameters $R_2$ are determined to determine, as desirable ranges, the ranges of the average particle diameter $R_1$ of the core particle and the average particle diameter $R_2$ of the core-shell particle which are allowed to provide a high output.

Moreover, as will be described later, when an output retention ratio after the platinum-containing catalyst is used as the fuel electrode catalyst of the DMFC for a certain period is measured, the durability of the platinum-containing catalyst is allowed to be evaluated with use of the output retention ratio as a measure.

For example, in the case where the average particle diameter $R_1$ of the core particle in the fuel electrode catalyst (the platinum-containing catalyst) of the fuel cell is changed, changes in maximum output retention ratio (the maximum value of the output retention ratio among fuel cells using platinum-containing catalysts containing the core particles with the same average particle diameter $R_1$ and the core-shell particles with a different average particle diameter $R_2$) relative to the average particle diameter $R_1$ are determined to determine, as a desirable range, a range of the average particle diameter $R_1$ of the core particle which is allowed to provide a high maximum output retention ratio.

Further, changes in the output retention ratio among fuel cells using the platinum-containing catalysts containing the core particles with the same average particle diameter $R_1$ and the core-shell particles with a different average particle diameter $R_2$ relative to the average thickness $t_s$ of the shell layer (platinum layer), the ratio ($R_2/R_1$) and the molar ratio γ (Pt/M) are determined to determine, as desirable ranges, ranges of the average thickness $t_s$, the ratio ($R_2/R_1$) and the molar ratio γ (Pt/M) which are allowed to provide a high output retention ratio.

Effective Utilization Rate of Platinum in Platinum-Containing Catalyst with Core-Shell Structure The effective utilization rate η of platinum is allowed to be determined in the following manner in the case where platinum atom exposed to outside in the platinum layer forming the shell layer (platinum layer) effectively contribute to catalysis.

The volume $V_{Pt}$ of the platinum layer configured of N layers is determined by a formula (14), where the particle diameter of the core particle is $R_1$ and the thickness of one platinum atomic layer is d=0.2265 nm (=$d_{111}$). In the case where platinum atoms in a volume $V_{Ptout}$ (determined by a formula (15)) of a layer (an outermost layer) exposed to outside in the platinum layer effectively contribute to catalysis, the effective utilization rate η of platinum is determined by a formula (16). The effective utilization rate η indicates a rate of Pt arranged on an outermost surface of a platinum shell layer.

The platinum layer is considered to be configured of n=($t_s$/d) (d=0.2265 nm) atomic layers, where the average thickness of the platinum layer is $t_s$, and the volume $V_{Pt}$ of the platinum layer and the volume $V_{Ptout}$ of the layer (the outermost layer) exposed to outside in the platinum layer are determined by the formulas (14) and (15) where N=n=($t_s$/d), and the effective utilization rate η of platinum is determined by the formula (16).

$$V_{Pt}=(4\pi/3)\times\{[(R_1/2)+Nd]^3-(R_1/2)^3\} \quad (14)$$

$$V_{Ptout}=(4\pi/3)\times\{[(R_1/2)+Nd]^3-[(R_1/2)+(N-1)d]^3\} \quad (15)$$

$$\eta=V_{Ptout}/V_{Pt} \quad (16)$$

In the case where the amount of used platinum in the whole catalyst is fixed, the larger the rate of platinum in the outermost layer exposed to outside is, the more the amount of platinum which is not exposed to outside and is buried inside is reduced, so it is considered that the effective utilization rate η is large and platinum is effectively used.

Electronic State of Platinum in Platinum-Containing Catalyst

The electronic state of platinum in the core-shell type platinum-containing catalyst is evaluated by a first-principles calculation based on density functional theory to determine a Pt 5d electron average binding energy $V_d$ (Pt 5d electron binding force) relative to the Fermi level.

Stacking Model Used for Calculation of Pt 5d Electron Binding Force $V_d$

A model used for estimating the electronic state of the platinum-containing catalyst according to the disclosure having a core-shell structure including a core particle made of metal except for platinum and a platinum shell layer by the first-principles calculation based on density functional theory will be described below.

In a result of TEM observation of a nanoparticle catalyst, a (111) plane of a face-centered cubic structure is often observed as a facet of platinum present on a surface of a nanoparticle. Therefore, as a model for approximately calculating a bond state of an atom forming a core particle and an atom forming a shell layer in a core-shell type catalyst, a stacking model in which close-packed plane are stacked as illustrated in FIG. 2(B) is used. In this case, the close-packed plane means a plane including atoms arranged most closely so as to have six symmetrical axes, and is a plane configured of a plurality of equilateral-triangular lattices and corresponding to a (111) plane of a face-centered cubic lattice or a (001) plane of a simple hexagonal lattice.

The stacking model illustrated in FIG. 2(B) has a hexagonal close-packed (hcp) structure illustrated in FIG. 2(C), and the stacking model includes a close-packed plane configured of a first atomic layer with the arrangement of atoms A illustrated in FIG. 2(C1) and a close-packed plane configured of a second atomic layer with the arrangement of atoms B illustrated in FIG. 2(C2). In this case, the atoms A and B each are represented as a sphere.

In FIG. 2(C), for the simplification of the drawing, only part of atoms forming the close-packed plane is illustrated. The stacking model illustrated in FIG. 2(B) includes A planes and B planes which are periodically arranged, that is, two-layer arrangements of ABAB . . . , where the close-packed plane including the atoms A is a A plane and the close-packed plane including the atoms B is a B plane, and the stacking model has a hexagonal close-packed structure. In this case, the atoms A and the atoms B are core atoms or platinum atoms of the shell layer.

In addition, even in the case where the structure of a simple substance forming a nanoparticle catalyst is not a hexagonal close-packed structure or a face-centered cubic structure, in order to minimize surface energy, the form of the nanoparticle is assumed to have a structure similar to the close-packed structure.

When the electronic state of the platinum-containing catalyst illustrated in FIG. 2(B) is estimated by the first-principles calculation based on density functional theory, the stacking model with a stacking structure of the close-packed planes illustrated in FIG. 2(B) is used.

The platinum-containing catalyst with the core-shell structure illustrated in FIG. 2(A) is approximated by the stacking model with a hexagonal close-packed (hcp) structure. The stacking model illustrated in FIG. 2(B) is configured of a multilayer stacking body in which two combinations of seven atomic layers including two platinum atomic layers which form a shell layer and five core metal atomic layers are symmetrically arranged so that one core atomic layer is shared between the combinations, and atomic layers including four atoms and atomic layers including one atom are alternately stacked.

Note that in FIG. 2(B), for the simplification of the drawing, the stacking structure configured of only part of atoms forming the close-packed plane is illustrated, and FIG. 2(C) illustrates a stacking structure in a region of a unit cell with a parallelogram shape formed by connecting centers of four adjacent A atoms present on the same plane.

The platinum-containing catalyst with a core-shell structure illustrated in FIG. 2(A) is approximated as a slab (a thin plate) formed by periodically and repeatedly arranging the unit cell in the multilayer stacking body in FIG. 2(B) in two direction in the close-packed plane.

As described above, the platinum-containing catalyst illustrated in FIG. 2(A) is approximated as a slab (a thin plate) formed by periodically and repeatedly arranging, in two direction in the close-packed plane, the stacking structure (refer to FIG. 2(B)) in which two stacked platinum atomic layers forming close-packed planes are stacked on each of upper and lower outermost surfaces of a stacking body configured of nine close-packed planes including core atoms. Then, a model periodically and repeatedly arranging the slab through a gap (a vacuum layer) in a direction perpendicular to the close-packed plane is used to execute the first-principles calculation based on density functional theory.

An estimation calculation of the electronic state of the platinum-containing catalyst by the first-principles calculation based on density functional theory is performed assuming that an atomic distance between metal atoms forming the core particle, an atomic distance between a core atom and a platinum atom and an atomic distance between metal atoms forming the core particle in a direction parallel to the close-packed plane and a direction of the normal to the close-packed plane are equal to one another.

In other words, an atomic distance between platinum atoms in the platinum atomic layer (shell layer) is assumed to be determined by an atomic distance between metal atoms forming the core particle. This assumption is not unnatural because it is generally known that in epitaxial growth of a metal film, in the case of a metal film with a thickness equivalent to approximately four atomic layers, an atomic distance in the metal film is determined by an atomic distance of a base.

It is typically considered that the stacking structure of the close-packed planes illustrated in FIG. 2(B) is applicable to a core particle including an alloy. A dangling bond not forming a bond is present on a surface exposed to a vacuum region, and an effect of a surface with a different chemical state from a typical bulk state is known. When the platinum-containing catalyst is represented by a stacking model which is configured of a core layer including five core atomic layers and a shell layer including two platinum atomic layers and does not have up-down reversal symmetry, an exposed surface exposed to a vacuum region is included in a core layer, and the exposed surface has a dangling bond to cause a change in the properties of the core atom of the core layer.

In the platinum-containing catalyst nanoparticle in FIG. 2(A), in a stacking model in which only platinum is exposed to a surface, and core atoms are not exposed to the surface and which does not have up-down reversal symmetry, the properties of the core atom are changed; therefore, the above-described stacking model not having up-down reversal symmetry is not suitable for a calculation model for estimating the electronic state of platinum of the shell layer.

In order for the core atoms of the core layer not to have an exposed surface exposed to a vacuum region so that the effect of the surface is exerted only on platinum of the shell layer, a stacking model has up-down reversal symmetry illustrated in FIG. 2(B). Basically, two platinum atomic layers are included relative to five core atomic layers.

An atomic distance between platinum atoms, an atomic distance between a platinum atom and a core atom are assumed to be equal to an atomic distance between core atoms. In the case where the core particle is made of an alloy, assuming that Vegard's rule is established, the lattice constant of the alloy is determined with use of a weighted average of an atomic distance between atoms of simple substances forming the alloy to determine the atomic distance between the core atoms.

In the case where the number of stacked platinum atomic layers forming the shell layer is small, when layers are epitaxially stacked, the atomic distance between platinum atoms and the atomic distance between a platinum atom and a core atom are expected to be affected by the atomic distance between the core atoms. However, as described above, it is not unnatural to assume that the atomic distance between platinum atoms and the atomic distance between a platinum atom and a core atom are equal to the atomic distance between core atoms.

The lattice constant in the close-packed plane is assumed to be equal to the atomic distance between core atoms (in-plane lattice constant) (refer to <Atomic distance in core particle> which will be described later). The lattice constant in a direction perpendicular to the close-packed plane is set under the condition of so-called slab approximation, because an interaction between platinum-containing catalyst nanoparticles (an interaction between surfaces under periodic boundary conditions) is ignored. A band calculation is executed on a periodic system, where a gap (a vacuum layer) illustrated in FIG. 2(B) is 1 nm (10 angstroms) or over which is sufficiently large. In the example of the stacking model illustrated in FIG. 2(B), the gap is 8 times as large as an interplanar spacing of stacked planes. As an interplanar spacing of close-packed planes, a value in <Interplanar spacing of stacked close-packed planes> which will be described later is used.

An interplanar spacing of stacked planes including core metal atoms and platinum atoms and the lattice constant in a perpendicular direction will be described below.

Atomic Distance in Core Particle (In-Plane Lattice Constant)

In the case where the core particle is configured of a single atom and is a simple substance, metal forming the core particle and an atomic distance between core atoms (in-plane lattice constant) used for the estimation calculation of the electronic state of the platinum-containing catalyst by the first-principles calculation based on density functional theory are indicated as below. Kinds of metal forming the core particle are indicated before brackets, and the atomic distance between core atoms (nm) of each kind of metal is indicated in each of the bracket.

Pt (0.2774)
Ru (0.2696)
Ti (0.2895)
Fe (0.2579)
Mn (0.2756)
Co (0.2521)
Ni (0.2492)
Cu (0.2556)
Zn (0.2913)
Os (0.2734)
Pd (0.2751)

It is assumed that that an interplanar spacing of stacked planes where core metal atoms and platinum atoms are stacked, and an atomic distance between Pt atoms in a stacked plane in the platinum layer formed on the surface of the core particle are equal to an atomic distance in the core particle.

Interplanar Spacing of Stacked Close-Packed Planes

In the case where the core particle is configured of a single atom and is a simple substance, interplanar spacings between stacked close-packed planes used for the estimation calculation of the electronic state of the platinum-containing catalyst by the first-principles calculation based on density functional theory are indicated below. Kinds of metal forming the core particle are indicated before brackets, and the interplanar spacings of close-packed planes of core atoms (nm) are indicated in the brackets.

Pt (0.22649)
Ru (0.21570)
Ti (0.23635)
Fe (0.21055)
Mn (0.22005)
Co (0.20586)
Ni (0.20344)
Cu (0.20871)
Zn (0.23785)
Os (0.22321)
Pd (0.22494)

Calculation of Electronic State of Platinum-Containing Catalyst

As a technique of calculating the electronic state of the platinum-containing catalyst, a density functional method on a periodic system is used to perform a band calculation by an all-electron method in which all electrons including core electrons in an atom is subjected to a calculation. A generalize gradient approximation (GGA) is used as a function of electron-electron exchange-correlation energy, and a linearized augmented plane wave method (LAPW method) using a linearized augmented plane wave as a basis function system is used.

In the working examples, the band calculation is performed with use of software "Wien2k", but the band calculation may be performed with any other commercially available software.

Note that k-points (which are points use for dividing a Brillouin zone into a mesh (a sampling mesh), and are sampling points on wave number space used when the band calculation is executed) used for the band calculation are present in a mesh of 4×4 or over in an in-plane direction of a stacked plane.

As an interaction of a k point in a direction perpendicular to a stacked plane with an atom in an adjacent lattice with a vacuum layer in between is not considered in the slab approximation (as the vacuum layer is arranged in parallel to the stacked plane, platinum layers in the adjacent lattice in a direction perpendicular to the stacked plane are considered not to interact with each other), in an actual calculation, the number of sampling points in the stacked plane is 15, and the number of sampling points in a direction perpendicular to the stacked plane is 1.

With use of a density of states calculated under the above conditions, a number Ne of electrons in the 5d band of platinum (number of occupied electrons in the Pt 5d band) and average binding energy $V_d$ of an electron in the 5d band (Pt 5d electron binding force) are calculated by formulas (17) and (18), respectively.

Note that in the formulas (17) and (18), E is electron energy, $E_0$ is energy of a lower 5d band edge (a lower edge of a conductor), $E_F$ is Fermi level energy, and D(E) is projected density of states to a 5d state of a specific platinum atom. Moreover, the upper limit and lower limit of integration (∫) are $E_f$ and $E_0$, respectively.

$$N_e = \int D(E) dE \quad (17)$$

$$V_d = \int D(E)(E_f - E) dE / N_e \quad (18)$$

Calculation Result of Pt 5d Electron Binding Force $V_d$

Figure 3:
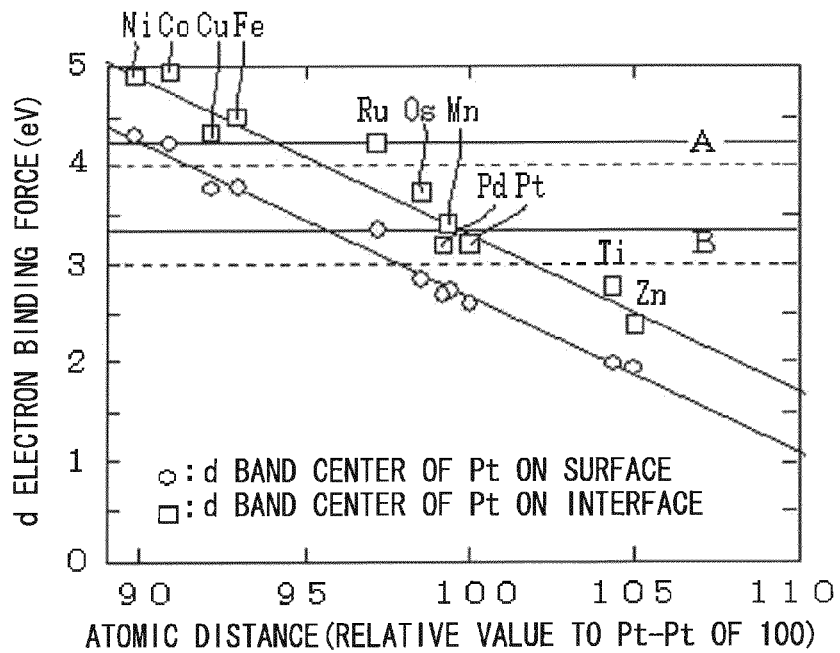
FIG. 3 is an illustration describing a calculation result of the 5d electron bonding force of platinum of the shell layer of the platinum-containing catalyst in the above-described working examples of the disclosure.

FIG. 3 is an illustration describing a calculation result of the Pt d5-electron binding force of the shell layer (platinum layer) of the platinum-containing catalyst in the working examples of the disclosure.

FIG. 3 illustrates Pt 5d electron binding forces determined by calculations using Ni, Co, Cu, Fe, Ru, Os, Mn, Pd, Pt, Ti and Zn as the core metal atom in the stacking model illustrated in FIG. 2(B), and in FIG. 3, a horizontal axis indicates an atomic distance between atoms of a simple substance forming the core particle of the platinum-containing catalyst (represented by a relative value to an atomic distance between platinum atoms (Pt—Pt) of 100), and a vertical axis indicates calculation results of a platinum 5d electron binding force $E_{int}$ (indicated by a square mark: eV) on an interface between the core particle and the shell layer and a platinum 5d electron binding force $E_{out}$ (indicated by a circle mark: eV) on an outermost surface of the shell layer.

As illustrated in FIG. 3, in the case where the core particle is made of a simple substance, the calculation results of the 5d electron forces $E_{out}$ and $E_{int}$ of platinum on the outermost surface of the shell layer and platinum on the interface between the core particle and the shell layer indicate that the smaller the atomic distance between core atoms is, the more the Pt 5d electron binding force is increased, and the atomic distance between core atoms and the Pt 5d electron binding forces $E_{out}$ and $E_{int}$ have a substantially linear relationship therebetween.

In related art, in the case where ruthenium which is considered to have high catalytic activity is used as the core atom, the values of the Pt 5d electron binding forces $E_{int}$ and $E_{out}$ are significantly shifted upwardly from the above-described lines, and are suggested that a stronger bond than that expected from the atomic distance between Ru atoms by the above-described lines is formed with platinum. In consideration of both of this result and the mechanism of carbon monoxide poisoning, it is considered that when the core particle is made of metal allowing the Pt 5d electron binding forces $E_{int}$ and $E_{out}$ to be increased to values equal to those in the case where ruthenium is used as the core atom, that is, when the core particles is made of metal satisfying $E_{int} \geq 4.0$ eV and $E_{out} \geq 3.0$ eV, catalytic activity is allowed to be improved to a value equivalent to that of a catalyst using ruthenium as the core atom.

It is desirable that as in the case of ruthenium, the values of the Pt 5d electron binding forces $E_{int}$ and $E_{out}$ are shifted upwardly from the above-described lines by binding between the core atom and platinum of the shell layer, and when the Pt d5 electron binding force is allowed to be increased more than that in the case of a pure platinum catalyst using platinum as the core atom by using core atoms with a smaller atomic distance to form the core particle, an effect of preventing poisoning is expected. It is found out from results illustrated in FIG. 3 that in addition to ruthenium (Ru), nickel (Ni), cobalt (Co), copper (Cu), iron (Fe) and the like are preferable as such a core atom.

In the core-shell type platinum-containing catalyst in which the platinum layer is formed on a surface of a core made of such a non-platinum element, Pt of the shell layer is affected by an electronic influence of a core metal atom, the band center (average binding energy) of a Pt 5d electron is shifted in a direction away from the band center of a Pt 5d electron in a pure platinum catalyst and the Fermi level, and it is considered that the density of states at the Fermi level is reduced.

Therefore, in the core-shell type platinum-containing catalyst, back donation of electrons from Pt to CO is less likely to occur, and a Pt—CO bond is weaker than a CO bond in the pure platinum catalyst. As described above, in the core-shell type platinum-containing catalyst, an effect of allowing a bond of carbon monoxide (CO) to Pt in the core-shell type platinum-containing catalyst to be weaker than a bond of CO to the pure platinum catalyst is produced, so CO poisoning is less likely to occur, and the catalyst has highly active catalyst properties.

Figure 4:
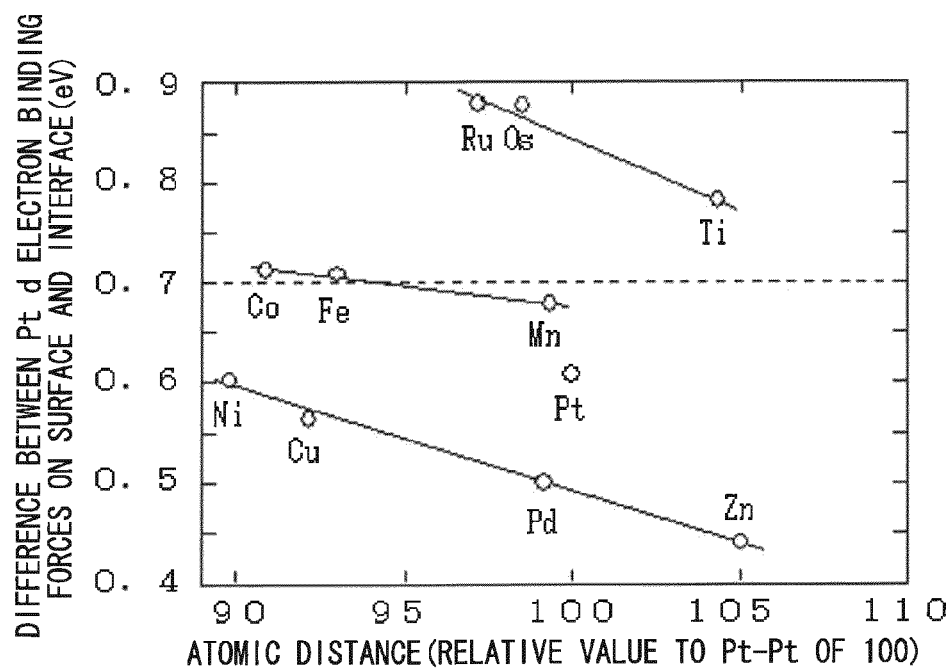
FIG. 4 is an illustration describing a difference between a 5d electron bonding forces of platinum present on a surface and an interface of the platinum-containing catalyst in the above-described working examples of the disclosure.

FIG. 4 is an illustration describing a difference between 5d electron binding forces of platinum present on a surface and platinum present on an interface of the platinum-containing catalyst in the working examples of the disclosure.

As in the case of FIG. 3, FIG. 4 illustrates Pt 5d electron binding forces determined by calculations using Ni, Co, Cu, Fe, Ru, Os, Mn, Pd, Pt, Ti and Zn as the core metal atom in the stacking model illustrated in FIG. 2(B). In FIG. 4, a horizontal axis indicates an atomic distance of a simple substance of metal forming the core particle of the platinum-containing catalyst (represented by a relative value to an atomic distance between platinum atoms (Pt—Pt) of 100), and a vertical axis indicates a difference ($E_{int} - E_{out}$) (eV) between the 5d electron binding force $E_{int}$ of platinum on the interface between the core particle and the shell layer and the 5d electron binding force $E_{out}$ of platinum on the outermost surface of the shell layer.

In the case of Pt, FIG. 4 illustrates a difference (eV) between the 5d electron binding force of platinum on the interface between the core particle and the shell layer and the 5d electron binding force of platinum on the outermost surface of the shell layer in the case where five core atomic layers are replaced with five platinum layers in the stacking model illustrated in FIG. 2(B). In other words, in the case where a first platinum atomic layer to a seventh platinum atomic layer are assigned to platinum atomic layers from a vacuum layer side, FIG. 4 illustrates a difference (0.61 eV) between the Pt 5d electron binding force of the first platinum atomic layer and the Pt 5d electron binding force of the second platinum atomic layer.

A difference ($E_{int} - E_{out}$) between the 5d electron binding force $E_{int}$ of platinum on the interface between the core particle and the shell layer and the 5d electron binding force $E_{out}$ of platinum on the outermost surface of the shell layer is larger than the above-described difference (0.61 eV) in the above-described catalyst with a layered structure including only platinum, that is, in the case where the difference satisfies $(E_{int}-E_{out}) \geq 0.7$, it is considered that a bond of platinum and the core atom is stronger than a metal bond of a simple substance of platinum.

Results illustrated in FIG. 4 indicate that in the case where elements of Ru, Os and Ti substantially along one line and elements of Co, Fe and Mn substantially along another line are used as the core atom, a bond of platinum and the core atom is stronger than the metal bond of the simple substance of platinum. Moreover, the results indicate that in the case where elements of Ni, Cu, Pd and Zn substantially along still another line are used as the core atom, a bond of platinum and the core atom is weaker than the metal bond of the simple substance of platinum.

It is considered that the value of the difference $(E_{int}-E_{out})$ between the 5d electron binding force $E_{int}$ of platinum on the interface between the core particle and the shell layer and the 5d electron binding force $E_{out}$ of platinum on the outermost surface of the shell layer is allowed to be used as a guideline for determining the strength of binding between platinum and the core atom independently of a change in Pt 5d electron binding force (refer to FIG. 3) with a change in an atomic distance between core atoms.

As illustrated in FIG. 4, in the case where ruthenium is used as the core atom, the difference $(E_{int}-E_{out})$ between the 5d electron binding force $E_{int}$ of platinum on the interface between the core particle and the shell layer and the 5d electron binding force $E_{out}$ of platinum on the outermost surface of the shell layer has a large value; therefore, strong binding between the core atom (ruthenium) and platinum is characteristically indicated.

From the results illustrated in FIG. 3, the core particle is preferably made of nickel (Ni), cobalt (Co), iron (Fe) or copper (Cu) in addition to ruthenium (Ru).

As in the case where the simple substance of metal illustrated in FIGS. 3 and 4 is used as the core particle, when the 5d electron binding forces of platinum of the shell layer in the case where binary alloys RuCu and RuNi are used as the core particle are calculated, it is confirmed that compared to the case of the pure platinum catalyst using platinum as the core atom, the Pt 5d electron binding forces are increased more, and it is found out that the effect of preventing poisoning is expected in the case where the binary alloys RuCu and RuNi are used as the core particle.

Figure 5:
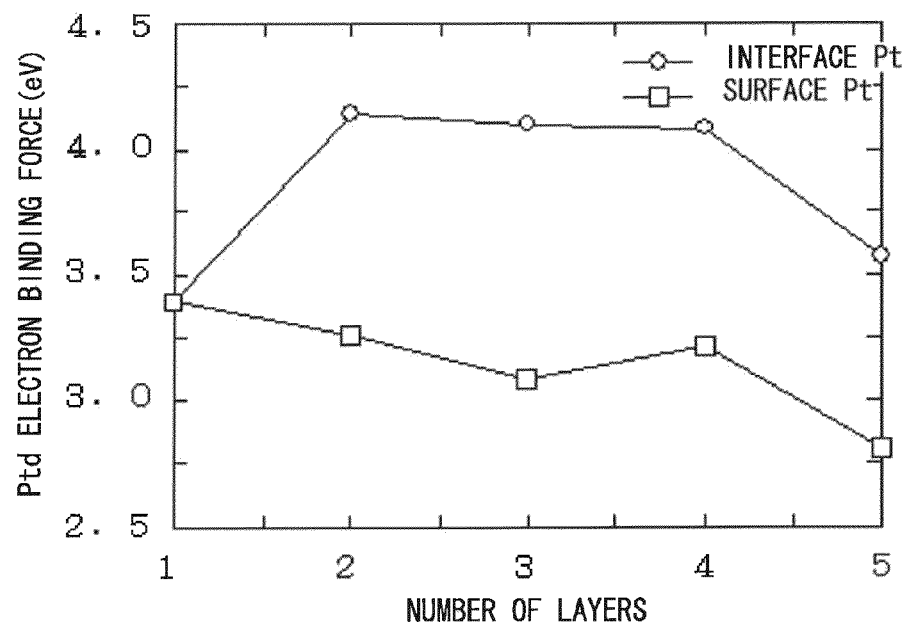
FIG. 5 is an illustration describing a relationship between the number of Pt atomic layers stacked on a ruthenium nanoparticle as a core metal particle and a 5d electron bonding force of Pt in the platinum-containing catalyst in the above-described working examples of the disclosure.

Relationship Between Number of Stacked Pt Atomic Layers in Shell Layer (Platinum Layer) and Pt 5d Electron Binding Force FIG. 5 is an illustration for describing a relationship between the number of platinum atomic layers stacked on a Ru nanoparticle as the core particle in the platinum-containing catalyst and the Pt 5d electron binding force in the working examples of the disclosure.

FIG. 5 illustrates Pt 5d electron binding forces on an interface between a Ru layer and a Pt layer and Pt 5d electron binding forces on an outermost Pt layer on the vacuum layer side which are calculated in the case where in the stacking model illustrated in FIG. 2(B), five core atomic layers are five Ru layers, and the number of platinum atomic layers is 1, 2, 3, 4 and 5.

In FIG. 5, a horizontal axis indicates the number of stacked platinum atomic layers forming the shell layer, and a vertical axis indicates calculation results of the 5d electron binding forces $E_{int}$ (a circle mark: eV) of platinum on the interface between the core particle and the shell layer and the 5d electron binding force $E_{out}$ (a square mark: eV) of platinum on the outermost surface of the shell layer.

In the case where the number of Pt atomic layers (the number of platinum atomic layers forming the shell layer) is 1, the Pt 5d electron binding force on the interface between the Ru layer and the Pt layer and the Pt 5d electron binding force on the outermost surface on the vacuum layer side have the same value.

In the case where the number of platinum atomic layers is 2 to 4, the 5d electron binding force $E_{int}$ (a circle mark: eV) of platinum on the interface between the core particle and the shell layer has an increased and substantially uniform value, and when the number of platinum atomic layer is 5, the Pt 5d electron binding force starts to be reduced. The 5d electron binding force $E_{out}$ (a square mark: eV) of platinum on the outermost surface of the shell layer is reduced with an increase in the number of platinum atomic layers; however, whereas the 5d electron binding force $E_{out}$ is moderately reduced in the case where the number of platinum atomic layers is within a range of 1 to 4, the 5d electron force $E_{out}$ is largely reduced in the case where the number of platinum atomic layers is 5. It is expected from the result that in the case where the number of platinum layers formed on the surface of the Ru core particle is 1 to 4, high catalytic activity is obtained, and this expectation is consistent with an experimental result of a fuel cell which will be described later.

From the above results, poisoning, for example, CO poisoning is effectively preventable by the core-shell type platinum-containing catalyst including 1 to 4 platinum atomic layers and core atoms strongly bound to the platinum atomic layers.

It is considered that poisoning of platinum atoms by an intermediate including CO is caused by formation of a bond by hybridization of a non-bonding d orbital near the Fermi level of platinum and an unoccupied orbital of the intermediate. When a core atom and a platinum atom are bound strongly to increase a d-orbital binding force, the number of non-bonding orbitals near the Fermi level is reduced, and the probability of formation of a bond of the platinum atom and the intermediate is reduced. In other words, it is considered that an energy gain by hybridization of the d-orbital of the platinum atom and an electron orbital of CO is reduced.

Method of Producing Platinum-Containing Catalyst with Core-Shell Structure

The platinum-containing catalyst with the core-shell structure is allowed to be produced by a sequential reduction method or a simultaneous reduction method.

In the sequential reduction method, first, in a solution including a core precursor (for example, metal chloride) for forming the core particles, the core precursor is reduced to form the core particles, and then after the core particles are supported by a carrier (for example, porous carbon), and the core particles are washed and dried to obtain the core particles supported by the carrier. Next, in a solution including the core particles supported by the carrier and a shell precursor (for example, chloroplatinic acid) for forming the shell layer (platinum layer), the shell precursor is reduced to deposit platinum on the surface of each of the core particles, thereby forming the shell layer; therefore, platinum-containing catalyst particles supported by the carrier and having the core-shell structure are obtained.

In the simultaneous reduction method, in a solution where a core precursor (for example, metal chloride) for forming the core particles and a shell precursor (for example, chloroplatinic acid) for forming the shell layer (platinum layer) coexist, each of the precursors is reduced to form the shell layer made of platinum on the surface of each of the core particles, thereby obtaining platinum-containing catalyst particles with the core-shell structure. The platinum-containing catalyst particles are supported by the carrier.

In Working Examples 1 to 19 which will be described below, platinum-containing catalysts with the core-shell structure were produced by the sequential reduction method with use of ruthenium particles as the core particles.

Method of Evaluating Thickness of Shell Layer (Number of Stacked Platinum Atomic Layer)

To determine the average thickness of the shell layer of each of the produced platinum-containing catalysts, the core particles and the platinum-containing catalyst particles were evaluated by TEM images to determine the average particle diameters of the core particles and the platinum-containing catalyst particles, and then the average thickness of the shell layer was determined by a difference $((R_2-R_1)/2)$ between the average particle diameter $R_1$ of the core particle and the average particle diameter $R_2$ of the platinum-containing catalyst particle. The number of stacked platinum atomic layers was determined by dividing the average thickness of the platinum layer by the interplanar spacing ($d_{111}$=0.2265 nm) of platinum.

Figure 6:
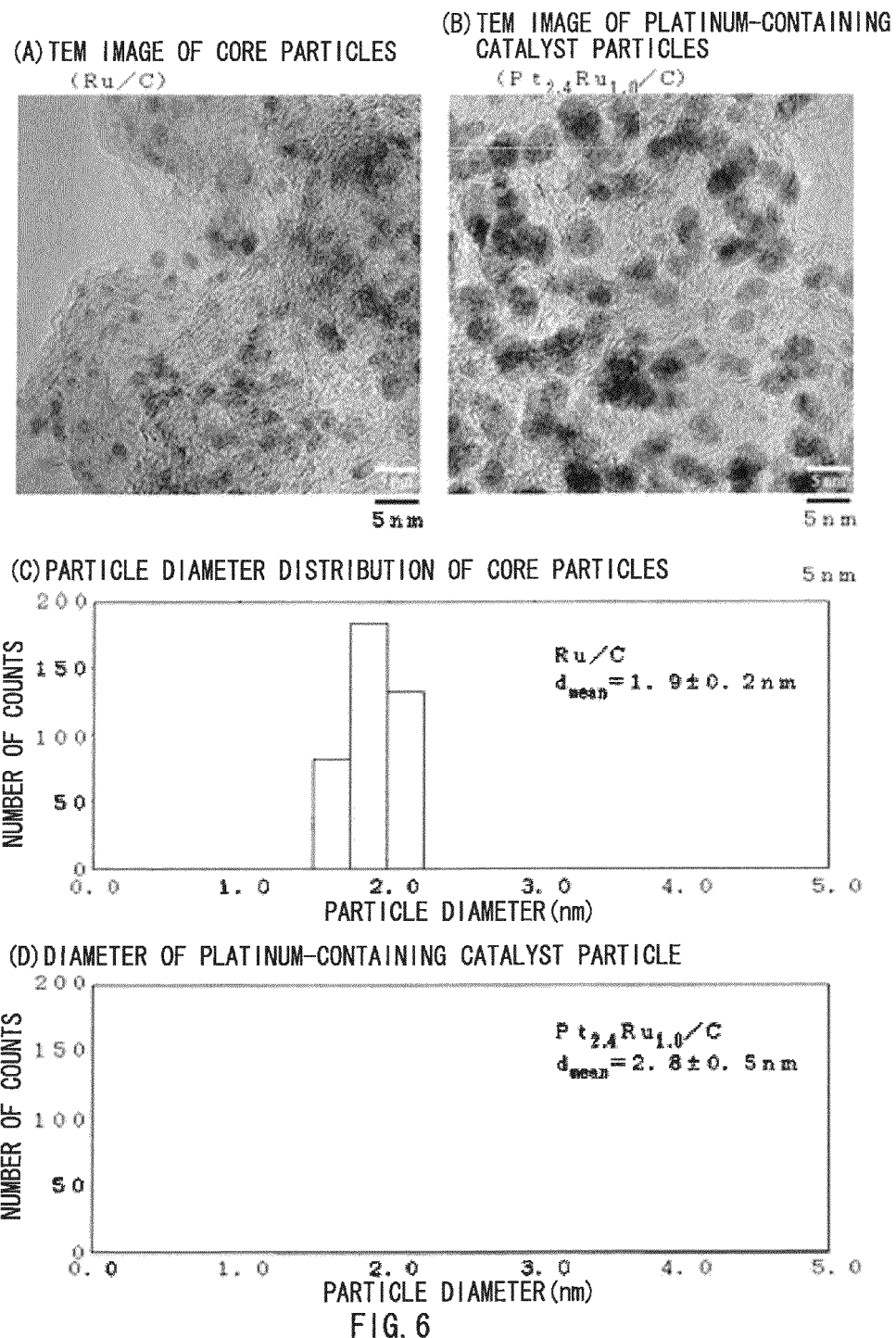
FIG. 6 is an illustration describing an example of an evaluation of the thickness of a shell layer of the platinum-containing catalyst in the above-described working examples of the disclosure.

FIG. 6 is an illustration describing an example of evaluation of the average thickness of the platinum layer (shell layer) of the platinum-containing catalyst in the working examples of the disclosure, and FIG. 6(A) is an illustration of a TEM image of the core particles, FIG. 6(B) is an illustration of a TEM image of the platinum-containing catalyst particles, FIG. 6(C) is an illustration of a particle diameter distribution of the core particles, and FIG. 6(D) is an illustration of a particle diameter distribution of the platinum-containing catalyst particles.

FIG. 6(A) is an illustration of an example of a TEM image of core particles (Ru/C) supported by carbon black, and FIG. 6(B) is an illustration of an example of a TEM image of platinum-containing catalyst particles ($Pt_{2.4}Ru_{1.0}$/C) supported by carbon black.

FIG. 6(C) is an illustration of a measurement example of a particle diameter distribution of the core particles determined by evaluation of the TEM image of the core particles (ruthenium particles) illustrated in FIG. 6(A). In FIG. 6(C), a horizontal axis indicates the particle diameter (nm) of the core particle, and a vertical axis indicates the number of counts, and as illustrated in FIG. 6(C), the average particle diameter R1 (=$d_{mean}$) of the core particle is 1.9 nm, and the standard deviation thereof is ±0.2 nm. Note that the particle diameter distribution of the core particles is measured by the determined particle diameters of approximately 430 particles in the TEM image.

FIG. 6(D) is an illustration of a measurement example of a particle diameter distribution of the platinum-containing catalyst particles determined from evaluation of the TEM image of the platinum-containing catalyst particles ($Pt_{2.4}Ru_{1.0}$) illustrated in FIG. 6(B). In FIG. 6(D), a horizontal axis indicates the particle diameter (nm) of the platinum-containing catalyst particle, and a vertical axis indicates the number of counts, and as illustrated in FIG. 6(D), the average particle diameter $R_2$ (=$d_{mean}$) of the platinum-containing catalyst particle is 2.8 nm, and the standard deviation thereof is ±0.5 nm. Note that the particle diameter distribution of the platinum-containing catalyst particles is measured by the determined particle diameters of approximately 510 particles in the TEM image.

The average thickness $t_s$ of the platinum layer is 0.45 nm (=(2.8−1.9)/2) determined from the average particle diameter $R_1$ of the core particle and the average particle diameter $R_2$ of the platinum-containing catalyst particle, and the thickness of the platinum layer is equivalent to 2.0 (=0.45/0.2265) platinum atomic layers.

An example of the evaluation result of the above-described average thickness (the number of stacked platinum atomic layers) of the shell layer is close to an evaluation result of the average thickness (the number of stacked platinum atomic layers) of the shell layers of platinum-containing catalyst particles in Working Example 6 which will be described later.

Working Example 1

Method of Producing Core Particle

The core particles of the platinum-containing catalyst were produced in the following manner. Ruthenium (III) chloride-hydrate ($RuCl_3 \cdot nH_2O$) was dissolved in ethylene glycol to prepare 190 mL of a solution in which ruthenium (III) ions were dissolved at a concentration of 0.1 mol/L. Then, 10 mL of an aqueous 0.5-mol/L sodium hydroxide (NaOH) solution was added into the solution, and while the solution was stirred well, the temperature of the solution was increased to 170° C. for 1 minute with use of a microwave heating apparatus, and then the temperature of the solution was kept at 170° for 1 hours; therefore, ruthenium (III) ions were reduced by ethylene glycol, and a dispersion liquid containing dark brawn ruthenium nanoparticles was produced.

Absorption of Ruthenium Nanoparticle on Carbon Black

After 2.88 g of carbon black was added as a carrier to the above-described dispersion liquid, and the dispersion liquid was stirred well to disperse carbon black, 100 mL of 0.5-mol/L sulfuric acid was added to the dispersion liquid, and the dispersion liquid was stirred well. Next, a mixture of the ruthenium nanoparticle and carbon black was precipitated out of the dispersion liquid by a centrifugal separator, and a supernatant fluid was removed to obtain ruthenium nanoparticles supported by carbon black.

The ruthenium nanoparticles supported by carbon black was added in 50 mL of ion-exchange water, and after the ion-exchange water was stirred well to disperse the ruthenium nanoparticles, the ruthenium nanoparticles were precipitated by the centrifugal separator, and a supernatant fluid was removed to obtain washed ruthenium nanoparticles supported by carbon black. This washing process was repeated 5 times in total to refine the ruthenium nanoparticles supported by carbon black. Finally, the ruthenium nanoparticles supported by carbon black was dried by a nitrogen gas flow.

Evaluation of Size of Ruthenium Nanoparticle

The average particle diameter of the platinum-containing catalyst particles determined from a TEM observation image was 1.4 nm (with a standard deviation of ±0.3 nm).

Formation of Platinum Layer on Ruthenium Nanoparticle

The ruthenium nanoparticles supported by carbon black were dispersed in 200 mL of ion-exchange water, and a 6.6-mol/L aqueous solution of sodium tetrahydroborate ($NaBH_4$) and a 0.97-mol/L aqueous solution of chloroplatinic acid hexahydrate ($H_2PtCl_6 \cdot 6H_2O$) were dripped in the ion-exchange water to reduce platinum (IV) ions, thereby forming the platinum layers on surfaces of the ruthenium nanoparticles. Dripping was performed until the molar ratio of platinum and ruthenium reached to a set molar ratio (a feeding molar ratio) of 3:2 in a platinum-containing catalyst to be prepared.

Note that it was confirmed that a result of composition analysis by ICP (inductively coupled plasma) analysis of a molar ratio γ (Pt/Ru) of Pt forming the prepared platinum-containing catalyst to Ru was equal to the feeding molar ratio, and it was confirmed that nearly 100% of metal in a raw material was included in the prepared platinum-containing catalyst (the same applies in Working Examples 2 to 19 which will be described later). The platinum-containing catalyst particles supported by carbon black were separated from a reaction liquid by centrifugal separation. The platinum-containing catalyst particles supported by carbon black were refined by repeatedly performing the above-described washing process 5 times. Finally, the platinum-containing catalyst particles were dried by a nitrogen gas flow.

Evaluation of Thickness of Platinum Layer (Shell Layer)

The produced platinum-containing catalyst particles were evaluated by a TEM image to determine the average particle diameter $R_2$ of the platinum-containing catalyst particle, and the thickness $t_s$ of the shell layer of the platinum-containing catalyst was determined from a difference $((R_2-R_1)/2)$ between the previously determined average particle diameter $R_1$ of the ruthenium nanoparticle and the average particle diameter $R_2$. The number of stacked platinum atomic layers was determined by dividing the thickness of the shell layer (platinum layer) by the interplanar spacing ($d_{111}$=0.2265 nm) of platinum.

Figure 18:
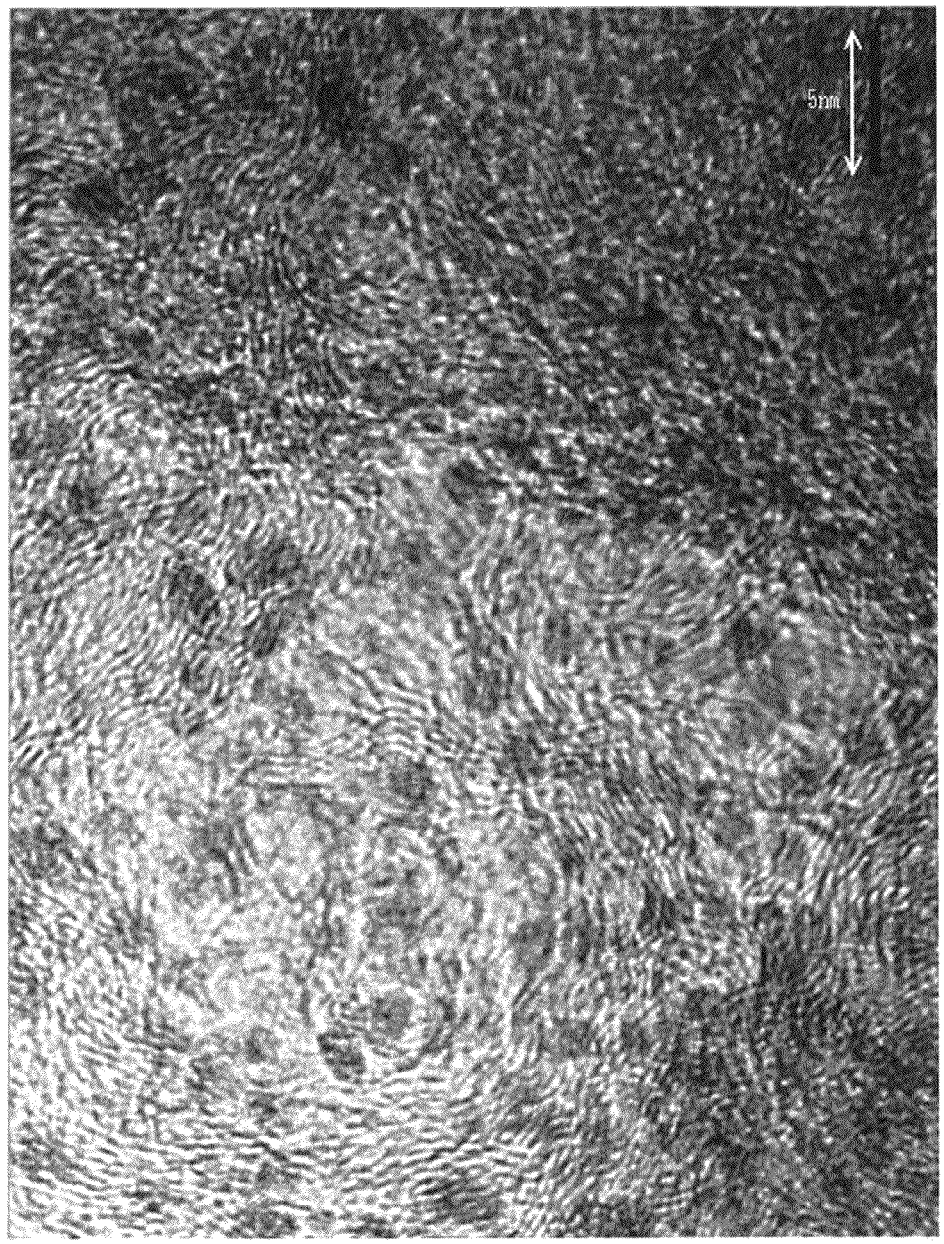
FIG. 18 is an observation image by a transmission electron microscope of a Ru microparticle which is obtained in Working Example 1 of the disclosure, and is supported by carbon and covered with Pt.

FIG. 18 is an observation image by a transmission electron microscope of a Ru microparticle covered with Pt (which is a core-shell type catalyst called a platinum-containing catalyst particle, and may be hereinafter referred to as "Pt-covered Ru particle") supported by carbon.

The particle diameter of a carbon particle is extremely larger than the particle diameter (1.9 nm on average) of the Pt-covered Ru microparticle, and in FIG. 18, the carbon particle looked like a sheet in which a dark part and a bright part were present and narrow stripe asperities were formed on a surface thereof, and the Pt-covered Ru microparticle looked like a dark spot.

The average particle diameter of the platinum-containing catalyst particle determined from the TEM observation image illustrated in FIG. 18 was $R_2$=1.9 nm (with a standard deviation of ±0.4 nm). The average thickness $t_s$ of the platinum layer was 0.25 nm (=(1.9−1.4)/2) determined from the average particle diameter of the platinum-containing catalyst particle and the previously determined average particle diameter $R_1$=1.4 nm of the ruthenium nanoparticle, and the average thickness of the platinum layer was equivalent to 1.1 platinum atomic layers (=0.25/0.2265). It was confirmed that the platinum layer included approximately 1 platinum atomic layer on average.

To evaluate the platinum-containing catalyst particles supported by carbon black as an anode catalyst of a DMFC, the following DMFC was formed to evaluate characteristics of the fuel cell.

Configuration of Fuel Cell

Figure 7:
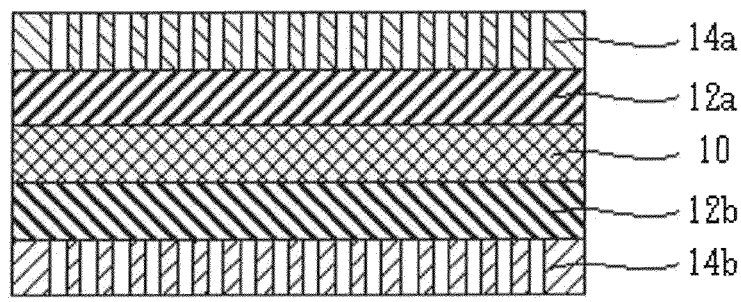
FIG. 7 is a sectional view describing a configuration of a fuel cell in the above-described working examples of the disclosure.

FIG. 7 is a sectional view describing configurations of a MEA (membrane-electrode assembly) and components around the MEA in a fuel cell in working examples of the disclosure, and basic configurations thereof are the same as those illustrated in FIG. 1.

Each of Pt—Ru catalysts of working examples and comparative examples was used for a fuel electrode 12a of a single cell of a direct methanol fuel cell to evaluate the fuel cell.

The platinum-containing catalyst particles supported by carbon black and a Nafion™-dispersed aqueous solution (manufactured from Wako Chemical, Ltd.) were mixed at a mass ratio of 7:3 to form a mixture, and ion-exchange water was added into the mixture to adjust the viscosity of the mixture, thereby forming a paste-like mixture.

After the paste-like mixture was applied to a carbon paper (manufactured from Toray Industries, Inc.) as a gas diffusion layer by a doctor blade method, the paste-like mixture was dried to form the anode catalyst layer. At that time, the paste-like mixture was applied so that the abundance of the platinum-containing catalyst particles was 10 mg per $cm^2$ of the gas diffusion layer. After the paste-like mixture was applied and dried, the carbon paper was cut into a 10 mm×10 mm square to form an anode (the fuel electrode 12a).

A cathode was formed as in the case of the anode (the fuel electrode 12a) except that a different catalyst material was used. First, a catalyst formed by supporting a platinum catalyst by carbon (manufactured from Tanaka Kikinzoku Kogyo K.K.) and a Nafion™-dispersed aqueous solution (manufactured from Wako Chemical, Ltd.) were mixed at a mass ratio of 7:3 to form a mixture, and ion-exchange water was added to the mixture to adjust the viscosity of the mixture, thereby forming a paste-like mixture.

After the paste-like mixture was applied to a carbon paper (manufactured from Toray Industries, Inc.) as a gas diffusion layer by a doctor blade method, and the paste-like mixture was dried to form a cathode catalyst layer. At that time, the paste-like mixture was applied so that the abundance of platinum was 5 mg per $cm^2$ of the gas diffusion layer. After the paste-like mixture was applied and dried, the carbon paper was cut into a 10 mm×10 mm square to form a cathode (an air electrode 12b).

A Nafion 112 film (product name; manufactured from Du Pont) was cut into a 12 mm×12 mm square as a proton-conducting polymer electrolyte membrane 10, and the Nafion 112 film was sandwiched between the fuel electrode 12a and an air electrode 12b, and they were thermally compression-bonded for 10 minutes at a temperature of 150° C. and a pressure of 1 MPa to form the electrolyte membrane-electrode assembly (MEA). A whole surface of the fuel electrode 12a and a whole surface of the air electrode 12b face each other and are in contact with the proton-conducting polymer electrolyte membrane 10.

Note that configurations of a MEA and the components around the MEA illustrated in FIG. 7 are basically the same as those of an MEA 114 illustrated in FIG. 17 which will be described later.

Accordingly, the electrolyte membrane 10 corresponds to a proton conducting polymer film 111, the fuel electrode 12a corresponds to an anode 112, and the air electrode 12b corresponds to a cathode 113. Moreover, the gas diffusion layer 14a is included in the anode 112, and the gas diffusion layer 14b is included in the cathode 113.

The performance of the anode catalyst was evaluated in a manner described below with use of the above-described single cell as the configuration of the DMFC illustrated in FIG. 17 which will be described later.

Performance Evaluation of Anode Catalyst

The power generation of the fuel cell was performed at room temperature while an aqueous methanol solution with a concentration of 80 mass % was supplied to the anode (the fuel electrode 12a) side at a constant rate. While the current value per $cm_2$ of the electrode was changed, the voltage per current value was measured to obtain a current density-voltage curve and a current density-output density curve. Moreover, power generation producing a constant current of 100 mA per $cm^2$ of the electrode was continuously performed for 800 hours to determine a ratio of an output after a lapse of 800 hours to an initial output, that is, an output retention ratio.

The output retention ratio is a reflection of a change from catalytic activity in an initial state to catalytic activity after long-duration power generation, and indicates the retention ratio of catalytic activity, and the durability of the platinum-containing catalyst based on the disclosure as the anode catalyst was evaluated based on the output retention ratio.

Working Example 2

The platinum layers were formed so that the surfaces of the ruthenium nanoparticles were covered with the platinum layers and the molar ratio of platinum and ruthenium reached a set molar ratio (a feeding molar ratio) of 4:1 in a platinum-containing catalyst to be prepared. As in the case of Working Example 1 except for this, the platinum-containing catalyst was synthesized, refined and dried, and the performance evaluation of the platinum-containing catalyst was performed. The platinum-containing catalyst particles supported by carbon black were observed by a transmission electron microscope (TEM). The average particle diameter of the platinum-containing catalyst particle was 2.5 nm (with a standard deviation of ±0.5 nm) from a TEM observation image. Therefore, the average thickness of the platinum layer was 0.55 nm (=(2.5−1.4)/2), and was equivalent to 2.4 (=0.55/0.2265) platinum atomic layers.

Working Example 3

The platinum layers were formed so that the surfaces of the ruthenium nanoparticles were covered with the platinum layers and the molar ratio of platinum and ruthenium reached a set molar ratio (a feeding molar ratio) of 7:1 in a platinum-containing catalyst to be prepared. As in the case of Working Example 1 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 2.9 nm (with a standard deviation of ±0.5 nm) from a TEM observation image. Therefore, the average thickness of the platinum layer was 0.75 nm (=(2.9−1.4)/2), and was equivalent to 3.3 (=0.75/0.2265) platinum atomic layers.

Working Example 4

The platinum layers were formed so that the surfaces of the ruthenium nanoparticles were covered with the platinum layers and the molar ratio of platinum and ruthenium reached a set molar ratio (a feeding molar ratio) of 9:1 in a platinum-containing catalyst to be prepared. As in the case of Working Example 1 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 3.1 nm (with a standard deviation of ±0.5 nm) from a TEM observation image. Therefore, the average thickness of the platinum layer was 0.85 nm (=(3.1−1.4)/2), and was equivalent to 3.8 (=0.85/0.2265) platinum atomic layers.

Working Example 5

When ruthenium nanoparticles were produced, the temperature of the solution was increased to 170° C. for 15 minutes with use of a microwave heating apparatus. When the ruthenium nanoparticles supported by carbon black were produced as in the case of Working Example 1 except for this, the average particle diameter of the ruthenium nanoparticle was 1.9 nm (with a standard deviation of ±0.3 nm). After that, as in the case of Working Example 1, the platinum layers were formed so that the surfaces of the ruthenium nanoparticles were covered with the platinum layers and the molar ratio of platinum and ruthenium reached a set molar ratio (a feeding molar ratio) of 1:1 in a platinum-containing catalyst to be prepared, and the platinum-containing catalyst was refined and dried.

The platinum-containing catalyst particles supported by carbon black were observed by a transmission electron microscope. The average particle diameter of the platinum-containing catalyst particle was 2.4 nm (with a standard deviation of ±0.4 nm) from a TEM observation image. Therefore, the average thickness of the platinum layer was 0.25 nm (=(2.4−1.9)/2), and was equivalent to 1.1 (=0.25/0.2265) platinum atomic layer. The performance evaluation of the obtained platinum-based catalyst as the anode catalyst was performed as in the case of Working Example 1.

Working Example 6

The platinum layers were formed so that the surfaces of the ruthenium nanoparticles were covered with the platinum layers and the molar ratio of platinum and ruthenium reached a set molar ratio (a feeding molar ratio) of 7:3 in a platinum-containing catalyst to be prepared. As in the case of Working Example 5 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 2.9 nm (with a standard deviation of ±0.5 nm) from a TEM observation image. Therefore, the average thickness of the platinum layer was 0.5 nm (=(2.9−1.9)/2), and was equivalent to 2.2 (=0.5/0.2265) platinum atomic layers.

Working Example 7

The platinum layers were formed so that the surfaces of the ruthenium nanoparticles were covered with the platinum layers and the molar ratio of platinum and ruthenium reached a set molar ratio (a feeding molar ratio) of 4:1 in a platinum-containing catalyst to be prepared. As in the case of Working Example 5 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 3.3 nm (with a standard deviation of ±0.6 nm) from a TEM observation image. Therefore, the average thickness of the platinum layer was 0.70 nm (=(3.3−1.9)/2), and was equivalent to 3.1 (=0.70/0.2265) platinum atomic layers.

Working Example 8

The platinum layers were formed so that the surfaces of the ruthenium nanoparticles were covered with the platinum layers and the molar ratio of platinum and ruthenium reached a set molar ratio (a feeding molar ratio) of 6:1 in a platinum-containing catalyst to be prepared. As in the case of Working Example 5 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 3.8 nm (with a standard deviation of ±0.7 nm) from a TEM observation image. Therefore, the average thickness of the platinum layer was 0.95 nm (=(3.8–1.9)/2), and was equivalent to 4.2 (=0.95/0.2265) platinum atomic layers.

Working Example 9

When ruthenium nanoparticles were produced, the temperature of the solution was increased to 170° C. for 40 minutes with use of a microwave heating apparatus. When ruthenium nanoparticles supported by carbon black were produced as in the case of Working Example 1 except for this, the average particle diameter of the ruthenium nanoparticle was 3.5 nm (with a standard deviation of ±0.3 nm). After that, as in the case of Working Example 1, the platinum layers were formed so that the surfaces of the ruthenium nanoparticles were covered with the platinum layers, and the molar ratio of platinum and ruthenium reached a set molar ratio (a feeding molar ratio) of 1:2 in a platinum-containing catalyst to be prepared, and the platinum-containing catalyst was refined and dried.

The platinum-containing catalyst particles supported by carbon black were observed by a transmission electron microscope. The average particle diameter of the platinum-containing catalyst particle was 4.0 nm (with a standard deviation of ±0.6 nm) from a TEM observation image. Therefore, the average thickness of the platinum layer was 0.25 nm (=(4.0–3.5)/2), and was equivalent to 1.1 (=0.25/0.2265) platinum atomic layer. The performance evaluation of the obtained platinum-based catalyst as the anode catalyst was performed as in the case of Working Example 1.

Working Example 10

The platinum layers were formed so that the surfaces of the ruthenium nanoparticles were covered with the platinum layers and the molar ratio of platinum and ruthenium reached a set molar ratio (a feeding molar ratio) of 1:1 in a platinum-containing catalyst to be prepared. As in the case of Working Example 9 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 4.5 nm (with a standard deviation of ±0.7 nm) from a TEM observation image. Therefore, the average thickness of the platinum layer was 0.5 nm (=(4.5-3.5)/2), and was equivalent to 2.2 (=0.5/0.2265) platinum atomic layers.

Working Example 11

The platinum layers were formed so that the surfaces of the ruthenium nanoparticles were covered with the platinum layers and the molar ratio of platinum and ruthenium reached a set molar ratio (a feeding molar ratio) of 3:2 in a platinum-containing catalyst to be prepared. As in the case of Working Example 9 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particles was 4.9 nm (with a standard deviation of ±0.7 nm) from a TEM observation image. Therefore, the average thickness of the platinum layer was 0.7 nm (=(4.9-3.5)/2), and was equivalent to 3.1 (=0.7/0.2265) platinum atomic layers.

Working Example 12

The platinum layers were formed so that the surfaces of the ruthenium nanoparticles were covered with the platinum layers and the molar ratio of platinum and ruthenium reached a set molar ratio (a feeding molar ratio) of 2:1 in a platinum-containing catalyst to be prepared. As in the case of Working Example 9 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particles was 5.2 nm (with a standard deviation of ±0.7 nm) from a TEM observation image. Therefore, the average thickness of the platinum layer was 0.85 nm (=(5.2–3.5)/2), and was equivalent to 3.8 (=0.85/0.2265) platinum atomic layers.

Working Example 13

The platinum layers were formed so that the surfaces of the ruthenium nanoparticles were covered with the platinum layers and the molar ratio of platinum and ruthenium reached a set molar ratio (a feeding molar ratio) of 16:1 in a platinum-containing catalyst to be prepared. As in the case of Working Example 1 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 3.7 nm (with a standard deviation of ±0.6 nm) from a TEM observation image. Therefore, the average thickness of the platinum layer was 1.15 nm (=(3.7-1.4)/2), and was equivalent to 5.1 (=1.15/0.2265) platinum atomic layers.

Working Example 14

The platinum layers were formed so that the surfaces of the ruthenium nanoparticles were covered with the platinum layers and the molar ratio of platinum and ruthenium reached a set molar ratio (a feeding molar ratio) of 9:1 in a platinum-containing catalyst to be prepared. As in the case of Working Example 5 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 4.2 nm (with a standard deviation of ±0.6 nm) from a TEM observation image. Therefore, the average thickness of the platinum layer was 1.15 nm (=(4.2–1.9)/2), and was equivalent to 5.1 (=1.15/0.2265) platinum atomic layers.

Working Example 15

The platinum layers were formed so that the surfaces of the ruthenium nanoparticles were covered with the platinum layers and the molar ratio of platinum and ruthenium reached a set molar ratio (a feeding molar ratio) of 4:1 in a platinum-containing catalyst to be prepared. As in the case of Working Example 9 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 6.2 nm (with a standard deviation of ±0.7 nm) from a TEM observation image. Therefore, the average thickness of the platinum layer was 1.35 nm (=6.2−3.5/2), and was equivalent to 6.0 (=1.35/0.2265) platinum atomic layers.

Working Example 16

When the ruthenium nanoparticles were produced, the temperature of the solution was increased to 170° C. for 60 minutes with use of a microwave heating apparatus. When ruthenium nanoparticles supported by carbon black were produced as in the case of Working Example 1 except for this, the average particle diameter of the ruthenium nanoparticles was 4.6 nm (with a standard deviation of ±0.3 nm). After that, as in the case of Working Example 1, the platinum layers were formed so that the surfaces of the ruthenium nanoparticles were covered with the platinum layers and the molar ratio of platinum and ruthenium reached a set molar ratio (a feeding molar ratio) of 1:2 in a platinum-containing catalyst to be prepared, and the platinum-containing catalyst was refined and dried.

The platinum-containing catalyst particles supported by carbon black were observed by a transmission electron microscope. The average particle diameter of the platinum-containing catalyst particles was 5.1 nm (with a standard deviation of ±0.7 nm) from a TEM observation image. Therefore, the average thickness of the platinum layer was 0.25 nm (=(5.1−4.6)/2), and was equivalent to 1.1 (=0.25/0.2265) platinum atomic layer. The performance evaluation of the obtained platinum-based catalyst as the anode catalyst was performed as in the case of Working Example 1.

Working Example 17

The platinum layers were formed so that the surfaces of the ruthenium nanoparticles were covered with the platinum layers and the molar ratio of platinum and ruthenium reached a set molar ratio (a feeding molar ratio) of 2:3 in a platinum-containing catalyst to be prepared. As in the case of Working Example 16 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 5.6 nm (with a standard deviation of ±0.8 nm) from a TEM observation image. Therefore, the average thickness of the platinum layer was 0.5 nm (=(5.6−4.6)/2), and was equivalent to 2.2 (=0.5/0.2265) platinum atomic layers.

Working Example 18

The platinum layers were formed so that the surfaces of the ruthenium nanoparticles were covered with the platinum layers and the molar ratio of platinum and ruthenium reached a set molar ratio (a feeding molar ratio) of 1:1 in a platinum-containing catalyst to be prepared. As in the case of Working Example 16 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 5.9 nm (with a standard deviation of ±0.7 nm) from a TEM observation image. Therefore, the average thickness of the platinum layer was 0.65 nm (=(5.9−4.6)/2), and was equivalent to 2.9 (=0.65/0.2265) platinum atomic layers.

Working Example 19

The platinum layers were formed so that the surfaces of the ruthenium nanoparticles were covered with the platinum layers and the molar ratio of platinum and ruthenium reached a set molar ratio (a feeding molar ratio) of 3:2 in a platinum-containing catalyst to be prepared. As in the case of Working Example 16 except for this, the platinum-containing catalyst was synthesized, refined and dried, and the performance evaluation of the platinum-containing catalyst was performed. The platinum-containing catalyst particles supported by carbon black were observed by a transmission electron microscope. The average particle diameter of the platinum-containing catalyst particle was 6.4 nm (with a standard deviation of ±0.8 nm) from a TEM observation image. Therefore, the average thickness of the platinum layer was 0.9 nm (=(6.4−4.6)/2), and was equivalent to 4.0 (=0.9/0.2265) platinum atomic layers.

As comparative examples, the following fuel cells were formed and the performance evaluation thereof was performed to determine the output retention ratios thereof as in the case of Working Example 1.

Comparative Example 1

As an anode catalyst, a platinum/ruthenium alloy catalyst (with a molar ratio of platinum and ruthenium of 1:1; manufactured from Tanaka Kikinzoku Kogyo K.K.) supported by carbon was used. As in the case of Working Example 1 except for this, the performance evaluation of the catalyst was performed. Note that it was confirmed from analysis of XAFS (X-ray absorption fine structure) determined from X-ray absorption spectrum using radiation light that the platinum/ruthenium alloy catalyst used herein was an alloy catalyst with Ru:Pt=1:1 and did not have a core-shell structure.

Comparative Example 2

As an anode catalyst, the platinum/ruthenium alloy catalyst used in Comparative Example 1 was used, and the abundance of the platinum/ruthenium alloy nanoparticles in an anode catalyst layer was 20 mg per cm$^2$. As in the case of Working Example 1 except for this, the performance evaluation of the catalyst was performed.
Characteristics of Fuel Cell
Relationship Between Structure of Platinum-Containing Catalyst Particle and Output Retention Ratio of Fuel Cell FIG. 8 is an illustration of a relationship between the average particle diameters of ruthenium nanoparticles and platinum-containing catalyst particles, the thickness of the platinum layer and the molar ratio of platinum and ruthenium, and the output retention ratio of the fuel cell in each of the working examples of the disclosure.

In FIG. 8, a heating-up time t (min) was a time for increasing, to 170° C. with use of a heating apparatus, the temperature of a solution formed by dissolving ruthenium (III) chloride in ethylene glycol, then adding an aqueous NaOH solution to ethylene glycol while the solution was stirred in the preparation of core particles forming the cores of the platinum-containing catalyst.

Moreover, in FIG. 8, the particle diameter $R_1$ of the ruthenium nanoparticle (core particle) and the particle diameter $R_2$ of the platinum-containing catalyst particle were average particle diameters obtained by an analysis of the above-described TEM images, and the diameter ratio $(R_2/R_1)$ and the thickness (average thickness) $((R_2-R_1)/2)$ of the platinum layer (shell layer) were determined with use of the average particle diameters $R_2$ and $R_1$.

Further, in FIG. 8, the molar ratio γ (Pt/Ru) of Pt forming the platinum-containing catalyst to Ru was a feeding molar ratio (a set value of the composition of a platinum-containing catalyst to be prepared), and it was confirmed that the result of a composition analysis by an ICP (inductively coupled plasma) analysis of the prepared platinum-containing catalyst was equal to the feeding molar ratio, and it was confirmed that nearly 100% of metal in a raw material used in each of Working Examples 1 to 19 was included in the prepared platinum-containing catalyst.

Next, based on the result illustrated in FIG. 8, a relationship between the structure of the core-shell type platinum-containing catalyst particle and the output retention ratio of the fuel cell will be described referring to FIGS. 9 to 14.

Figure 9:
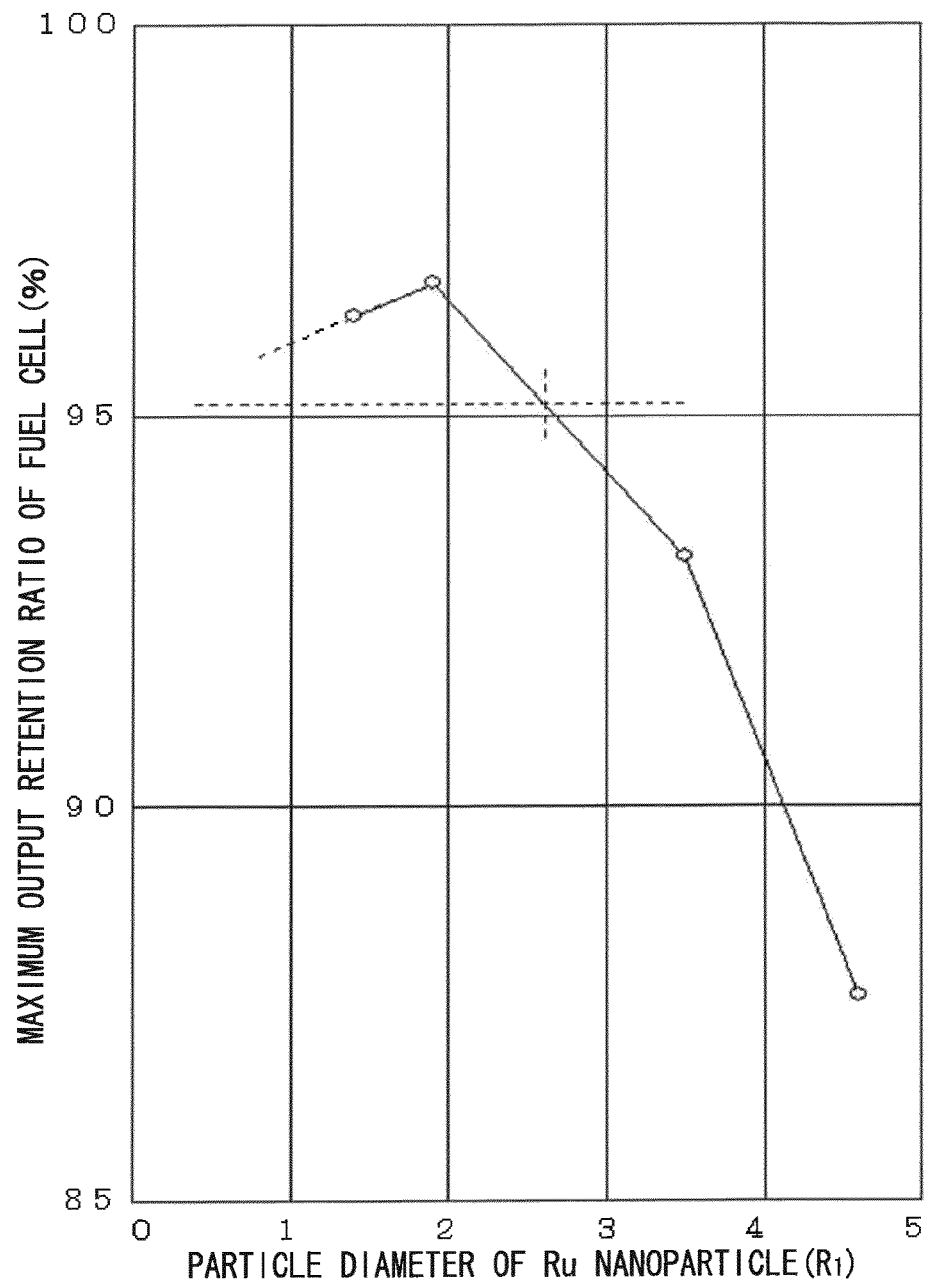
FIG. 9 is an illustration of a relationship between the particle diameter of the ruthenium nanoparticle in the platinum-containing catalyst particle and a maximum output retention ratio of the fuel cell in the above-described working examples of the disclosure.

Relationship Between Particle Diameter of Ru Nanoparticle and Maximum Output Retention Ratio of Fuel Cell FIG. 9 is an illustration of a relationship between the average particle diameter ($R_1$) of the ruthenium nanoparticle in the platinum-containing catalyst particle and the maximum output retention ratio of the fuel cell in the working examples of the disclosure.

In FIG. 9, a horizontal axis indicates the average particle diameter ($R_1$ (nm)) of the ruthenium nanoparticle (core particle), and a vertical axis indicates the maximum output retention ratio (%) of the fuel cell. The maximum output retention ratio (%) indicates a highest value of obtained output retention ratios (%) of fuel cells in which in FIG. 8, the average particle diameter ($R_1$) of the core particle was the same and the average particle diameter ($R_2$) of the platinum-containing catalyst was different.

Fuel cells illustrated in Working Examples 1 to 4 and 13 used platinum-containing catalysts including the core particles with an average particle diameter of 1.4 nm, and the maximum output retention ratio thereof was 96.3% (Working Example 3). Likewise, the maximum output retention ratio of fuel cells using platinum-containing catalysts including the core particles with an average particle diameter of 1.9 nm was 96.7% (Working Example 7), and the maximum output retention ratio of fuel cells using platinum-containing catalysts including the core particles with an average particle diameter of 3.5 nm was 93.2% (Working Example 11), and the maximum output retention ratio of fuel cells using platinum-containing catalysts including the core particles with an average particle diameter of 4.6 nm was 87.6% (Working Example 18).

When the average particle diameter ($R_1$) of the ruthenium nanoparticle (core particle) was within a range of 1.0 nm to 2.6 nm both inclusive by interpolation and extrapolation, the maximum output retention ratio had a value of 95% or over indicated by a dotted line in FIG. 9, and when the average particle diameter ($R_1$) of the core particle was 3 nm or less, the maximum output retention ratio was sharply reduced.

Figure 10:
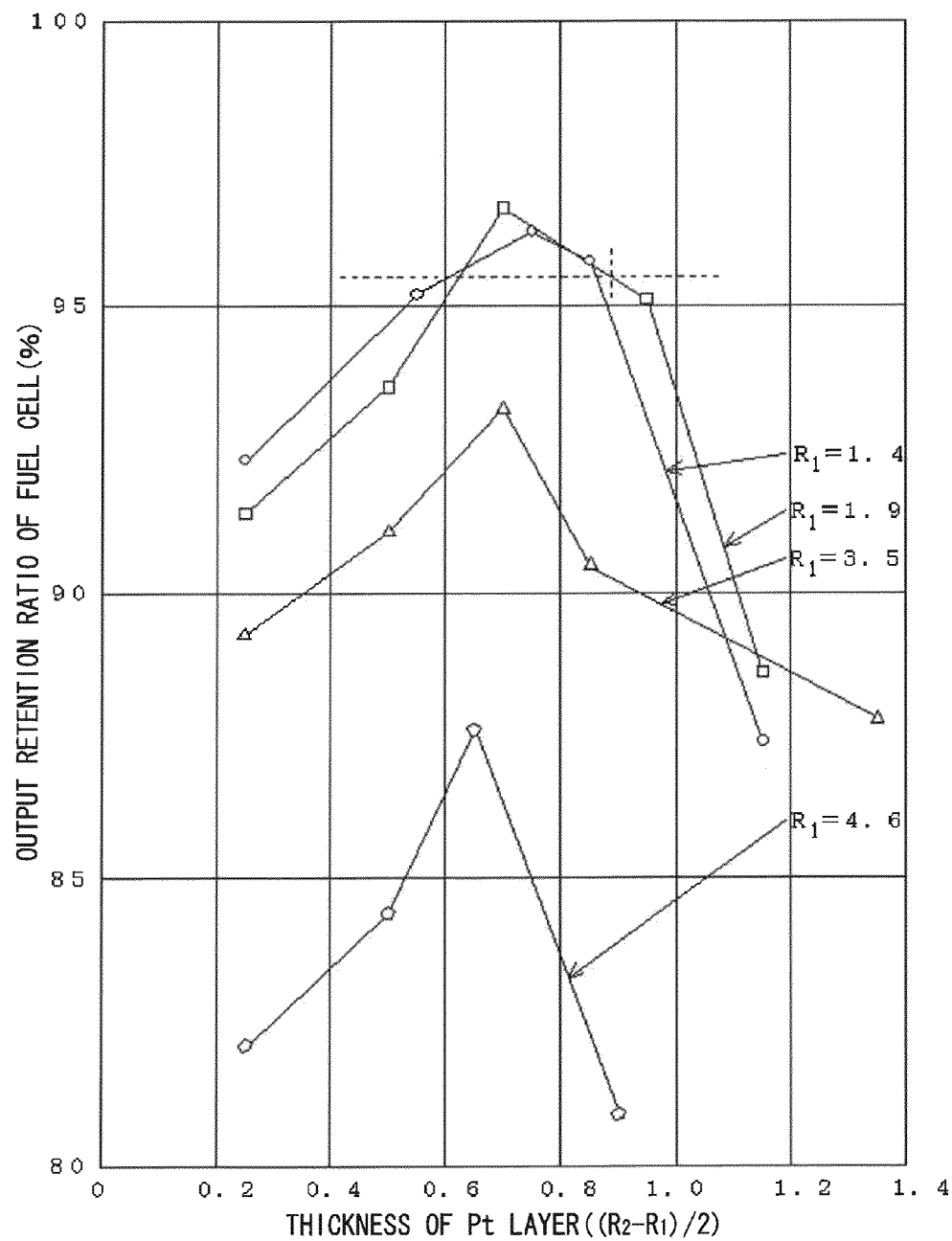
FIG. 10 is an illustration of a relationship between the thickness of the platinum layer in the platinum-containing catalyst and the output retention ratio of the fuel cell in the above-described working examples of the disclosure.

Relationship Between Thickness of Platinum Layer and Output Retention Ratio of Fuel Cell FIG. 10 is an illustration of a relationship between the average thicknesses of the platinum layers (shell layers) in the platinum-containing catalysts including core particles with the same average particle diameter ($R_1$) and the output retention ratios of the fuel cells in the working examples of the disclosure.

In FIG. 10, a horizontal axis indicates the thickness (average thickness (nm)) ($t_s=(R_2-R_1)/2$) of the platinum layer (shell layer) (refer to FIG. 8), and a vertical axis indicates the output retention ratio (%) of the fuel cell (refer to FIG. 8).

As illustrated in FIG. 10, even in the case where the average particle diameter ($R_1$) of the core particles was changed, when the average thickness ($t_s$) of the shell layer was within a range of 0.6 nm to 0.9 nm, the output retention ratio of the fuel cell had a maximum value, but as illustrated in FIG. 9, the maximum value was reduced with an increase in the average particle diameter ($R_1$) of the core particle.

It was indicated that in the case where the average particle diameter $R_1$ of the core particle was within a range of 1.4 nm to 3.5 nm, when the average thickness $t_s$ of the shell layer (platinum layer) was within a range of 0.25 nm to 0.95 nm, the output density was in a sufficiently practical level (which will be described later), and the output retention ratio was as high as approximately 90% or over, and durability was good. Note that in FIG. 8, as illustrated in Comparative Examples 1 and 2, the output retention ratio of a commercially available platinum-containing catalyst was 80% or less.

In the case where the average particle diameter ($R_1$) of the core particle was 1.4 nm or 1.9 nm, when the average thickness ($t_s$) of the shell layer was within a range of 0.6 nm to 0.9 nm both inclusive by interpolation, the output retention ratio had a value of 95% or over as indicated by a dotted line in FIG. 10.

As described above, the above-described thickness of 0.25 nm to 0.95 nm both inclusive of the shell layer is equivalent to 1.2 to 4.2 platinum atomic layers, and the above-described thickness of 0.6 nm to 0.9 nm both inclusive of the shell layer is equivalent to 2.6 to 4.0 platinum atomic layers, where the thickness of one platinum atomic layer is 0.2265 nm.

In FIG. 5, the Pt 5d electron binding force on the outermost surface represented by a "square mark" had a large value with a gentle reduction in the case where the number of stacked Pt atomic layers was within a range of 1 to 4, and had a small value in the case where the number of stacked Pt atomic layers was 5, and the range of 1 to 4 stacked Pt atomic layers which allowed the Pt 5d electron binding force on the outermost surface to have a large value was substantially equal to the above-described range of 2.6 to 4.0 platinum atomic layers in this result.

Such a match between the result indicated in FIG. 5 and the result indicated in FIG. 10 indicated that a substantially correct electronic state of platinum in the core-shell type platinum-containing catalyst was estimated by the first-principles calculation based on density functional theory, and the stacking model illustrated in FIG. 2(B) used for the first-principles calculation was appropriate.

Figure 11:
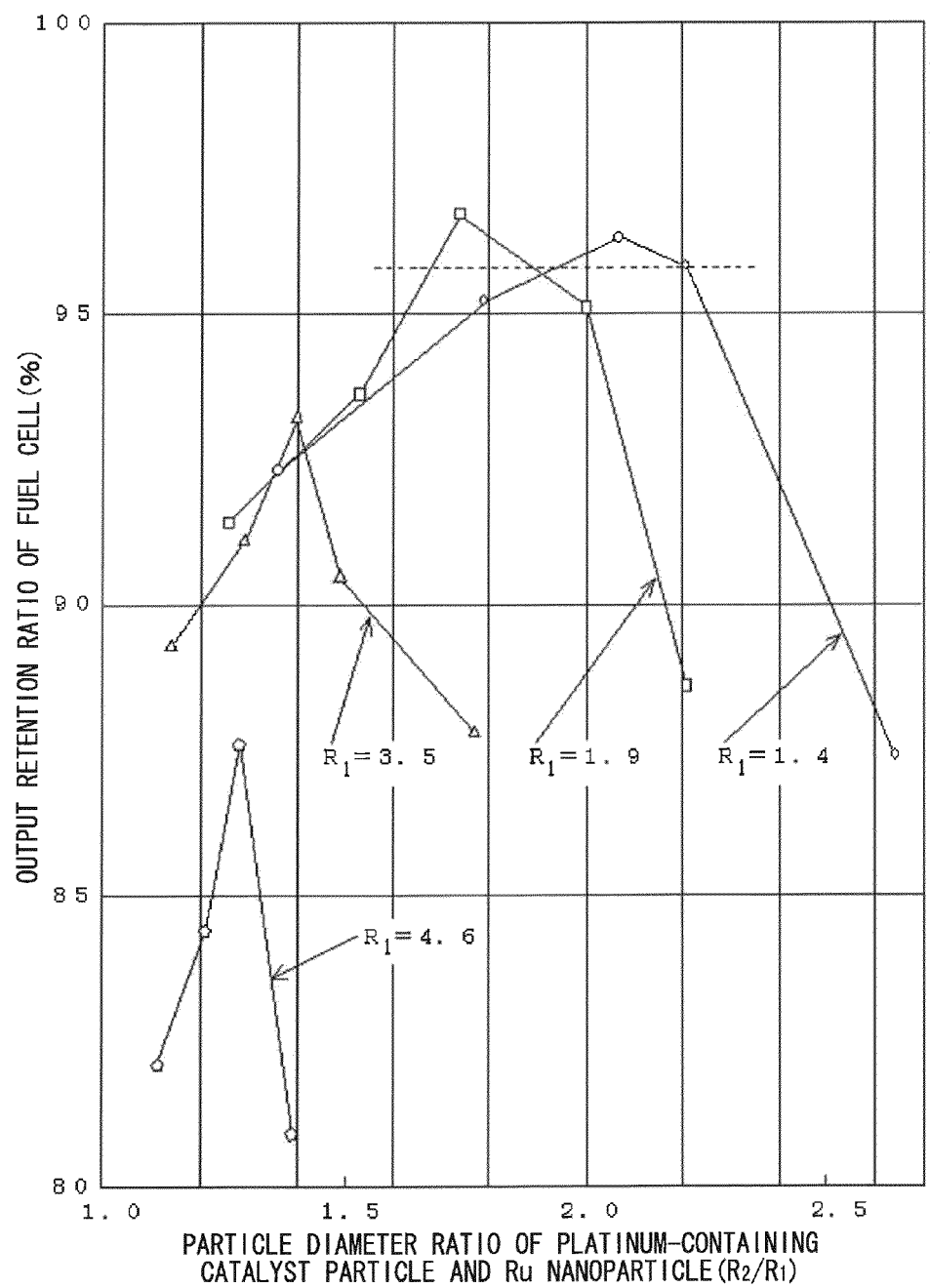
FIG. 11 is an illustration of a relationship between a particle diameter ratio of the platinum-containing catalyst particle and the ruthenium nanoparticle and the output retention ratio of the fuel cell in the above-described working examples of the disclosure.

Particle Diameter Ratio of Platinum-Containing Catalyst Particle and Ru Nanoparticle and Output Retention Ratio of Fuel Cell FIG. 11 is an illustration of a relationship between the particle diameter ratios ($R_2/R_1$) of the platinum-containing catalyst particle and the ruthenium nanoparticle in platinum-containing catalysts including the core particles with the same particle diameter ($R_1$) and the output retention ratios of the fuel cells in the working examples of the disclosure.

In FIG. 11, a horizontal axis indicates the particle diameter ratio ($R_2/R_1$) of the platinum-containing catalyst particle and the ruthenium nanoparticle (refer to FIG. 8), and a vertical axis indicates the output retention ratio (%) of the fuel cell (refer to FIG. 8).

In the case where the average particle diameter ($R_1$) of the core particle was 1.4 nm or 1.9 nm by interpolation and extrapolation, when the particle diameter ratio ($R_2/R_1$) was within a range of 1.7 to 2.2 both inclusive, the output retention ratio had a value of 95% or over as indicated by a dotted line in FIG. 11.

Figure 12:
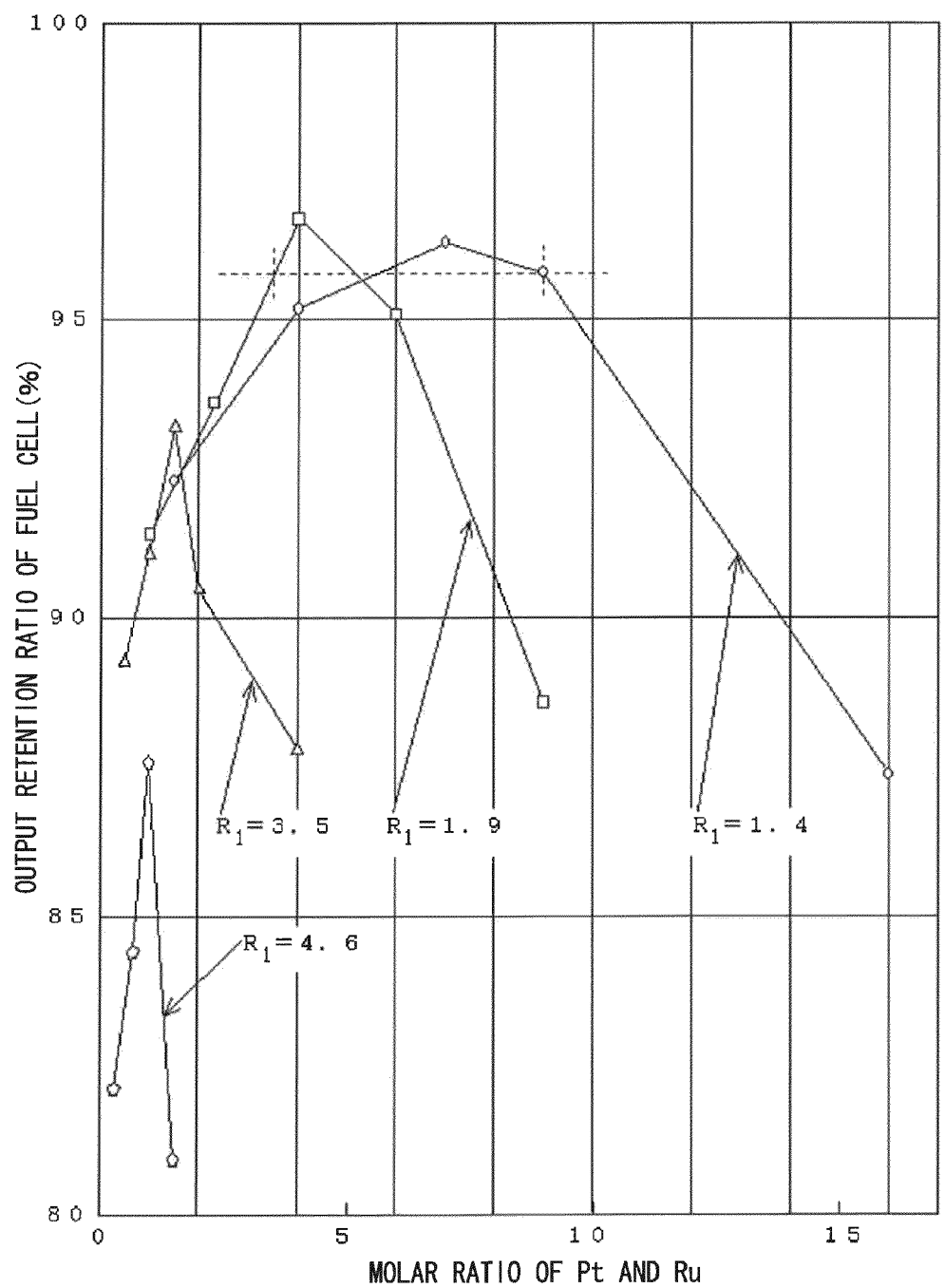
FIG. 12 is an illustration of a relationship between the molar ratio of platinum and ruthenium in the platinum-containing catalyst particle and the output retention ratio of the fuel cell in the above-described working examples of the disclosure.

Relationship Between Molar Ratio of Pt and Ru and Output Retention Ratio of Fuel Cell FIG. 12 is an illustration of a relationship between the molar ratios (γ) of platinum and ruthenium in the platinum-containing catalysts including the core particles with the same particle diameter ($R_1$) and the output retention ratios of the fuel cells in the working examples of the disclosure.

In FIG. 12, a horizontal axis indicates the molar ratio γ (Pt/Ru) of platinum to ruthenium (refer to FIG. 8) and a vertical axis indicates the output retention ratio (%) of the fuel cell (refer to FIG. 8).

In the case where the average particle diameter ($R_1$) of the core particle was 1.4 nm or 1.9 nm by interpolation and extrapolation, when the molar ratio γ (Pt/Ru) was within a range of 3.5 to 9.0 both inclusive, the output retention ratio had a value of 95% or over as indicated by a dotted line in FIG. 12.

Figure 13:
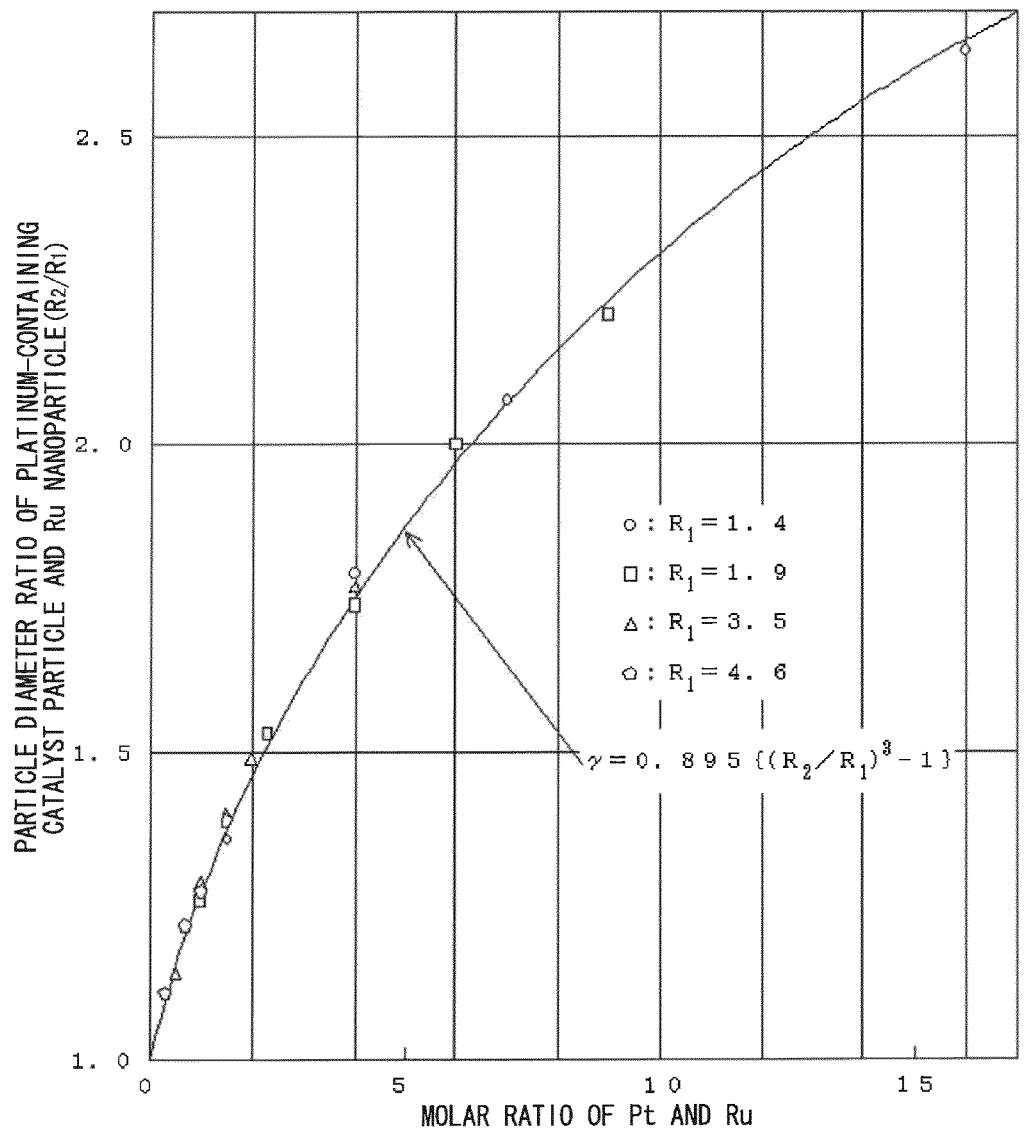
FIG. 13 is an illustration of a relationship between the molar ratio of platinum and ruthenium in the platinum-containing catalyst particle and the particle diameter ratio of the platinum-containing catalyst particle and the ruthenium nanoparticle in the above-described working examples of the disclosure.

Relationship Between Molar Ratio of Pt and Ru and Particle Diameter Ratio of Platinum-Containing Catalyst Particle and Ru Nanoparticle FIG. 13 is an illustration of a relationship between the molar ratios (γ) of platinum and ruthenium and the particle diameter ratios ($R_2/R_1$) of the platinum-containing catalyst particle and the ruthenium nanoparticle in the platinum-containing catalysts in the working examples of the disclosure.

In FIG. 13, a horizontal axis indicates the molar ratio γ (Pt/Ru) of platinum to ruthenium (refer to FIG. 8) and a vertical axis indicates the particle diameter ratio ($R_2/R_1$) (refer to FIG. 8).

As the core particle was made of ruthenium and the shell layer was made of platinum, as a relational formula between the molar ratio γ (Pt/Ru) and the particle diameter ratio ($R_2/R_1$), the above-described formula (7) ($\gamma=0.895\{(R_2/R_1)^3-1\}$) was established. In FIG. 13, the relational formula is represented by a curve represented by a solid line, and plot points of the molar ratio γ (Pt/Ru) and the particle diameter ratio ($R_2/R_1$) illustrated in FIG. 8 are on or around the solid line.

Figure 14:
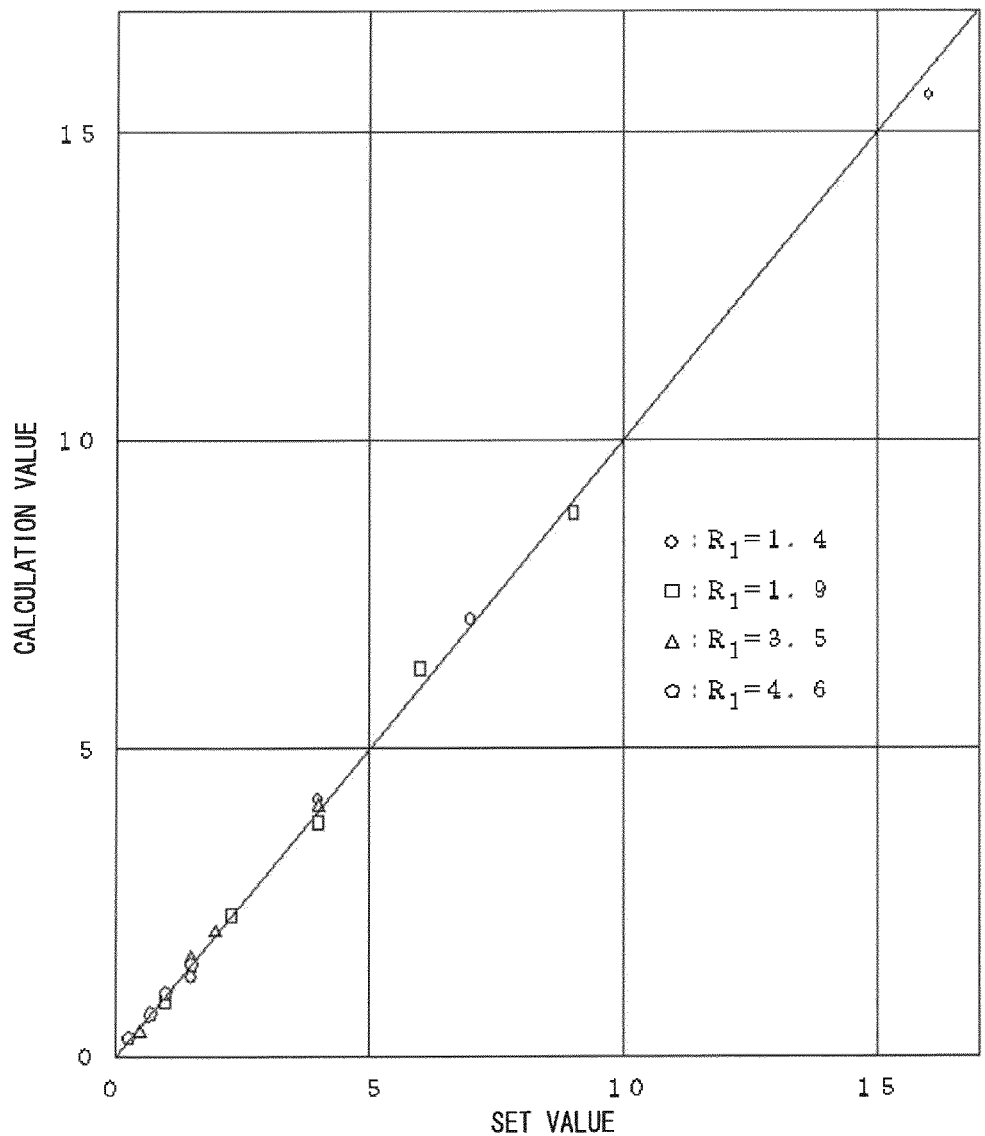
FIG. 14 is an illustration of a relationship between a set value and a calculation value of the molar ratio of platinum and ruthenium in the platinum-containing catalyst particle in the above-described working examples of the disclosure.

Relationship Between Set Value and Calculation Value of Molar Ratio of Pt and Ru FIG. 14 is an illustration of a relationship between set values and calculation values of the molar ratios γ (Pt/Ru) of platinum and ruthenium in the platinum-containing catalysts in the working examples of the disclosure.

In FIG. 14, a horizontal axis indicates the set value of the molar ratio γ (Pt/Ru) of platinum to ruthenium (the feeding molar ratio illustrated in FIG. 8) and a vertical axis indicates the calculation value determined by the above-described formula (7) with use of the average particle diameter $R_1$ of the platinum-containing catalyst particle (refer to FIG. 8) and the average particle diameter $R_2$ of the ruthenium nanoparticle (refer to FIG. 8), and it is indicated that the set value and the calculation value are in good agreement with each other.

Results illustrated in FIGS. 13 and 14 indicated that it was appropriate to consider the platinum-containing catalyst with the core-shell structure illustrated in the upper drawing in FIG. 2(A) as a sphere having a structure in which the shell layer with the average particle diameter $R_2$ was formed on the surface of the core particle with the average particle diameter $R_1$.

These are descriptions of the relationship between the structure of the core-shell type platinum-containing catalyst particle and the output retention ratio of the fuel cell. Next, electron diffraction and particle diameter distributions of the ruthenium microparticles and the core-shell type platinum-containing catalyst particles will be described below, and initial output characteristics of a direct methanol fuel cell using the core-shell type platinum-containing catalyst particle as an anode catalyst will be described below.

Figure 19:
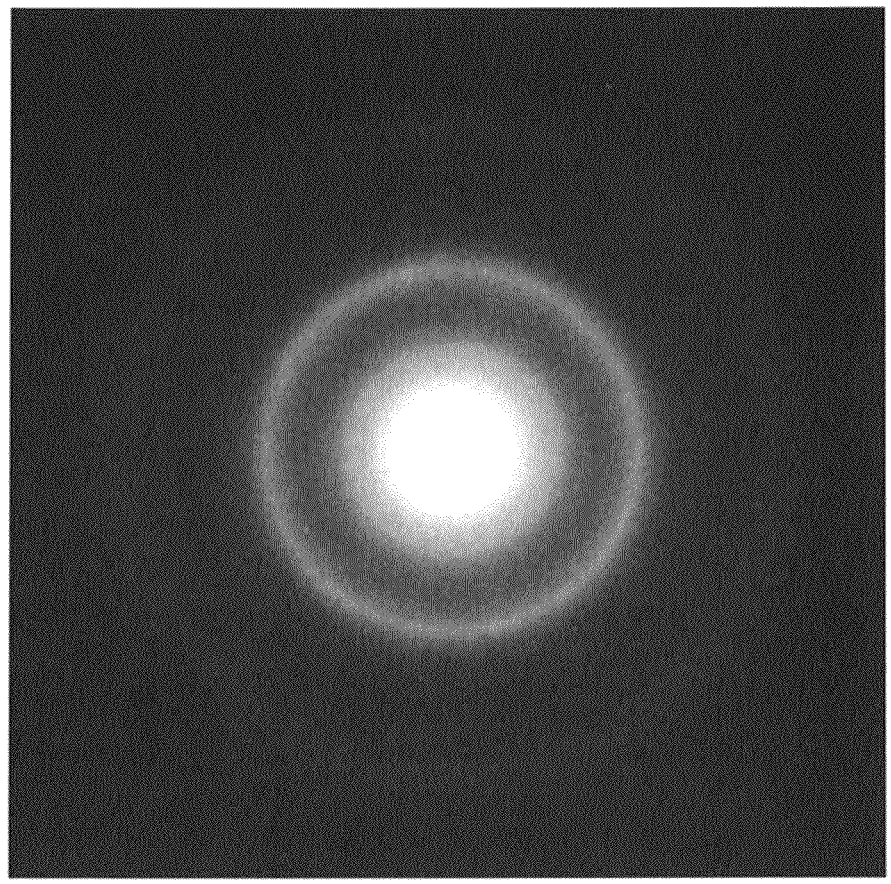
FIG. 19 is an electron diffraction image of a Ru microparticle synthesized in Working Examples 5 to 8 of the disclosure.

FIG. 19 is an electron diffraction image of the Ru microparticle synthesized in Working Examples 5 to 8. In FIG. 19, a sharp diffraction line or a Laue pattern is not observed, and a broad diffraction pattern indicating that the Ru microparticle was amorphous was observed. On the other hand, FIG. 20(a) is an electron diffraction image of a Ru microparticle covered with Pt obtained in Working Example 5. In FIG. 20(a), a sharp diffraction line by a platinum atomic layer with a face-centered cubic lattice structure was observed. FIG. 20(b) is an electron diffraction image of a Ru microparticle covered with Pt obtained in Working Example 6. In FIG. 20(b), a diffraction line by the platinum atomic layer was clearer, and a diffraction pattern of the ruthenium microparticle was not observed. Accordingly, it was obvious that in the Ru microparticle covered with Pt, the whole Ru microparticle was covered with the platinum layer.

FIG. 21(a) is a graph indicating a particle diameter distribution of Ru microparticles synthesized in Working Examples 5 to 8. Diameters in an x-direction and a y-direction of each particle were measured with use of TEM photographs, and the arithmetic mean of the particle diameters in the x-direction and the y-direction was defined as the particle diameter. The particle diameter distribution was determined by determining the particle diameters of 1000 particles. As a result, the average particle diameter of the Ru microparticle was 1.9 nm and the standard deviation thereof was 0.4 nm. On the other hand, FIG. 21(b) is a graph indicating a particle diameter distribution of the Ru microparticles covered with Pt obtained in Working Example 6. The particle diameter was measured in the above-described manner. As a result, the average particle diameter of the Ru microparticle covered with Pt was 2.9 nm, and the standard deviation thereof was 0.5 nm.

It was obvious from FIG. 21 that even though both of the Ru microparticle and the Ru microparticle covered with Pt were microparticles, variations in particle diameter was small. As will be described later, the particle diameter greatly affects catalyst performance, so allowing particles with such a small particle diameter to be formed with a uniform particle size is an important improvement. Attention was particularly focused on the fact that when the Ru microparticles were changed to Ru microparticles covered with Pt by the formation of the platinum layer, only the average particle diameter was shifted from 1.9 nm to 2.9 nm with little increase in variations in particle diameter. This indicated that the whole surface of each of the Ru microparticles was covered with the platinum layer with a uniform thickness.

It was obvious from the results indicated in FIGS. 19 to 21 that in the Ru microparticle covered with Pt, the whole Ru microparticle was covered with the platinum layer with an extremely thin and uniform thickness.

FIGS. 22 to 27 illustrate initial output data, and illustrate (a) current density-voltage curves and (b) current density-output density curves of the fuel cells obtained in Working Examples 1 to 19 and Comparative Examples 1 and 2.

Figure 25:
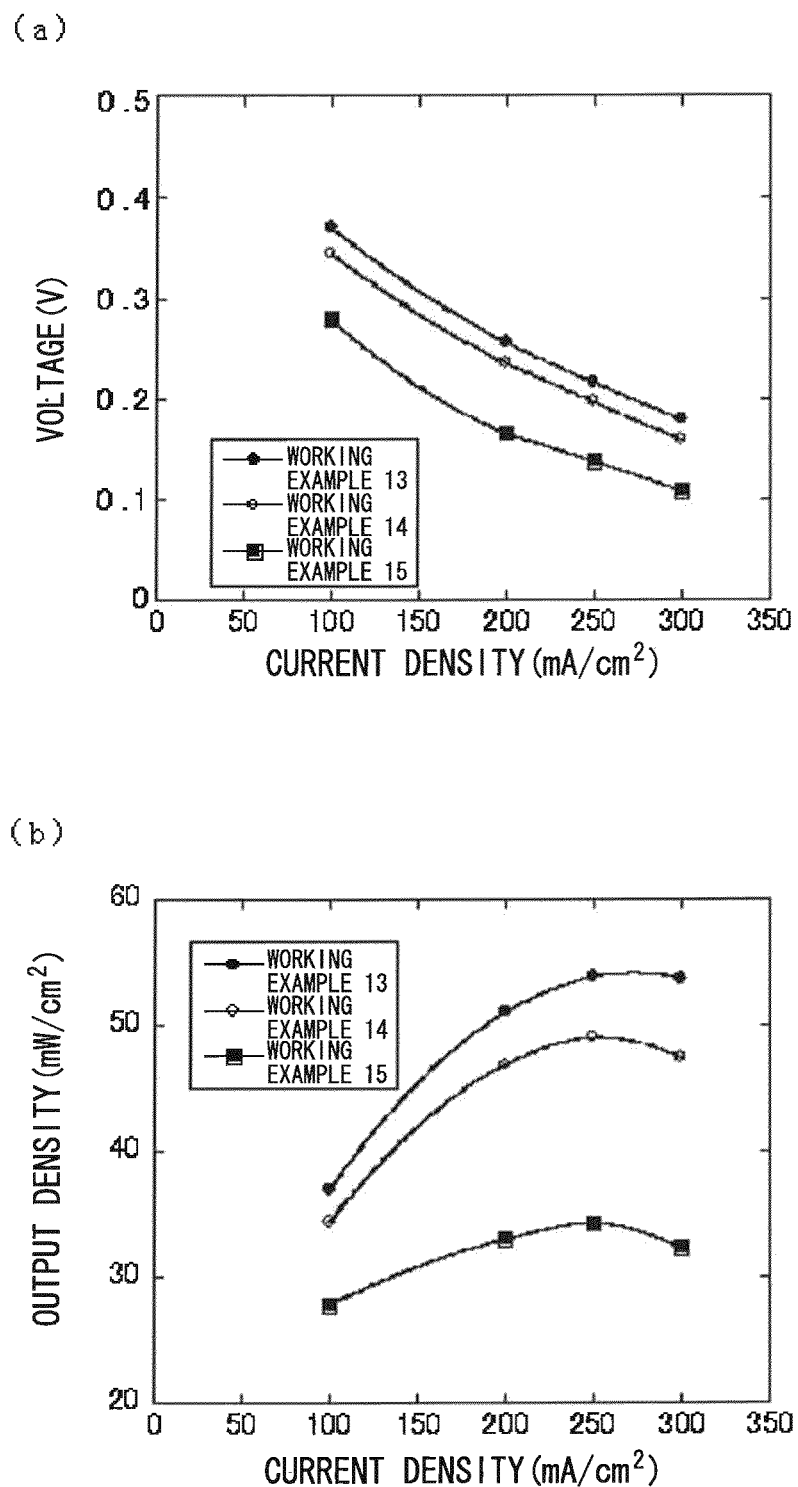
FIG. 25 illustrates current density-voltage curves (a) and current density-output density curves (b) of fuel cells obtained in Working Examples 13 to 15 of the disclosure.
Figure 28:
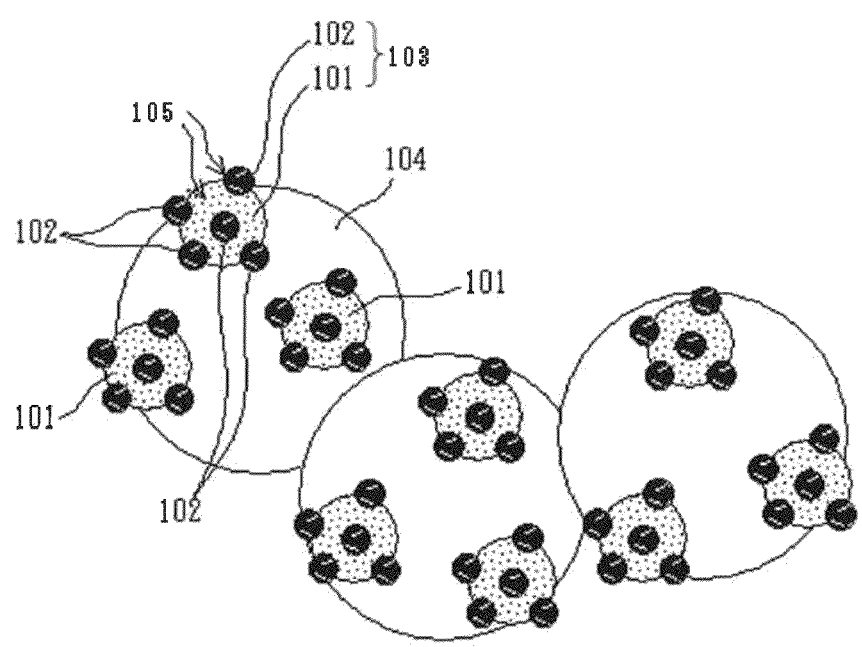
FIG. 28 is a schematic view of a catalyst illustrated in FIG. 1 of PTL2 in related art.

First, it was obvious from comparisons between the working examples in which the particle diameter of the Ru microparticle was the same, that is, a comparison between Working Examples 1 to 4 illustrated in FIG. 22 and Working Example 13 illustrated in FIG. 25, a comparison between Working Examples 5 to 8 illustrated in FIG. 23 and Working Example 14 illustrated in FIG. 25, and a comparison between Working Examples 9 to 12 illustrated in FIG. 25 and Working Example 15 illustrated in FIG. 25 that when the average thickness of the platinum layer with which the Ru microparticle was covered was 1.0 nm or less, and the average number of stacked platinum atomic layers forming the platinum layer was 4 or less, a large output was obtained.

It was considered as a cause thereof that as the platinum layer was extremely thin, ruthenium atoms forming a base layer of the platinum layer also strongly affected the electronic state of the platinum atoms on the surface of the platinum layer (the ligand effect) so as to prevent excessive absorption of carbon monoxide in an active site of the surface of the platinum layer; therefore, oxidation of carbon monoxide on the platinum layer easily occurred. Moreover, as the platinum layer was extremely thin, the influence of the ruthenium layer of the Ru microparticle remained as a distortion in a crystal lattice on the surface of the platinum layer, and the distortion changed the electronic state of the platinum atoms present on the surface; therefore, there was a possibility that the oxidation of carbon monoxide might easily occur.

It was obvious from a comparison between the working examples in which the particle diameters of the Ru microparticles were different from one another, that is, a comparison between Working Examples 1 to 4 illustrated in FIG. 22, Working Examples 5 to 8 illustrated in FIG. 23, Working Examples 9 to 12 illustrated in FIG. 24 and Working Examples 16 to 19 illustrated in FIG. 26 that the smaller the particle diameter of the Ru microparticle was, the larger output tended to be obtained. It was considered as a cause thereof that when the particle diameter of the Ru microparticle was reduced, the particle diameters of a catalyst particle on which the platinum layer was formed and the Ru microparticle covered with Pt were also reduced, and the specific surface area of the catalyst particle was increased to increase an affective surface area for catalysis, though it is not peculiar to the disclosure.

Moreover, it was obvious from a comparison between Working Examples 1 to 12 illustrated in FIGS. 22 to 24, Working Examples 16 to 19 illustrated in FIG. 26 and Comparative Examples 1 and 2 illustrated in FIG. 27 that in Working Examples 1 to 12 illustrated in FIGS. 22 to 24 in which the average particle diameter of the Ru microparticle was 3.5 nm or less, a MDFC using the platinum-containing catalyst based on the disclosure was allowed to achieve a higher output density than a MDFC using a commercially available platinum/ruthenium alloy catalyst which achieved high activity based on the bi-functional mechanism. It was also obvious that the DMFC with a high output density was obtained also in the case where the amount of used platinum was smaller than that in the platinum/ruthenium alloy catalyst.

Further, it was obvious from FIG. 8 that the output retention ratios of the DMFCs in Working Examples 1 to 19 illustrated in FIGS. 22 to 24 were extremely superior to those in Comparative Examples 1 and 2 illustrated in FIG. 27. It was considered that it was because in the platinum/ruthenium alloy catalyst, a large amount of Ru was present on the surface of the catalyst particle, so a decline in performance due to elution of Ru was pronounced, and on the other hand, in the platinum-containing catalyst based on the disclosure, the surface of the Ru microparticle was completely covered with the platinum layer; therefore, the elution of Ru was prevented.

A summary of the results indicated in FIGS. 8 and 22 to 27 of the current density and the output retention ratio is as follows.

As illustrated in FIGS. 22(b) to 24(b), in Working Examples 1 to 12, when the current density was 200 mA/cm$^2$ or over, the output density at a practical level was 60 mW/cm$^2$ or over. On the other hand, as illustrated in FIGS. 25(b) to 27(b), in Working Examples 13 to 19 and Comparative Examples 1 and 2, the output density at a practical level was 60 mW/cm$^2$ or less.

As illustrated in FIGS. 8 and 22(b), in Working Examples 1 to 4, the average particle diameter $R_1$ of the core particle was 1.4 nm, and the average thickness $t_s$ of the shell layer (platinum layer) was within a range of 0.25 nm to 0.85 nm, and the output retention ratio was within a range of 92.3% to 96.3%, and the output density at a current density of 300 mA/cm$^2$ was 80 mW/cm$^2$ or over.

As illustrated in FIGS. 8 and 23(b), in Working Examples 5 to 7, the average particle diameter $R_1$ of the core particle wa 1.9 nm, the average thickness $t_s$ of the shell layer (platinum layer) was within a range of 0.25 nm to 0.70 nm, and the output retention ratio was within a range of 91.4% to 96.7%, and the output density at a current density of 300 mA/cm$^2$ was 80 mW/cm$^2$ or over.

As illustrated in FIGS. 8 and 24(b), in Working Examples 10 and 11, the average particle diameter $R_1$ of the core particle was 3.5 nm, the average thickness $t_s$ of the shell layer (platinum layer) was within a range of 0.50 nm to 0.70 nm, and the output retention ratio was within a range of 91.1% to 93.2%, and the output density at a current density of 300 mA/cm$^2$ was 80 mW/cm$^2$ or over.

As illustrated in FIGS. 8 and 22(b) to 24(b), in the case where the average particle diameter $R_1$ of the core particle was within a range of 1.4 nm to 3.5 nm, when the average thickness $t_s$ of the shell layer (platinum layer) was within a range of 0.25 nm to 0.85 nm, the output density at a current density of 300 mA/cm$^2$ was 80 mW/cm$^2$ or over.

Moreover, in the case where the average particle diameter $R_1$ of the core particle was within a range of 1.4 nm to 3.5 nm, when the average thickness $t_s$ of the shell layer (platinum layer) was within a range of 0.25 nm to 0.95 nm, the output density at a current density of 300 mA/cm$^2$ was 70 mW/cm$^2$ or over. In other words, it was considered that the core-shell type platinum-containing catalyst in which 1 to 4 platinum atomic layers both inclusive were formed on the core particle was in a sufficiently practical level.

As illustrated in FIG. 5, these results corresponded to the fact that the Pt 5d electron binding force on the outermost surface represented by a "square mark" had a large value with a gentle reduction in the case where the number of stacked Pt atomic layers was 1 to 4, and had a small value in the case where the number of stacked Pt atomic layers was 5. This indicated that a substantially correct electronic state of platinum in the core-shell type platinum-containing catalyst was estimated by the first-principles calculation based on density functional theory, and the stacking model illustrated in FIG. 2(B) used for the first-principles calculation was appropriate.

In the case where the average particle diameter $R_1$ of the core particle was within a range of 1.4 nm to 3.5 nm when the average thickness $t_s$ of the shell layer (platinum layer) was within a range of 0.25 nm to 0.95 nm, the core-shell type platinum-containing catalyst had a sufficiently practical output density, and as illustrated in FIG. 10, the core-shell type platinum-containing catalyst had a high output retention ratio of approximately 90% or over.

Next, desirable conditions of the core-shell type platinum-containing catalyst particle by using the output retention ratio as a measure will be described below.

Desirable Structure of Platinum-Containing Catalyst Particle

A desirable range for forming the core-shell type platinum-containing catalyst which is allowed to achieve a reduction in the amount of used platinum and high catalytic activity and is used for a fuel cell is allowed to be determined with use of the output retention ratios of the fuel cells using the platinum-containing catalyst particles indicated in Working Examples 1 to 19 as a measure of evaluation of catalytic activity.

In other words, desirable ranges of the average particle diameter $R_1$ of the core particle, the average particle diameter $R_2$ of the platinum-containing catalyst particle, the average thickness $t_s$ of the shell layer (platinum layer), the particle diameter ratio $(R_2/R_1)$ of the platinum-containing catalyst particle and the core particle, and the molar ratio γ (Pt/Ru) of platinum to ruthenium in the platinum layer in the core-shell type platinum-containing catalyst are allowed to be determined.

Desirable conditions of a platinum-containing catalyst achieving a fuel cell (DMFC) with an output retention ratio of 95% or over including the average particle diameter $R_1$ (nm) of the core particle (the ruthenium nanoparticle), the average thickness $t_s$ $(=(R_2-R_1)/2)$ (nm) of the shell layer (platinum layer), the particle diameter ratio $(R_2/R_1)$ of the platinum-containing catalyst particle and the core particle, and the molar ratio γ (Pt/Ru) of platinum to ruthenium in the platinum layer in the case where the core particle is a ruthenium nanoparticle are as follows.

Condition 1: 1.04 nm≤$R_1$≤2.6 nm (From the result illustrated in FIG. 9)

Condition 2: 0.25 nm≤$t_s$≤0.9 nm (From the result illustrated in FIG. 10)

Condition 3: 1.7≤$(R_2/R_1)$≤2.2 (From the result illustrated in FIG. 11)

Condition 4: 3.5≤γ≤9.0 (From the result illustrated in FIG. 12)

The following is allowed to be derived from Conditions 1 to 4.

(A) With use of Condition 1 (1.0 nm≤$R_1$≤2.6 nm) and Condition 2 (0.6 nm≤$t_s$≤0.9 nm), a desirable condition of the particle diameter $R_2$ of the platinum-containing catalyst particle derived from the formula (11) is 2.2 nm≤$R_2$≤4.4 nm (Condition 5). A result equivalent to Condition 3 is derived from Condition 5 and Condition 1.

Therefore, Condition 5 is derived from Conditions 1 and 2, and Conditions 2, 3 and 4 are further derived.

(B) Moreover, a result equivalent to Condition 1 is derived from Conditions 2 and 3 by the formula (13), and a result corresponding to Condition 5 is derived from the result and Condition 2.

(C) Further, as a desirable condition of the molar ratio γ (Pt/Ru), 3.5≤γ≤8.6 is derived from Condition 3 by the formula (6), but the result is substantially equivalent to Condition 4. Moreover, a result equivalent to Condition 3 is derived from Condition 4 by the formula (5).

Therefore, by (A) and (C), Condition 5 is derived from Conditions 1 and 2, and Conditions 2, 3 and 4 are derived. Moreover, by (B) and (C), Conditions 1 and 5 are derived from Conditions 2 and 3, and Conditions 2, 3 and 4 are derived.

As described above, to achieve a platinum-containing catalyst with a less platinum content and high catalytic activity, and to increase the retention ratio in the case where the platinum-containing catalyst is used as a fuel electrode catalyst of a DMFC, irrespective of the element forming the core particle, it is desirable to satisfy 1.0 nm≤$R_1$≤2.6 nm (Condition 1) and 0.25 nm≤$t_s$≤0.9 nm (Condition 2).

When the particle diameter ratio $(R_2/R_1)$ and the average particle diameter $R_2$ of the platinum-containing catalyst particle automatically satisfying Conditions 3 and 5 are derived by $R_1$ and $t_s$ satisfying Conditions 1 and 2, and an element M forming the core particle is specified, the molar ratio γ (Pt/M) of Pt to the element M is derived from the particle diameter ratio $(R_2/R_1)$ by the formula (6).

Therefore, when $R_1$ and $t_s$ are determined so as to satisfy Conditions 1 and 2, and an atom forming the core particle is determined so that the average binding energy of electrons in the 5d orbital of platinum present on an interface between the core particle and the platinum shell layer is 4.0 eV or over, the structure of the platinum-containing catalyst with a less platinum content and high catalytic activity is allowed to be determined.

As described above, in the platinum-containing catalyst according to the disclosure, 0.25 nm≤$t_s$≤0.9 nm and 1.0 nm≤$R_1$≤2.6 nm are satisfied, where the average particle diameter of the core particle is $R_1$ and the average thickness of the platinum shell layer is $t_s$; therefore, the amount of used platinum necessary to form the platinum-containing catalyst is allowed to be remarkably reduced, and the material cost of platinum is allowed to be remarkably reduced.

For example, in the case where the average particle diameter of the core particle is within a range of 1 nm to 2 nm, when the number of platinum atomic layers of the shell layer formed on the surface of the core particle is changed from 5 to 3, the volume of the shell layer is reduced to approximately 40% of that of the shell layer including 5 platinum atomic layers; therefore, the material cost of platinum necessary to form the platinum-containing catalyst is allowed to be reduced by approximately 60% (where the thickness of one platinum atomic layer is 0.2265 nm).

In the disclosure, the core particle is made of a metal element except for Pt satisfying 4.0 eV≤$E_{int}$≤5.0 eV and 3.0 eV≤$E_{out}$≤4.5 eV, where the 5d electron binding forces (eV) of platinum present on the interface between the core particle and the platinum shell layer and platinum present on the outermost surface of the platinum shell layer are $E_{int}$ and $E_{out}$, respectively; therefore, a platinum-containing catalyst which is allowed not only to greatly reduce the amount of used platinum but also to have high catalytic activity is achievable.

In the platinum-containing catalyst of the disclosure, the molar ratio γ (Pt/M) of Pt of the shell layer to the element M forming the core particle is not important, and the average thickness ($t_s$) of the platinum layer and the average particle diameter $R_1$ of the core particle characterize the structure of the platinum-containing catalyst. In the platinum-containing catalyst, small values of $t_s$ and $R_1$ are used; therefore, in the case where the core metal particle is made of an expensive metal element, the smaller the particle diameter of the core metal particle is, the larger the surface area of the platinum shell layer per unit mass of the catalyst is increased, and the more the catalytic activity is increased, so an expensive metal element such as ruthenium forming the core metal particle and expensive platinum forming the shell layer are allowed to be effectively used, thereby contributing to resource saving.

More specifically, in the catalyst according to the disclosure, the core particle is made of ruthenium so that the electronic state of platinum of the platinum layer is in a desirable state for maintaining high catalytic activity. Therefore, the catalyst in which the platinum layer has a smaller thickness than a platinum layer of a catalyst with a core-shell structure in related art is allowed to exert a catalyst effect, and the amount of used platinum is allowed to be reduced, and efficiency E per amount of used platinum in the whole catalyst is allowed to be improved.

The efficiency E is defined by a formula (19). The platinum-containing catalyst is desired to have large effective utilization rate η and a large activity retention ratio after a lapse of a certain time (a large output retention ratio of a fuel cell) as performance thereof, and both of the effective utilization rate η and the activity retention ratio are desired to have a large value. Therefore, the performance of the catalyst is allowed to be evaluated by the product of two, that is, the effective utilization rate η and the activity retention ratio, and the formula (19) is allowed to be approximately represented by the formula (20).

The ratio of Pt arranged on the outermost surface of the platinum shell layer is the effective utilization rate η defined by the formula (16), and as described above, it is indicated that in the case where the amount of used platinum in the whole catalyst is fixed, the larger the ratio of platinum on the outermost layer exposed to outside is, the more efficiently platinum is used. The activity retention ratio of the platinum-containing catalyst is represented by a ratio (output retention ratio) of an output voltage after a lapse of a certain time (800 hours herein) to an output voltage when a fuel cell using the platinum-containing catalyst is driven for the first time. Moreover, as described above, the number of stacked platinum atomic layers is n=$(t_s/d)$ (where $t_s$ is the average thickness of the platinum shell layer, and d is 0.2265 nm).

Efficiency $E$=(output of fuel cell)×(ratio of Pt arranged on outermost surface of platinum shell layer)×(output retention ratio of fuel cell). (19)

Efficiency $E$=(output of fuel cell)×(activity retention ratio of platinum-containing catalyst)÷(number of stacked platinum atomic layers in platinum shell layer). (20)

In the case where the output of the fuel cell is approximately the same, the smaller the number of stacked platinum atomic layers in the platinum shell layer is, the larger value the efficiency E has. For example, when a comparison between Working Examples 2 and 19 is made assuming that the outputs of the fuel cells in Working Examples 2 and 19 are the same as each other, the following result is obtained.

In Working Example 2, $R_1$ is 1.4 nm, $t_s$ is 0.55 nm and N is 0.55/0.2265=2.428, so the effective utilization rate η is determined as follows by the formula (16):

η={$(0.7+0.55)^3-(0.7+1.428\times0.2265)^3$}/{$(0.7+0.55)^3-(0.7)^3$}=0.547

Moreover, in Working Example 19, $R_1$ is 4.6 nm, $t_s$ is 0.90 nm and N is 0.90/0.2265=3.974, so the effective utilization rate η is determined as follows by the formula (16):

η={$(2.3+0.9)^3-(2.3+2.974\times0.2265)^3$}/{$(2.3+0.9)^3-(2.3)^3$}=0.314

Assuming that the outputs of the fuel cells in Working Examples 2 and 19 are the same, by the formula (19), the efficiency E of the fuel cell in Working Example 2 is {(95.2×0.547)/(80.9×0.314)=2.05 times as large as the efficiency E of the fuel cell in Working Example 19, and by the formula (20), the efficiency E of the fuel cell in Working Example 2 is {(95.2/2.428)/(80.9/3.974)}=1.93 times as large as the efficiency E of the fuel cell in Working Example 19, and in both cases, the efficiency E in Working Example 2 is approximately 2 times as large as the efficiency E in Working Example 19.

Thus, according to the disclosure, the amount of used platinum is allowed to be reduced, and the elution of core metal in the fuel cell is prevented by the platinum layer; therefore, a reduction in catalytic activity is preventable, and the efficiency E per volume of platinum is allowed to be improved, and a low-cost platinum-containing catalyst with a long lifetime is achievable.

These are descriptions of the working examples.

In platinum, the density of states of d-electrons just above the Fermi level is large and platinum is considered as an element which easily absorbs a molecule, and gas absorption performance is determined by an interaction between the d-band of metal and a molecular orbital of a gas.

In the disclosure, attention is focused on molecular absorption which is allowed to be changed by tuning the Pt 5d electron binding force, and it is found out that based on the first-principles calculation based on density functional theory, in the core-shell type platinum-containing catalyst including the core metal particle and the platinum shell layer formed on a surface thereof, the 5d electron binding force of platinum forming the shell layer is allowed to be tuned by changing the number of stacked platinum atomic layers forming the platinum shell layer and a combination of the kind of metal element forming the core metal particle. Then, a fact that the influence of the metal element forming the core metal particle is exerted on only approximately 4 platinum atomic layers forming the platinum shell layer is found out.

As a result, in the disclosure, based on a concept that poisoning is prevented by a structure in which absorption of a molecule such as CO is intentionally reduced, by a structure with a large ratio of platinum on the surface of the platinum shell layer and a small thickness of the platinum shell layer, a core-shell type platinum-containing catalyst in which the Pt 5d electron binding force of the platinum shell layer is tuned so as to have high catalytic activity and platinum is efficiently used is achievable.

Note that in it is confirmed that a platinum shell structure is formed based on interatomic distance distribution functions (which is also referred to as radial distribution functions) around Pt and around Ru determined by an analysis of extended X-ray absorption fine structure (EXAFS) of X-ray absorption spectrum in the platinum-containing catalyst.

In the example embodiment and the working examples described above, as an example of the platinum-containing catalyst in the disclosure, a catalyst for fuel cell is described; however the disclosure is not limited thereto, and may be variously modified within the technical scope of the disclosure.

For example, the platinum-containing catalyst in the disclosure may be used for, in addition to a catalyst for fuel cell, a gas detector with high efficiency per volume, a noxious gas removal filter, a fuel gas cartridge, and the like.

As described above, in the disclosure, based on a concept that poisoning is prevented by a structure in which absorption of a molecule such as CO is intentionally reduced, a desirable structure of the core-shell type platinum-containing catalyst is found out; however, when a metal element forming the core metal particle is selected so as to intentionally increase absorption of a molecule such as CO, absorption capability as a removal filter for absorbing a molecule such as CO to remove the molecule is allowed to be improved.

Moreover, performance of absorption of a fuel gas such as $H_2$ is allowed to be changed by tuning the 5d electron binding force of platinum forming the platinum shell layer to enhance absorption. Further, it is considered that when performance of absorption of an H radical is changed by selecting a metal element forming the core metal particle so as to increase an electronic state around the Fermi level, the absorption is allowed to be enhanced.

INDUSTRIAL APPLICABILITY

According to the disclosure, in the platinum-containing catalyst, while the amount of used platinum is reduced, high catalytic activity is achievable by a reduction in carbon monoxide poisoning, and deterioration due to metal elution is also preventable. Moreover, when the platinum-containing catalyst of the disclosure is used, a fuel cell such as DMFC with good output characteristics and high durability is achievable.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A platinum-containing catalyst comprising:
    metal particles each including a core particle made of a metal atom except for platinum or an alloy of a metal atom except for platinum and a shell layer made of platinum on a surface of the core particle, the metal particles being supported by a conductive carrier and satisfying 0.25 nm$\leq t_s \leq$0.9 nm and 1.4 nm$\leq R_1 \leq$3.5 nm, wherein an average thickness of the shell layer is $t_s$ and an average particle diameter of the core particle is $R_1$, and wherein there is a lattice size mismatch between the platinum and the core particle causing a change in an electronic state of the platinum.

2. The platinum-containing catalyst of claim 1, wherein:
    the core particle includes the metal atom satisfying $E_{out} \geq$3.0 eV, where average binding energy relative to the Fermi level of electrons in the 5d band of platinum present on an outermost surface of the shell layer is $E_{out}$.

3. The platinum-containing catalyst of claim 2 wherein $E_{out} \leq$4.5 eV is satisfied.

4. The platinum-containing catalyst of claim 1, wherein: $E_{int} \geq$4.0 eV is satisfied, where average binding energy relative to the Fermi level of electrons in the 5d band of platinum present on an interface between the core particle and the shell layer is $E_{int}$.

5. The platinum-containing catalyst of claim 4, wherein $E_{int} \leq$5.0 eV is satisfied.

6. The platinum-containing catalyst of claim 1, wherein $1.7 \leq (R_2/R_1) \leq 2.2$ is satisfied, where an average particle diameter of the metal particle is $R_2$.

7. The platinum-containing catalyst of claim 6, wherein 2.2 nm$\leq R_2 \leq$4.4 nm is satisfied.

8. The platinum-containing catalyst of claim 1, wherein the core particle is configured of a ruthenium particle.

9. The platinum-containing catalyst of claim 8, wherein $3.5 \leq \gamma \leq 9.0$ is satisfied, where a molar ratio of platinum forming the shell layer to ruthenium is $\gamma$.

10. The platinum-containing catalyst of claim 1, wherein the core particle is configured of one of a cobalt particle, an iron particle, a nickel particle and a copper particle.

11. The platinum-containing catalyst of claim 1, wherein the core particle is configured of an alloy particle of nickel or copper and ruthenium.

12. An electrode including a platinum-containing catalyst, the platinum containing catalyst comprising:
    metal particles each including a core particle made of a metal atom except for platinum or an alloy of a metal atom except for platinum and a shell layer made of platinum on a surface of the core particle, the metal particles being supported by a conductive carrier and satisfying 0.25 nm$\leq t_s \leq$0.9 nm and 1.4 nm$\leq R_1 \leq$3.5 nm, wherein an average thickness of the shell layer is $t_s$ and an average particle diameter of the core particle is $R_1$, and wherein there is a lattice size mismatch between the platinum and the core particle causing a change in an electronic state of the platinum.

13. An electrochemical device including facing electrodes and an ion conductor sandwiched between the facing electrodes, one or both of the facing electrodes including a platinum-containing catalyst, the platinum-containing catalyst comprising:
    metal particles each including a core particle made of a metal atom except for platinum or an alloy of a metal atom except for platinum and a shell layer made of platinum on a surface of the core particle, the metal particles being supported by a conductive carrier and satisfying 0.25 nm$\leq t_s \leq$0.9 nm and 1.4 nm$\leq R_1 \leq$3.5 nm, wherein an average thickness of the shell layer is $t_s$ and an average particle diameter of the core particle is $R_1$, and wherein there is a lattice size mismatch between the platinum and the core particle causing a change in an electronic state of the platinum.

14. The electrochemical device of claim 13, wherein the electrochemical device is configured as a fuel cell including the platinum-containing catalyst as an anode catalyst.

15. The electrochemical device of claim 14, wherein the electrochemical device is configured as a direct methanol fuel cell.

16. The electrochemical device of claim 15, wherein the output density at a current density of 300 mA/cm$^2$ is 70 mW/cm$^2$ or over.

17. The electrochemical device of claim 16, wherein the output retention ratio after 800-hour continuous power generation is 90% or over.

18. A platinum-containing catalyst comprising:
    microparticles each including a platinum layer formed thereon and functioning as a base layer for preventing absorption of carbon monoxide on a surface of the platinum layer;
    a carrier contacting the microparticles and supporting the microparticles at parts contacting the microparticles; and
    the platinum layers formed with a thickness at which a function of the microparticles as the base layer is effectively exerted so that a whole surface except for a part contacting the carrier of each of the microparticles is covered with the platinum layer.

19. A method of producing a platinum-containing catalyst comprising:
    synthesizing microparticles each having a platinum layer formed thereon in a later step and functioning as a base layer preventing absorption of carbon monoxide on the platinum layer while preventing agglomeration thereof;
    mixing a carrier with a reaction liquid formed after the step of synthesizing the microparticles to absorb the microparticles on the carrier;
    taking the microparticles supported by the carrier out of the reaction liquid formed after the step of synthesizing the microparticles and washing the microparticles; and
    forming the platinum layer with a thickness at which a function of the microparticles as the base layer is effectively exerted so that a whole surface except for a part contacting the carrier of each of the microparticles is covered with the platinum layer by dripping a platinum salt-containing liquid and a reducing agent-containing liquid into a dispersion liquid containing the microparticles supported by the carrier, and such that there is a lattice size mismatch between the platinum layer and the base layer causing a change in an electronic state of the platinum layer.

* * * * *